United States Patent
Kamali et al.

(10) Patent No.: US 9,462,015 B2
(45) Date of Patent: Oct. 4, 2016

(54) DISTRIBUTED ASSOCIATION ENGINE

(71) Applicant: VirtualBeam, Inc., San Francisco, CA (US)

(72) Inventors: Masoud M. Kamali, San Francisco, CA (US); Dariush Anooshfar, San Jose, CA (US)

(73) Assignee: VIRTUALBEAM, INC., Millbrae, CA (US)

( * ) Notice: Subject to any disclaimer, the term of this patent is extended or adjusted under 35 U.S.C. 154(b) by 139 days.

(21) Appl. No.: 14/068,997

(22) Filed: Oct. 31, 2013

(65) Prior Publication Data

US 2014/0207959 A1 Jul. 24, 2014

Related U.S. Application Data

(60) Provisional application No. 61/720,681, filed on Oct. 31, 2012.

(51) Int. Cl.
*H04L 29/06* (2006.01)
*G06F 17/30* (2006.01)
*H04L 29/08* (2006.01)

(52) U.S. Cl.
CPC ....... *H04L 65/1069* (2013.01); *G06F 17/3087* (2013.01); *G06F 17/30241* (2013.01); *H04L 67/10* (2013.01)

(58) Field of Classification Search
CPC . G06T 17/05; G06T 19/00; G06T 2219/004; G06T 13/00; G06T 15/20; G06T 2210/36; G06T 19/20; G01C 21/367; G01C 21/3694; G01C 21/3638; G01C 21/3664; G01C 21/3673; G01C 21/3679; G06F 3/04883; G06F 17/30241; G06F 17/30864; G06F 17/3087; G06F 17/30722; G06F 17/30997; G06F 17/30; G06F 3/04842; G08G 1/0969; H04N 21/25841

See application file for complete search history.

(56) References Cited

U.S. PATENT DOCUMENTS

| | | | | |
|---|---|---|---|---|
| 7,177,761 | B2 * | 2/2007 | Kaufman et al. | 701/428 |
| 7,376,510 | B1 * | 5/2008 | Green | 701/436 |
| 7,746,343 | B1 * | 6/2010 | Charaniya et al. | 345/428 |
| 8,265,864 | B1 * | 9/2012 | Kaufman | G01C 21/367 340/995.14 |
| 9,021,384 | B1 * | 4/2015 | Beard | G06F 3/0481 382/105 |
| 9,141,640 | B2 * | 9/2015 | Tadman | G01C 21/36 |
| 2002/0112237 | A1 * | 8/2002 | Kelts | 725/39 |
| 2002/0123841 | A1 * | 9/2002 | Satoh et al. | 701/208 |
| 2005/0065959 | A1 * | 3/2005 | Smith et al. | 707/102 |
| 2005/0110789 | A1 * | 5/2005 | Le Ouay | 345/419 |
| 2005/0278378 | A1 * | 12/2005 | Frank | G06F 17/30616 |
| 2006/0117067 | A1 * | 6/2006 | Wright et al. | 707/104.1 |

(Continued)

*Primary Examiner* — Sargon Nano
(74) *Attorney, Agent, or Firm* — Fish & Tsang, LLP

(57) ABSTRACT

A computer-implemented method for a distributed association engine, comprising searching, by a processor, for one or more objects of interest within a spatial bounded area, identifying, by the processor, the one or more objects of interest responsive to the search, and mapping, by the processor, one or more relationships between a user and the one or more objects of interest in a personal network.

17 Claims, 35 Drawing Sheets

(56) References Cited

U.S. PATENT DOCUMENTS

| | | | |
|---|---|---|---|
| 2006/0149742 A1* | 7/2006 | Egnor | 707/10 |
| 2007/0011150 A1* | 1/2007 | Frank | G06F 17/3087 |
| 2008/0010262 A1* | 1/2008 | Frank | 707/3 |
| 2008/0130955 A1* | 6/2008 | Harrison | G06F 17/30241 382/113 |
| 2009/0048776 A1* | 2/2009 | Bouillet | G08G 1/0969 701/414 |
| 2009/0112812 A1* | 4/2009 | Ellis | G06F 17/30722 |
| 2009/0176509 A1* | 7/2009 | Davis | H04W 4/02 455/456.3 |
| 2009/0210416 A1* | 8/2009 | Bennett | G06F 17/30241 |
| 2011/0276423 A1* | 11/2011 | Davidson | G06Q 30/06 705/26.1 |
| 2013/0035853 A1* | 2/2013 | Stout | G06T 17/05 701/438 |
| 2013/0219308 A1* | 8/2013 | Britton | 715/764 |

\* cited by examiner

DISTRIBUTED ASSOCIATION ENGINE

CROSS-REFERENCE TO RELATED APPLICATIONS

This application claims the benefit under 35 U.S.C. §119(e) of U.S. Provisional Patent Application No. 61/720,681, filed on Oct. 31, 2012 and entitled "DISTRIBUTED ASSOCIATION ENGINE," which is hereby incorporated by reference in its entirety.

BACKGROUND

Server based search systems have inherent delays due to round-trip-signal travel and processing delays. Due to these delays, server-based systems are unable to meet the requirements of real-time search of dynamic spaces comprising objects that may change one or more parameters, such as, for example, location, orientation, or relationships. Server-based systems fail to make use of the computing resources available on user devices, which continue to increase in power over time.

Current search engines can only map and process a single static object instant relationship. Current platforms cannot model dynamic objects or respond to requests in a timely manner. Client-server computing centralizes intelligence to serve the needs of less intelligent client applications. Current client applications have total dependency on the server side. Cloud-computing adds a loss to true value of time and data. Communicating changes back to a server limits processing of real-time changes of dynamic objects.

SUMMARY

In various embodiments, a computer-implemented method for a distributed association engine is disclosed. The computer-implemented method comprises searching, by a processor, for one or more objects of interest within a spatial bounded area; identifying, by the processor, the one or more objects of interest responsive to the search; and mapping, by the processor, one or more relationships between a user and the one or more objects of interest in a personal network In various embodiments, a system for implementing a distributed association engine is disclosed. The system comprises a display screen, a processor, and a non-transient memory medium operatively coupled to the processor. The memory medium is configured to store a plurality of instructions configured to program the processor to search for one or more objects of interest within a spatial bounded area, identify the one or more objects of interest responsive to the search, and map one or more relationships between a user and the one or more objects of interest in a personal network.

In various embodiments, a non-transitory computer-readable memory medium is disclosed. The non-transitory computer-readable memory medium is configured to store instructions thereon that when loaded by a processor cause the processor to search for one or more objects of interest within a spatial bounded area, identify the one or more objects of interest responsive to the search, and map one or more relationships between a user and the one or more objects of interest in a personal network.

FIGURES

The novel features of the embodiments described herein are set forth with particularity in the appended claims. The embodiments, however, both as to organization and methods of operation may be better understood by reference to the following description, taken in conjunction with the accompanying drawings as follows.

DESCRIPTION

Figure 1B:
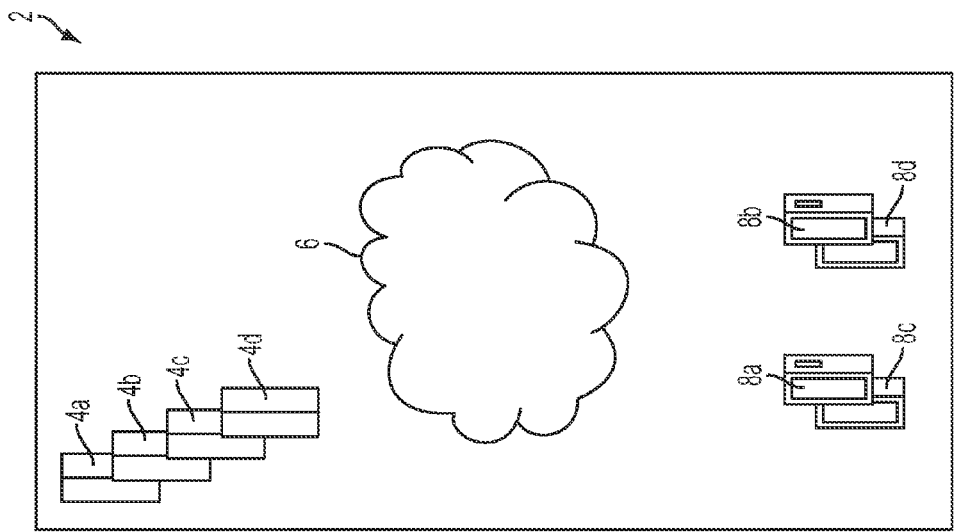
FIGS. 1A-1C illustrates embodiments of server-based search methods.

Reference will now be made in detail to several embodiments, including embodiments showing example implementations of systems and methods for a distributed association engine. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

In some embodiments, a distributed association engine is disclosed. The distributed association engine processes multi-instant relationships between multiple people and multiple objects of interest in real-time. The distributed association engine may be distributed such that a processing load is distributed on one or more devices. In some embodiments, a plurality of devices run identical spatial and social search algorithms and exchange result sets. The additional processing power available on the plurality of devices is leveraged to quickly model a physical and/or virtual world of objects and relationships among the objects. In one embodiment, laws of locality enable the distributed association engine to process search and/or requests faster than a server-based engine. The distributed association engine also allows mapping, modeling and interacting with static objects, dynamic objects, and/or virtual objects in real-time.

In one embodiment, a distributed association engine is coupled with a flexible adaptive front end to provide safe, private, quick, and autonomous discovery of a user's surroundings, search for friends, and/or track one or more objects. A user may select objects of interests (OOIs) and interact with the objects of interest. In one embodiment, a distributed association engine enables searching within any shape or form in four dimensions: one-dimensional time plus three-dimensional space. The search algorithms may be distributed, for example, running locally on a single device and/or distributed on several devices. The distributed association engine identifies objects of interest through one or more search algorithms. The objects of interest may comprise dynamic objects, virtual objects, static objects, and/or any other type of object.

In one embodiment, the distributed association engine runs at least partially on a user mobile device. By keeping both code and data local, users can manage properties of, and relationships to, target objects of interest much faster than server-based engines. The distributed association engine creates a distributed model of social, personal, and product graphs on the mobile device allowing users to manage multiple OOIs, run search requests against multiple OOIs, along multiple dimensions, simultaneously, in real-time. In one embodiment, the properties of target OOIs and user relationships to the OOIs are calculated and displayed in real-time by the distributed association engine. The properties of each association of interest and each object of interest are displayed in real-time by the distributed association engine.

In one embodiment, a device running a VirtualBeam Application (vbApp) implementing a distributed association engine comprises the center, or zero location, of a search. A graphical user interface (GUI) is presented to illustrate the user-central nature of the search, such as, for example, by displaying the user and/or device at the center of a bubble view or at the start of a beam/cone view of a search. In one embodiment, the use of a distributed system allows inter-device and device-server communication to increase efficiency. Distributed searching lowers the overall necessary bandwidth and decreases load on back-end servers for any given number of user searches and reduces overall bandwidth required for all vbApp-enabled devices on a network.

In some embodiments, a distributed association engine leverages object relational modeling, discrete math and graph theory to construct a model of a real time-space world that is capable of absorbing change and convergence among a plurality of nodes in semi-real-time. In one embodiment, all nodes run identical DTM code with a small footprint. Nodes may comprise, for example, mobile devices, servers, and/or other devices. The distributed search algorithms and data structure are scalable and may run on any node.

Figure 1A:
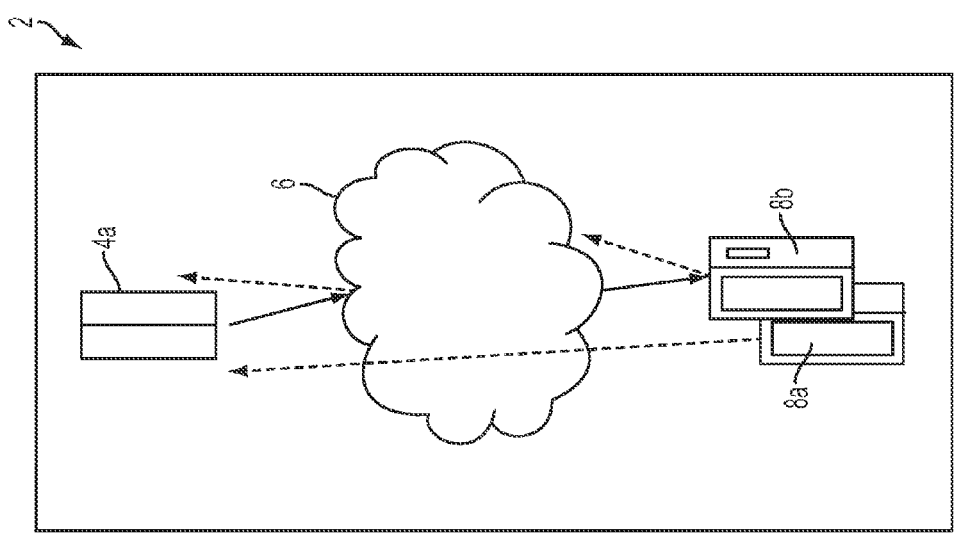
Figure 1C:
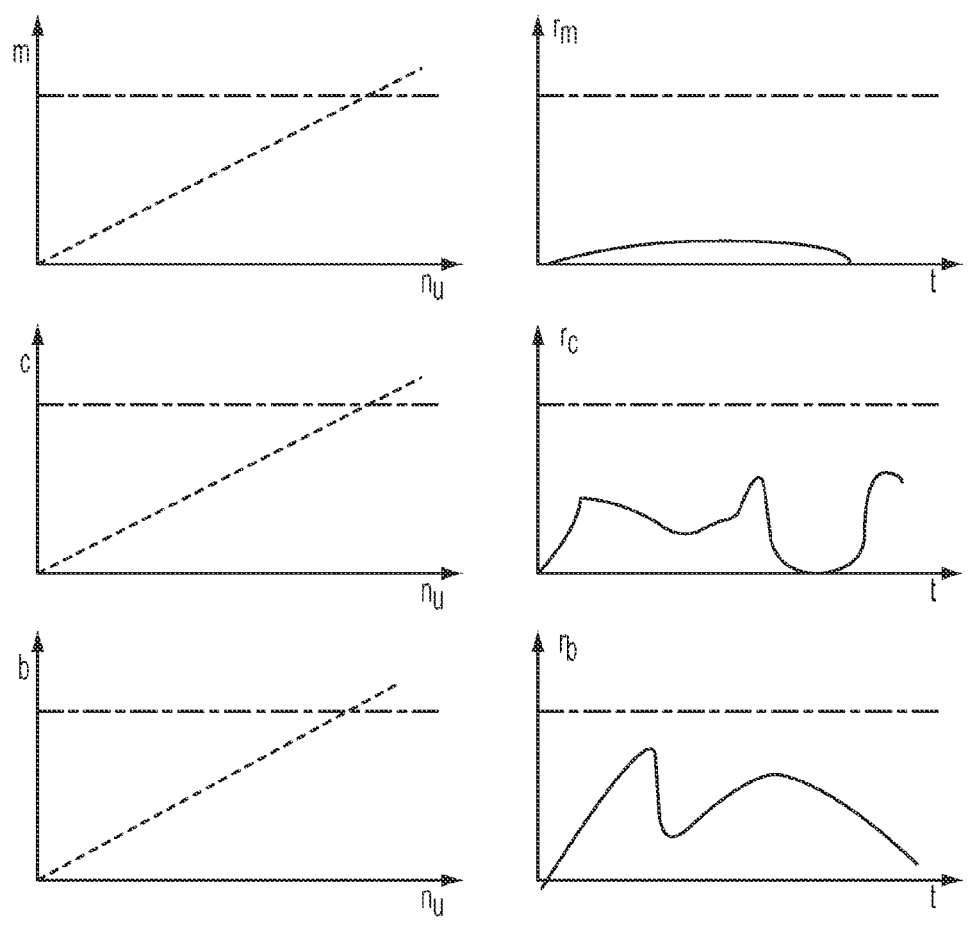

FIGS. 1A-1C illustrate embodiments of server-based search methods 2. One or more client devices 4a-4d, such as, for example, laptops, desktops, mobile phones, and/or other devices, communicate over a network 6 with one or more backend servers 8a-8d. In one embodiment, communication between the client devices 4a-4d and the backend servers 8a-8d comprises a pull model in which a client device 4a-4d sends a request to the backend servers 8a-8d. Both data and logic reside on the backend servers 8a-8d. Storage, bandwidth and processing power is provided to the client devices 4a-4d by the backend servers 8a-8d. The backend servers 8a-8d receive and process request messages submitted by client devices 4a-4d and send back response messages that contain results (data) to the client devices 4a-4d. The backend servers 8a-8d may also "push" data to client devices 4a-4d. As shown in FIG. 1B, as the number of client devices 4a-4d increases, so to must the number of backend servers 8a-8d.

Figure 2B:
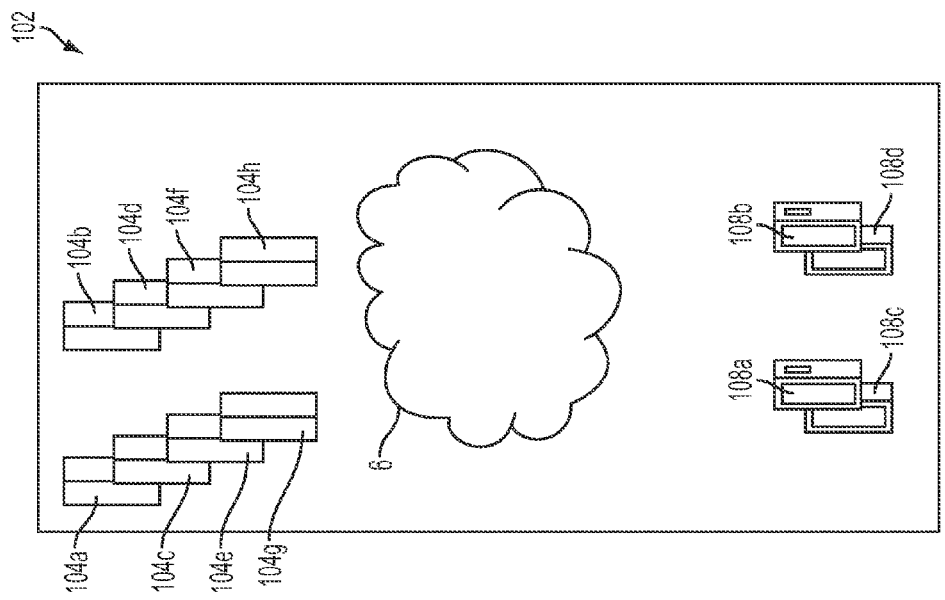
FIGS. 2A-2C illustrate various embodiments of a federated network of mobile devices solving problems.
Figure 2A:
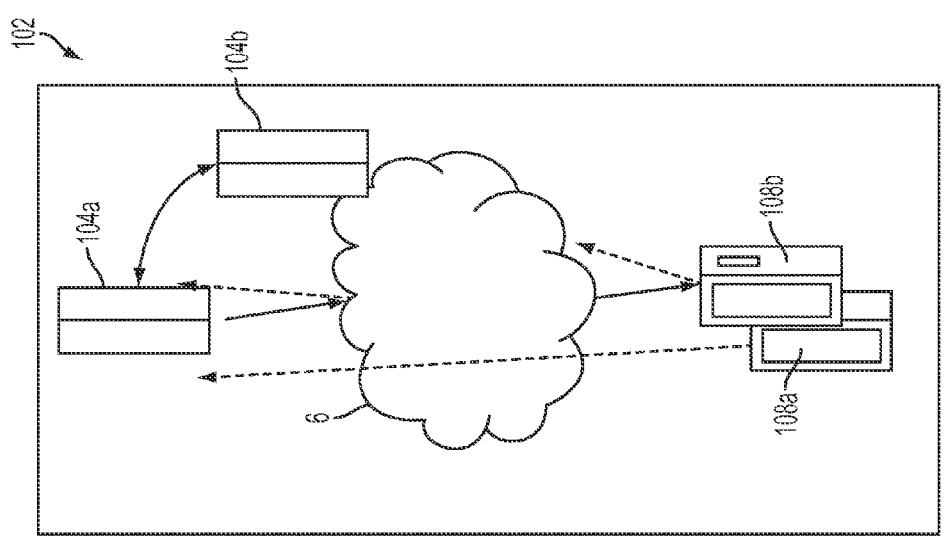
Figure 2C:
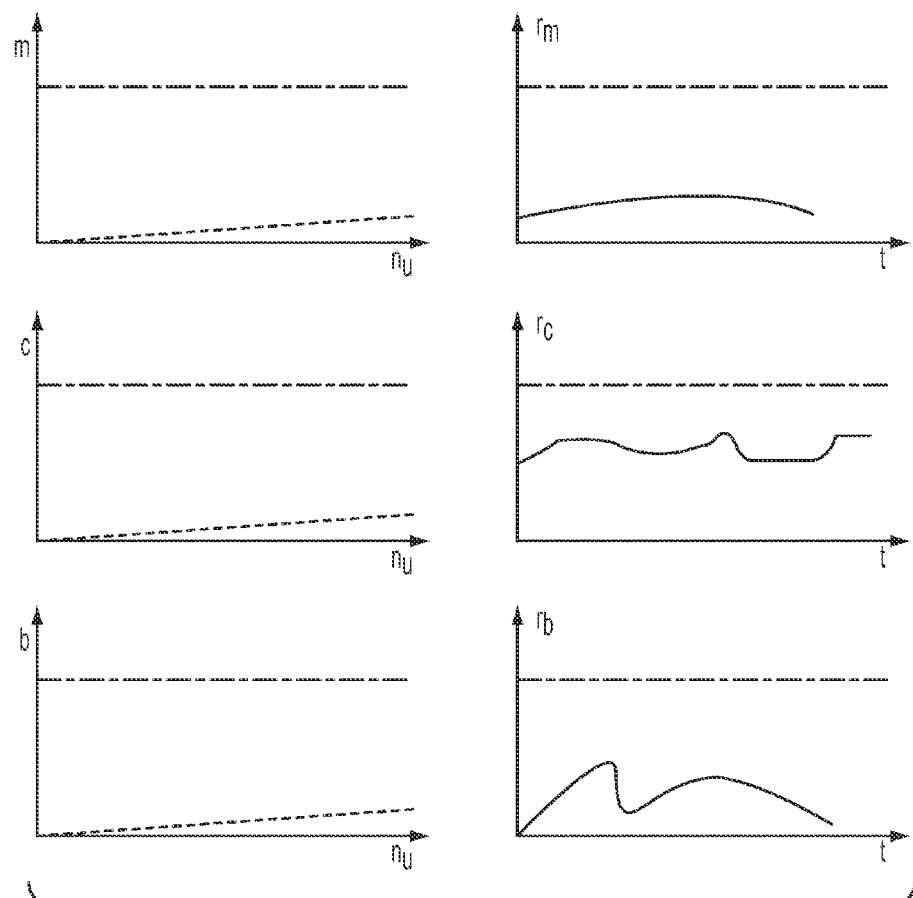

FIGS. 2A-2C illustrate embodiments of a federated network (vbNet) 102 of client devices 104a-104h, or mobile intelligent objects, alone or in a group of two or more, executing one or more distributed tasks. The two or more devices 104a-104h collectively run a distributed association engine comprising data structures and algorithms for the search and discovery logic. The distributed association engine of the vbNet 102 comprises distributed data structures and search and discovery algorithms that run on intelligent nodes which communicate with one another via an inter-node communications protocol that allows participating nodes to exchange data. In one embodiment, a distributed algorithm comprises two main components: 1) algorithm code and data residing on a host device and 2) protocols that allow nodes to exchange data. Social, spatial, and/or other discovery tasks are processed by one or more client devices 104a-104h with minimal or no collaboration with the backend servers 108a-108d. Distributed algorithms and data structures, with efficient and smart logic, make it possible to handle user requests on the client devices 104a-104h.

FIGS. 1C and 2C illustrates centralized cloud side processing compared to a distributed association engine. FIG. 1C illustrates centralized cloud side processing, which uses increased memory, CPU, and bandwidth usage on the backend server side in order to meet the search requests that front end clients submit. Centralized processing is slow and imposes a round-trip response time for Client-Server communications that cannot be eliminated. Average client-server one-way response time is in the hundreds of milliseconds to seconds and is too slow for solving many real world problems. FIG. 2C illustrates the memory, CPU, and bandwidth usage for a distributed association engine. By distributing the processing and search algorithms, the distributed association engine minimizes and/or eliminates Client-Server communication, and therefore eliminates the round-trip delay imposed by cloud-based services.

Figure 3:
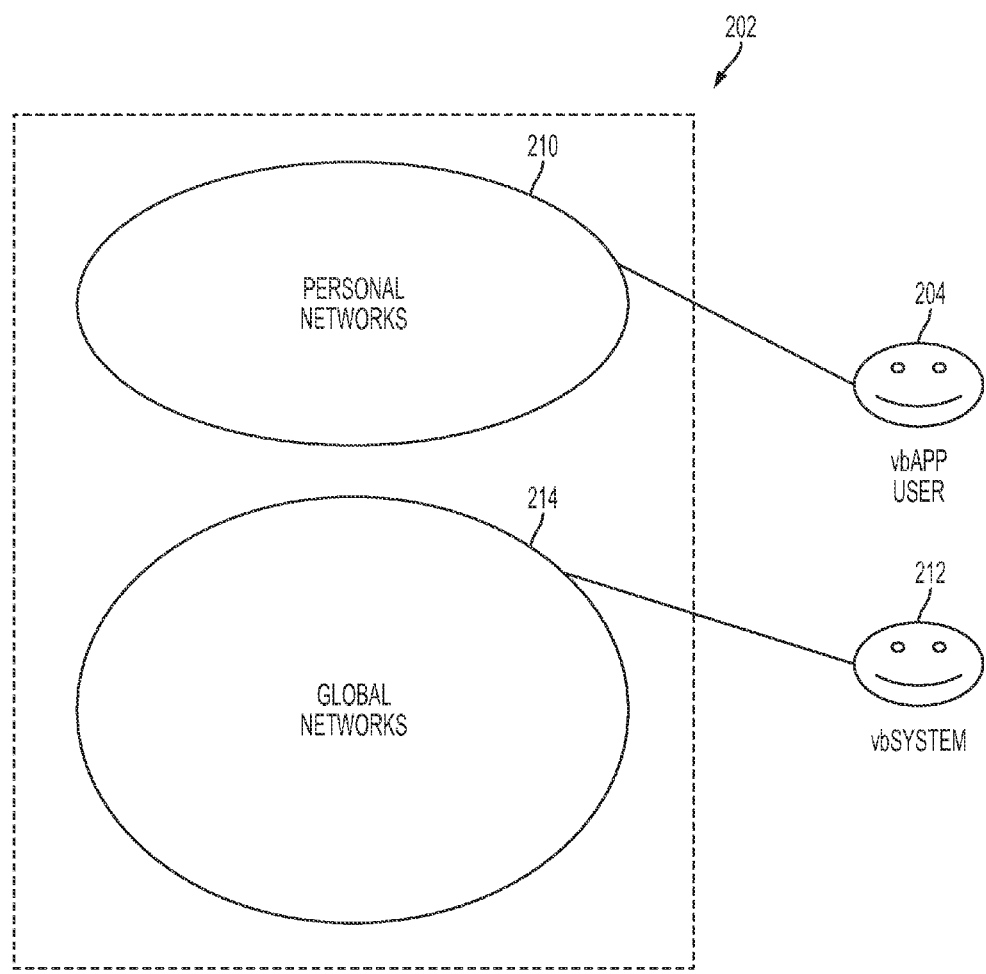
FIG. 3 illustrates one embodiment of a VirtualBeam network (vbNet).

FIG. 3 illustrates one embodiment of a vbNet 202. The vbNet 202 comprises a distributed association engine configured to search one or more OOIs. The vbNet 202 comprises a plurality of vbApp instances 204 executed by a plurality of mobile and/or non-mobile devices. A protocol facilitates inter-node communication amongst vbApps 204. In one embodiment, the vbApps 204 learn, model and manage associations that vbApp 204 users have or make over time. Associations are learned by the vbApps and are assigned a global and/or local unique identifier. Associations and/or identified objects may be grouped into categories. Associations are relations between objects, such as, for example:

Person P "likes" Image I
Person P "recommends" Person Y
Object O "interests" Person Y
Object O and Object Q are "related."
Association Category: Social: VB-LinkedIn
Person P "recommends" Person Y Person Y "is-connected-to" Person X
Person P "is-member" of Group G
Association Category: Spatial: VB-Core
Person P "is-inside" Object O
Person P "is-leaving" Object O
Person P "is-flying-over" Object O
Object O "contains" Object V
Object C "is-driven-by" Person P
Association Category: Social: VB-Core
Person P "called" Person Q
Person P "trusts" Person Q
Box B "shipped-by" Person P
Association Category: Activity: VB-Core
  Object O "Walking-by" Object P//O is a person, P is a coffee-shop
  Object O "falling-off" Object C//C is a ladder, O is a person In some embodiments, associations need not connect two distinct objects. For example, a self-referenced association has the same object as a start point and end point of the association. The distributed association engine may implement a self-referenced association as a directed edge (discussed in more detail below) and/or as a variable or member in a class. In some embodiments, dynamic properties of associations, such as, for example, distance to an OOI is stored in the representation of the association, for example, as a variable within an edge. In one embodiment, each association is described as: <VB-ref-ID, start-node-ID, end-node-ID, [dynamic-name-value pair i]*, [association context], static reference>. For example, an association for a relationship between a Facebook user and an object may comprise <VB-ref-ID "Facebook-Like", start-node-ID: User, end-node-ID: object, static reference> where "Facebook-Like" is a unique static ID reserved for the act of "liking" something on Facebook and the start-node-ID and the end-node-ID comprise system wide unique object IDs for the object and user.

As a vbApp 204 learns and discovers new associations, the vbApp 204 builds a map of a user's personal networks 210, such as, for example, social, professional, and/or other types of personal networks. The personal networks 210 may be constantly changing because of change in associations amongst people and objects. To create, model, and manage personal networks 210, the vbApp 204 implements a library of functions. In one embodiment, the vbApp 204 uses the library to create a model of personal networks 210 while user private data remains on the device and is not shared.

In one embodiment, the vbApp 204 comprises a node within a VirtualBeam System (vbSystem) 212. The vbApp 204 is configured to run standalone and autonomously without server support. The vbApp 204 creates, updates, manages and controls one or more user personal networks 210. The vbApp 204 attempts to model graphs and solve problems autonomously on the vbApp-enabled device. If the vbApp 204 is unable to solve a problem autonomously, the vbApp 204 may enlist one or more additional devices within the vbNet 202 in a distributed association engine. For example, in one embodiment, a vbApp 204 may communicate with one or more additional vbApp-enabled devices over the vbNet 202 to solve a search request generated by the vbApp 204. In other embodiments, the vbApp 204 may communicate with one or more servers to model and/or solve complex problems.

In some embodiments, a personal network 210 is communicated to a server to generate a global map of all personal networks 210. The global map allows a vbApp 204 to solve complex problems as part of the vbSystem 212. By sharing personal networks 210 with the one or more backend servers (vbServers), which implement instances of vbNet, one or more global networks 214 are generated. In one embodiment, one or more topology servers are implemented to develop and track the topology of the global network 214 to assist in solving problems. Communication between the vbNet nodes (vbApps 204) is secure and encrypted and includes privacy and security features. In some embodiments, a vbApp 204 implements a local instance of the vbNet 202. Each node may participate in solving a particular problem, announcing a discovered pattern, sharing patterns of interest, sharing a portion, or subset, of a personal graph, identified nodes, subgraphs, and/or other interactions with the vbNet 202.

In one embodiment, the vbApp is configured to provide a private, secure, useful, and easy to use real-time location-based service (LBS). In one embodiment, a distributed association engine may facilitate operations by providing an operations support system services such as, for example, authorization and authentication of handheld devices and mobile applications that request access to a vbNet, user authentication, establishing proper encoding schemas and/or additional support services. In one embodiment, the multi-dimensional search experience may be tightly coupled with a unique user experience/user interface (UX/UI). In some embodiments, a social graph is merged with a product graph through a personification engine. For example, a friend-finder application may come with a deal-finder feature that looks for deals and displays them in real-time.

In one embodiment, a vbNet 202 comprises a dynamic topology modeler (DTM). A DTM constructs the personal networks 210 of a user as each relationship between the user and one or more OOIs is identified. The DTM handles topological and other requests. The DTM is agnostic to peculiarities of the personal and/or global networks 210, 214 that are modeled and can be used to model simple to complex networks. In some embodiments, one or more domain mappers convert the agnostic library functions, for example, the DTM constructs, into domain specific functions. For example, in one embodiment, a vbNet addNode (O, Object) call is replaced by or encapsulated in the body of a higher level function specific to a domain.

In some embodiments, all vbApps 204 run identical DTM code. For example, each vbApp 204 may execute the same set of Objective-C or Java classes. By running identical code, sharing between vbApps 204 is seamless and allows the distributed association engine to expand to additional devices without the need to adapt or change objects. A proprietary application-layer protocol may be used to communicate between vbApps 204. The protocol is used to carry and exchange network and other properties.

A vbApp 204 may share subnets of one or more personal networks 210 or the entire network stored by the vbApp 204 using DTM. For example, a vbApp 204 may share the vbApp's 204 view of the world, such as, objects and the relationships between those objects, with other vbApps, including mobile devices and/or servers. A vbApp 204 can subscribe to local and/or global vbNet 202 events, communicate changes to the vbSystem 212, and request services from the vbNet 202. In some embodiments, the information shared by the vbApp 204 is limited to only the change in associations detected by the vbApp. For example, as a vbApp 204 discovers one or more nodes and/or associations between nodes, the vbApp 204 may generate a personal network. Each of the discovered nodes and/or associations between the nodes may be communicated to a vbServer as it is discovered. If an association between two previously discovered nodes changes, for example, a Node A and a Node B are no longer associated, the vbApp 204 may only communicate the change in relationship between Node A and Node B, instead of communicating the entire personal network each time a change is detected. The changes communicated by the vbApp 204 to the vbServer are multicasted to one or more additional vbApps in communication with the vbNet and which have Node A and Node B in the node's personal network.

In one embodiment, the vbNet 202 models associations and solves topological problems. A local instance of the vbNet 202 is used to model personal local networks 210. A server or remote-side of vbNet 202 components can be utilized to construct super-nets that model a global network 214 of interconnected individual personal networks 210. In some embodiments, the vbNet 202 network logic is agnostic to non-topological properties of the personal networks 210. A vbNet 202 may comprise local instances and/or remote instances. The remote servers of the vbSystem 212 build holistic views and construct models of global (or super) networks using software objects the DTM provides.

In some embodiments, a vbApp 204 applies graphical modeling techniques to build one or more semi-isomorphic maps of one or more networks 210, 214 that the vbApp 204 learns over time. For example, when a vbApp 204 searches for a doctor, shows interest in a landmark, shares observations with other friends, makes a call, tags an object to track, or performs an activity, the vbApp 204 gradually constructs a graphical model of a personal network 210 on a local host, such as, for example, a mobile device. The vbApp 204 keeps both logic and data on the local host. The DTM, which comprises the core of the vbNet 202 logic, is agnostic to peculiarities of the networks modeled. Almost any type of network, sub-net, super-net, path, or similar can be modeled and analyzed.

A vbApp 204 may be configured to add one or more OOIs to a user's personal network 210. For example, a user may use the vbApp 204 to search for a hospital in the neighborhood, to lookup location of a bus in downtown San Francisco, to find Facebook friends visiting from out of town, show interest in a landmark, point at a retail store, click an ad, like a picture, and/or recommend an article on a social network. The OOIs and the relationships between the user and the OOIs may be added to the personal network 210. A topological model of the relationships and objects that participate in the relationships may be built on the local device by the vbApp 204. In some embodiments, a vbApp 204 imports OOIs and relationships from a user's social and business networks. For example, if a user logs into a social and/or business network, such as, for example, Facebook, LinkedIn, Google Plus, Skype, and/or other social networks, through a vbApp 204 interface, the vbApp 204 learns the users' social and business networks of friendships, business connections, and other types of associations and adds the OOIs and relationships to the user's personal network 210. A user may use the vbApp 204 to add associations and/or objects to the vbApp's 204 private network for predefined time intervals, allowing the distributed association engine to support ad-hoc relationships. For example, in one embodiment, a relationship exists between a tour bus in San Francisco and a tourist on the tour bus with a one-day ticket. The tourists wishes to know the distance to the tour Bus while on the tour. The tourist, T, may add the tour bus, B, to a private network on the tourist's vbApp 204 enabled device for 24 hours. A vbApp 204 can instruct the vbNet to create associations at a first time and remove the associations at a second time. In some embodiments, the generation and/or removal of associations is periodic. The DTM provides the logic to model graphs and operate graph structures of relationships. For example, the association [Tourist T "track-location-of" Bus B] is added to the personal network of the Tourist T and is deleted from the vbNet after 24 hours.

In some embodiments, a personal network 210 of a vbApp 204 is limited by one or more spatial boundaries (VB-SPC). A VB-SPC allows the vbApp 204 to generate a model of a physical and/or virtual space of interest to a user, such as, for example, a space in which the user is physically located. In one embodiment, a vbApp 204 is concerned only with objects of interest that are located within or related to a search area, such as, for example, a two-dimensional (2D) or three-dimensional (3D) area. The search area may be specified by a user and/or automatically generated by a vbApp 204. A vbApp 204 comprising a VB-SPC allows a user to discover the user's surroundings, scan a building, and/or identify objects of interest in some sub-space of the search area. In some embodiments, the vbApp 204 lets users specify and modify search area properties. For example, a vbApp can search for objects in a search area, limit the types of objects identified in the search area, and/or otherwise modify the search area properties. U.S. Patent Appl. Pub. No. 2012/0041966, published on Feb. 16, 2012, entitled "DIRECTIONAL INFORMATION SEARCH FROM A MOBILE DEVICE" is herein incorporated by reference in its entirety.

Figure 4:
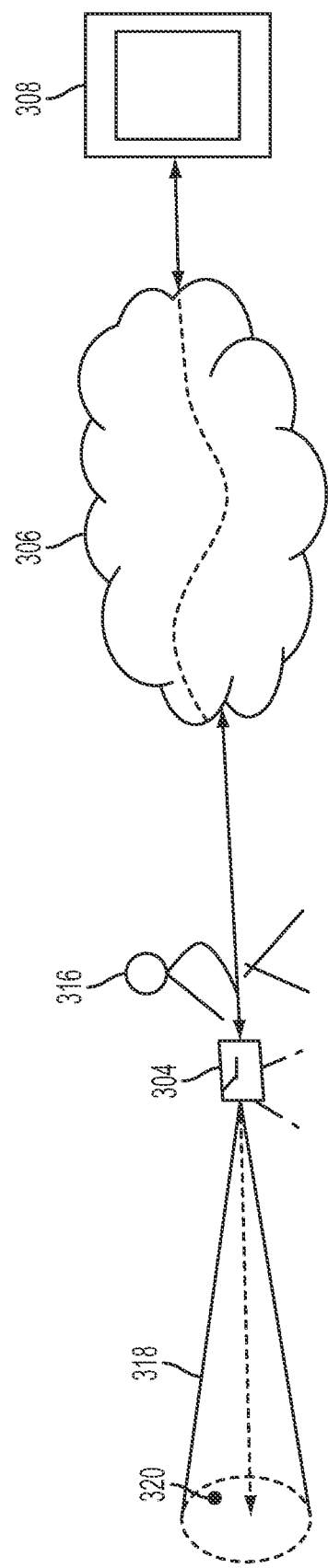
FIG. 4 illustrates one embodiment of a spatial boundary search executed by a mobile device comprising a VirtualBeam application (vbApp).

FIG. 4 illustrates one embodiment of a spatial boundary search 300 executed by a mobile device 304 comprising a vbApp. A user 316 defines a VB-SPC search area 318. The vbApp conducts a search within the VB-SPC search area 318 for one or more OOIs 320. The mobile device 304 may be in communication with one or more vbServers 308 through a network 306. In some embodiments, a vbApp is configured to define different sets of tools and/or shapes of search areas, such as, for example, a 3D cone, ring, sphere, vector, and/or any other two or three-dimensional shape. The vbApp may limit a search to a sub-space specified by the user. In some embodiments, the vbApp may define range, depth and/or other spatial search properties of the three-dimensional search area. A user 316 may configure a vbApp to make copies, or snapshots, of a sub-net, a collection, and/or the vbApp's entire personal network periodically and/or at specific times. A user may define a time-period and associate the time-period with a snapshot, instructing the vbApp to delete the snapshot after a specified time period. In some embodiments, the VbApp stores a graph description for a snapshot and references to the OOIs within the snapshot. A vbApp may allow a user 316 to browse through snapshots that are stored on the local memory and/or on a remove vbServer.

In one embodiment, a vbNet 202 and/or a vbApp 204 comprise several generic software objects, comprising one or more primitive software objects which may be dynamically assembled together and used in different configurations in application programs with economy in memory usage and execution time. In one embodiment, the following software objects may be available to a vbNet 202 through a software library, referred to as a VB DTM (dynamic topology modeler) library. Objects of the DTM library, the object properties and usage are described in more detail below.

a. Random Access, data type agnostic, Linear Data lists,
   b: Nodes of a Graph or Digraph (Directed Graph) Data Structures,
   c: Edges (2-way Edges) of a Graph to connect a pair of unordered Nodes, d: Arcs (1-way Edges) of a Digraph to connect a pair of ordered Nodes,
e: Graphs consisted of Nodes and 2-way Edges,
f: Digraphs, consisted of Nodes and 1-way Edges,
g: Super Nodes each of which is consisted of a Graph or Digraph,
h: Super Edges which connect a pair of unordered Super Nodes,
i: Super Arcs, which connect a pair of ordered Super Nodes,
j: Super Nets whose Nodes and Edges are Super Nodes and Super Edges,
k: Super Dinets whose Nodes and Edges are Super Nodes and Super Arcs.
l: Auxiliary standard data structures to assist algorithms operating on a Graph or Digraph etc. such as Adjacency matrices, Laplacian matrices and the likes.

In one embodiment, random access linear data lists comprise generic pointers to a location in memory space of the executing code, such as, for example, local RAM, a machine farm, or a cloud-server, which may contain a single primitive data object of the native programming language and/or a generic pointer to a data structure of that language. Examples may include: integers, low and high precision floating point (real) numbers, Boolean functions, strings of characters, generic pointers to complex data structures, and/or any suitable primitive data object. In one embodiment, any of the data types may be stored in a single list in any of the list's elements in any order. The single list provides a list processing environment which is data type agnostic and provides fast storage and retrieval means. The list storage property facilitates design and control of the memory usage in any of the other generic objects of the vbNet 202 such as, for example, nodes, graphs, arcs, and/or other objects. In traditional systems, not all the elements of a data structure designed to represent a graph are necessarily required while executing a related algorithm on that graph. A data structure designed and declared in a conventional and static way comprises:

```
structure Data {
    int k;
    double d;
    String str;
    (more data locations ...);
}
```

An algorithm may only use the integer and double values "k" and "d", in which case the other defined data structures waste memory space. In one embodiment, all objects of the vbNet 202 are equipped with one or more lists when the object is created and/or during run-time after creation. In an embodiment comprising a vbNet object, a data structure may be defined as

```
structure Data {
    vbntList lst;
}
``` wherein vbntList lst only holds values of "k" and "d," in any order. The vbntList holds only those values used by the algorithm and does not generate wasted memory space. In general, a vbntList may be used in many different configurations in each vbNet object. In some embodiments, the length of each list is not fixed and each element of the list may store different data type. The vbntLists may be edited, deleted and/or recreated dynamically during run-time. For example, at anytime during a run-time, the application programmer is able to maintain only the data required by a specific algorithm such that more memory space would be available for other data and code.

In one embodiment, a vbNet 202 comprises recursive and flexible construction of complex associative data structures from generic and simple structures. The recursive and flexible construction allows a vbNet 202 to model fractal phenomenon, molecular structures, social network agents and associations and many other data in different disciplines in a natural and versatile manner. In one embodiment, a node represents an object, such as, for example, an OOI, a vbApp enabled device, and/or other objects in personal and/or global networks. A node is connected to other nodes with an edge or an arc. In one embodiment, a node may comprise static data and/or dynamic data. Static data may comprise, for example, a numeric integer value and a list of pointers to all edges or arcs which are incident to the node. Dynamic data of a node may comprise, for example, an optional zero to any number of vbntList objects.

In one embodiment, an edge defines a reflexive (two-way) relation between a pair of unordered nodes, such as, for example, a reflexive relationship between a Node A and a Node B. In one embodiment, an edge comprises static data and/or dynamic data. The static data may comprise a general purpose real value and pointers indicating the nodes at each end of the edge. The dynamic data may comprise an optional zero to any number of vbntList objects.

In one embodiment, an arc defines a directed (one-way) relation between a pair of ordered nodes, such as, for example, NodeA→NodeB or NodeA←NodeB. In one embodiment, an arc comprises static data and/or dynamic data. The static data may comprise, for example, a general purpose real value and pointers indicating the two nodes at each end. The dynamic data may comprise, for example, an optional zero to any number of vbntList objects. In various embodiments, edges and/or arcs may represent, for example, the relationships between nodes within a personal and/or global network.

In one embodiment, graphs and digraphs comprise container objects for nodes, edges and/or arcs. A graph and/or a digraph is constructed to represent certain relationships of objects and object attributes. In some embodiments, graphs and digraphs comprise standard algorithms to operate on nodes, edges and/or arcs contained within the graph and/or digraph. In various embodiments, the algorithms may include:
1. A set of editing functions to add or delete nodes, edges or arcs with different options.
2. A set of Boolean operations performable on the graph or digraph and another graph or digraph. The Boolean operations may include, for example, union, symmetric difference, and/or any other Boolean operation. In one embodiment, the Boolean operation may result in a new resultant Graph or Digraph or a modified original graph or digraph
3. A set of algorithms to create auxiliary data structures to support execution of some other related algorithms. The auxiliary structures may include Boolean Adjacency matrices, incident matrices and/or Laplacean matrices on demand.
4. A set of mission-specific algorithms to run on the auxiliary data structures and produce user applications data.

In one embodiment, a graph and/or a digraph comprises static data and/or dynamic data. The static data may comprise, for example, a list of nodes, a list of edges, a list of arcs and/or a list of pointers to auxiliary structures which may be requested to be built and destroyed on demand. The dynamic data may comprise, for example, an optional zero to any number of vbntList objects. In some embodiments, graphs and/or digraphs represent one or more personal and/or global networks.

In one embodiment, a vbNet 202 comprises one or more super nodes. A super node may represent a graph and/or a digraph object implicitly and may be used to construct one or more super net and/or super dinet objects. In one embodiment, super nodes comprise virtual objects with no memory allocation and are implicitly defined as the head and/or the tail of a super edge and/or a super arc. The objects of the vbNet 202 comprise self-similar objects. For example, in one embodiment, a node and a super node comprise the same object within the DTM library. The self-similar nature of the vbNet 202 allows the vbNet 202 to model increasingly complex networks, including, for example, networks of networks.

In one embodiment, a vbNet 202 comprises one or more super edges and/or super arcs. Super edges and super arcs may connect a pair of unordered super nodes in a super net and a pair of ordered super nodes in a super dinet. In one embodiment, a super edge and/or a super arc may be used to recursively construct complex and hierarchical data models out of graphs, digraphs, super nets and super dinets. In one embodiment, a super edge and/or a super arc comprises static data and/or dynamic data. The static data may comprise, for example, a general purpose real value and pointers indicating the two super nodes at each end.

The pointers may indicate a graph, digraph, super net and/or a super dinet as nodes of a super net or super dinet. The dynamic data may comprise, for example, an optional zero to any number of vbntList objects.

In one embodiment, a vbNet 202 comprises one or more super nets and/or super dinets. Super nets and/or super dinets comprise container objects for super nodes, super edges and/or super arcs. Super nets and/or super dinets are constructed to represent certain relationships between complex objects, such as, for example, graphs, digraphs, super nets, and/or super dinets, as nodes and attributes. Super nets and super dinets are similar to graphs and digraphs and provide algorithms to operate on super nodes, super edges and/or super arcs contained therein. In one embodiment, a super net or super dinet comprises static data and/or dynamic data. The static data may comprise, for example a list of super nodes, a list of super edges, super arcs, and/or pointers to auxiliary structures which may optionally be requested to be built and destroyed. The dynamic data may comprise, for example, an optional zero to any number of vbntList objects.

In some embodiments, each element of the vbNet, for example, nodes, edges, arc, super nodes, super edges, super arcs, and/or other vbNet objects are extensions of a single software class. For example, in one embodiment, a class may be defined as an object class. An association, such as, for example, an edge and/or an arc, may be defined by extending the object class to include references to a start node, an end node, and the direction of the relationship, for example, a single direction arc or a bidirectional edge. Other objects, such as, for example, a super edge, may be defined by extending the object class to include a reference to a start super node and an end super node.

For example, in one embodiment, a vbNet object may comprise a vbStar. A vbStar comprises a constellation of nodes and/or OOIs forming a star topology with one OOI at the center of the star and one or more other OOIs, or leaves, connected to the center by one or more associations, such as an edge or an arc. In some embodiments, a leaf may represent another node, such as, for example, a vbApp-enabled device or OOI within the vbNet. In some embodiments, a leaf comprises a reference to a remote or third party object. Each leaf may be identified by a leaf ID. The leaf ID may comprise, for example, a unique ID generated by the vbApp and/or the vbNet for a node. Each leaf may have a type identifier, indicating the type of object represented by the leaf, such as, for example, a vbApp-enabled device, an OOI, a super node, an association, and/or any other object.

In various embodiments, the vbNet 202 comprises an organically growing network. One or more nodes, edges, arcs, and/or nets comprise extensions of one or more objects of interest. The vbNet 202 may organically expand by collapsing supernodes into nodes of a supernet and/or expanding supernodes into a personal graph or net. Self-referenced links and/or associations for OOIs allow modeling of multi-dimensional associations. For example, in one embodiment an association [X "is-friends-with" Y] is stored by a node. The "is-friends-with" association is modeled as an edge and/or an arc with one or more dynamic properties, such as, for example, distance to, price of call per minute, last time association made, or any other suitable dynamic property. A vbApp 204 may process the association and/or execute one or more algorithms between X and Y without need to consult with and/or make a request to a vbServer.

In one embodiment, a vbNet 202 comprises auxiliary data. Auxiliary data comprises data objects which are large and/or transiently required for one or more algorithms. For example, an adjacency matrix of a graph structure in social networks, if allocated as a two dimensional array, will waste a considerable amount of memory space. However, certain algorithms need an adjacency matrix of a graph structure in order to run efficiently in time. In one embodiment, a vbNet's 202 various graph-like structures do not automatically allocate such matrices as the graph is being built. Instead, a vbNet 202 may comprise methods and function calls to create adjacency matrix data and to delete the adjacency matrix data when the data is not needed. In one embodiment, several number of different matrices may be associated with graphs, and dynamic creation and allocation of auxiliary data becomes important to handle memory size at run-time as well.

Figure 5:
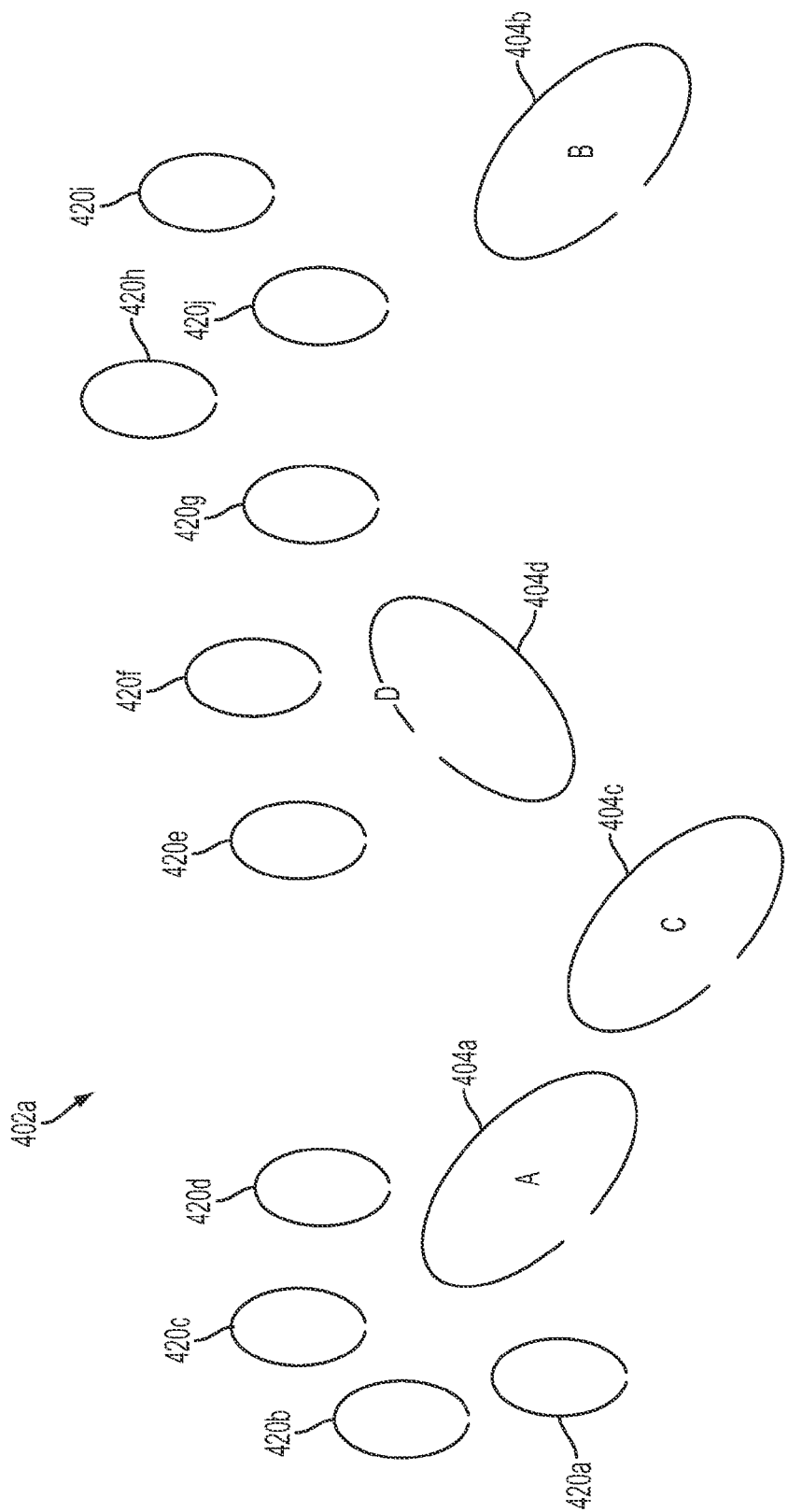
FIG. 5 illustrates one embodiment of a vbNet comprising interactions between a plurality of vbApps and a plurality of objects of interest (OOIs).

FIG. 5 illustrates one embodiment of a vbNet 402a comprising interactions between a plurality of vbApps 404a-404d and a plurality of OOIs 420a-420j. In various embodiments, the OOIs 420a-420i comprise mobile, stationary, static, dynamic, and/or virtual OOIs. The vbApps 404a-404d and/or the OOIs 420a-420j communicate over a communication infrastructure that may comprise wireless, wired, and/or other communication lines. FIG. 5 illustrates the vbNet 402a at a starting time T0. At time T0, there is no relationship between the OOIs 420a-420j and the vbApps 404a-404d. In some embodiments, a vbServer (not shown) authenticates the plurality of vbApps 404a-404d and assigns system-wide unique private names and keys (labels) to each of the vbApps 404a-404d. One or more of the vbApps 404a-404d, such as, for example, a first vbApp 404a may conduct a search. In one embodiment, a search produces a plurality of OOIs, such as, for example, a first OOI 420a, a second OOI 420b, a third OOI 420c, and a fourth OOI 420d. The identified OOIs 420a-420d may comprise static, mobile, virtual, and/or dynamic OOIs. The first vbApp's 404a search may produce one or more vbApps, such as, for example, a third vbApp 404c, and a fourth vbApp 404d. The vbApps 404c-404d identified in the search may comprise vbApps 404c-404d listed in a trusted friends list of the first vbApp 404a. A second vbApp 404b may conduct a search request. The second vbApp 404b identifies a plurality of OOIs, for example, the first OOI 420a, a fifth OOI 420e, a sixth OOI 420f, and a seventh OOI 420g, the third vbApp 404c, and the fourth vbApp 404d in response to the search request. In some embodiments, a third vbApp 404c may report its location to one or more trusted vbApps and/or vbServers. A fourth vbApp 404d may conduct a search. The fourth vbApp 404d identifies a plurality of OOIs, such as, for example, the first OOI 420a, the third OOI 420c, the fourth OOI 420d, an eighth OOI 420h, a ninth OOI 420i, the first vbApp 404a and the second vbApp 404b in response to the search request.

Figure 6:
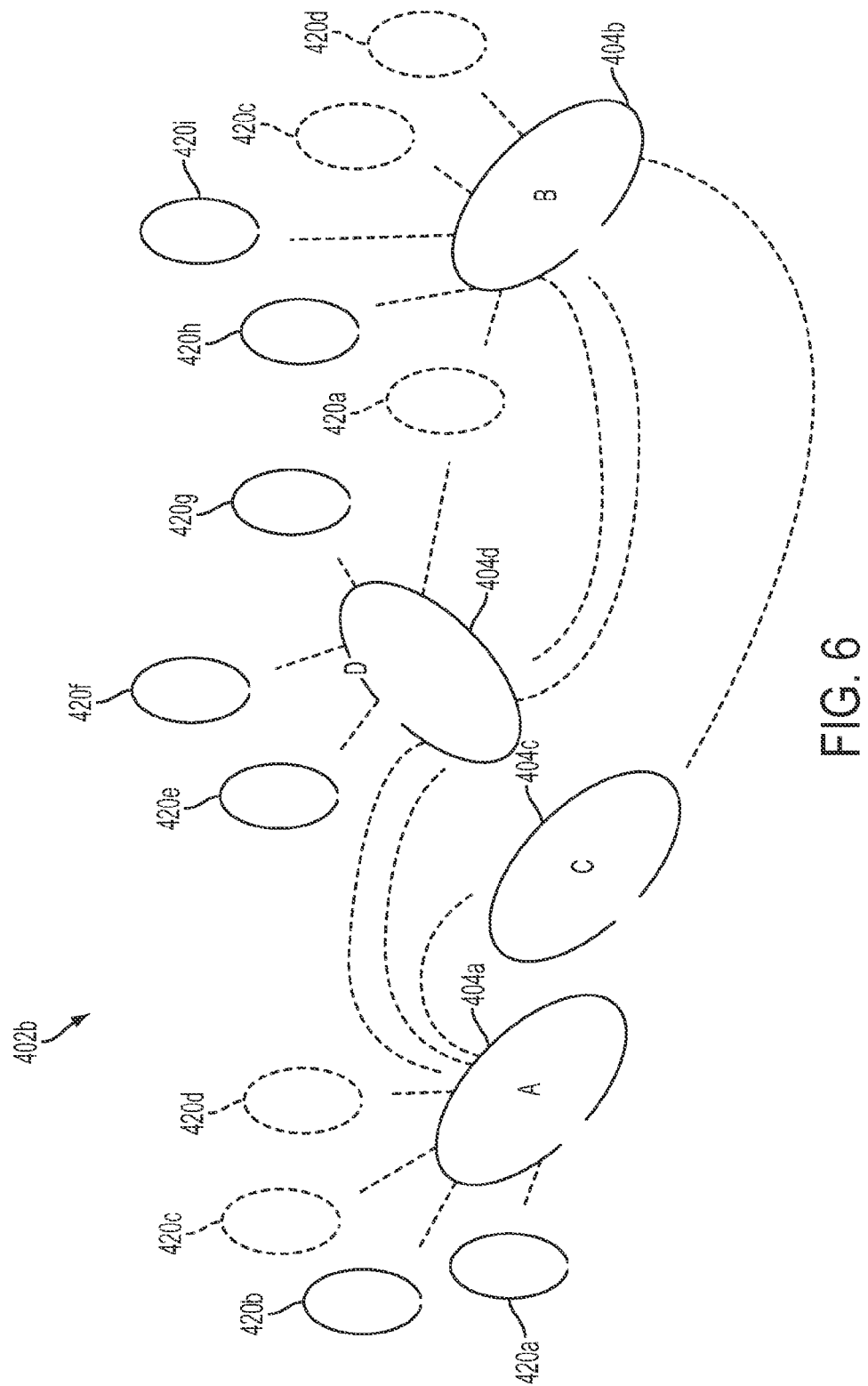
FIG. 6 illustrates one embodiment of the vbNet of FIG. 5 at a time T100 after the vbApps and the OOIs have established one or more connections.
Figure 7A:
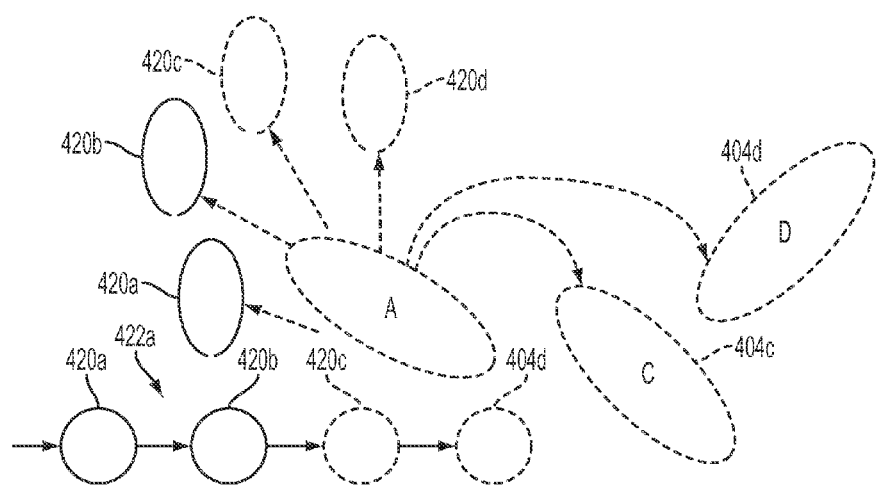
FIGS. 7A-7D illustrate various embodiments of node views of each of the vbApps of vbNet of FIG. 6.
Figure 7B:
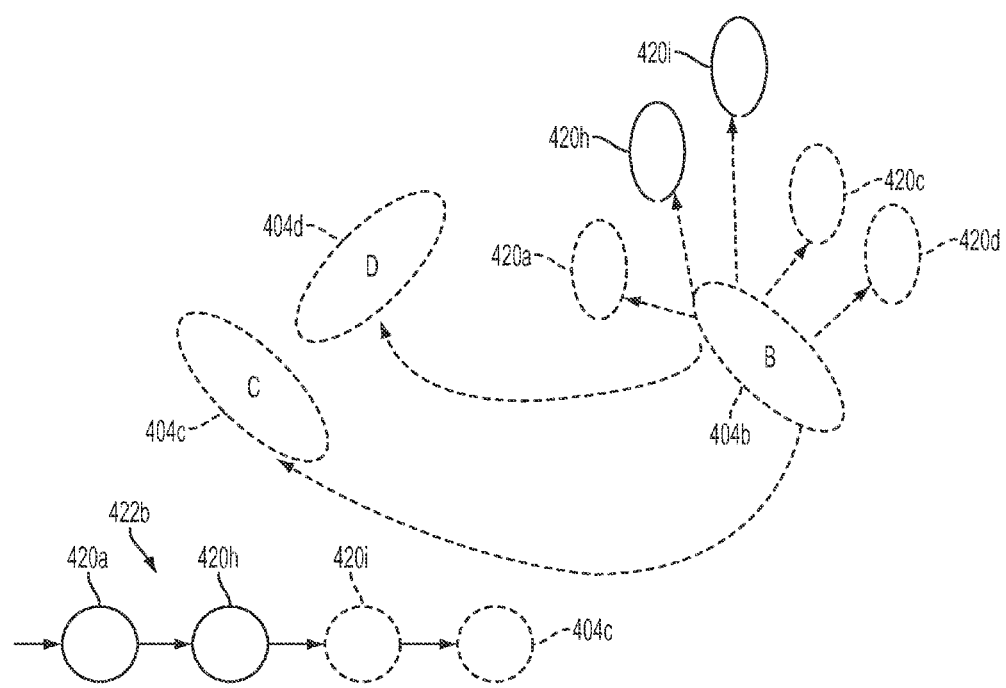
Figure 7C:
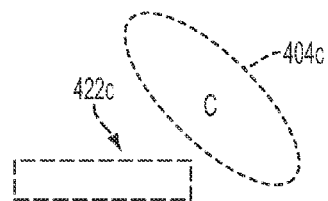
Figure 7D:
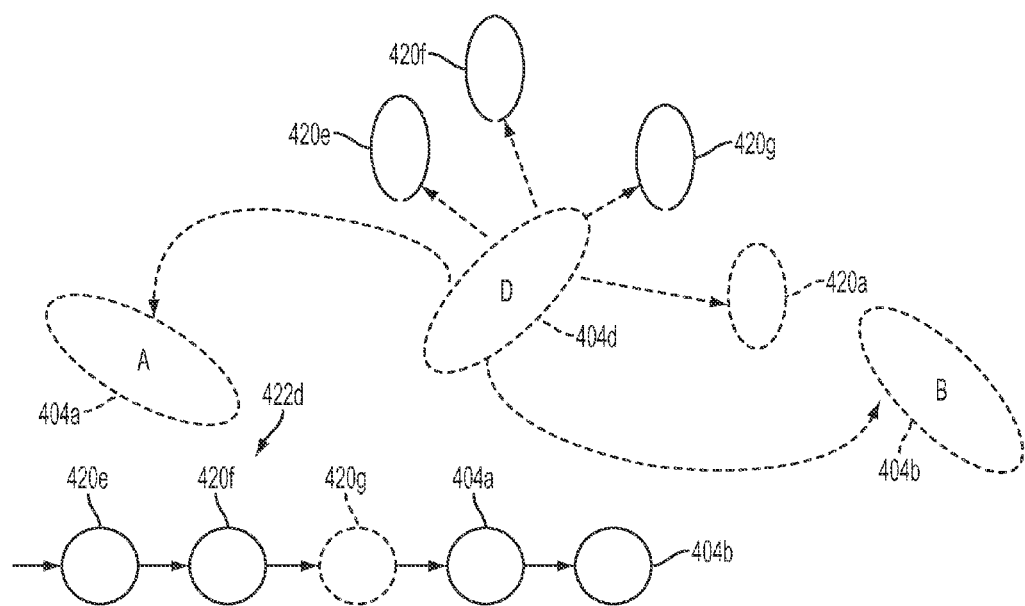

FIG. 6 illustrates one embodiment of the vbNet 402b at a time T100. At time T100, the vbApps 404a-404d have established a plurality associations with objects of interest, such as, for example, connections with the OOIs 420a-420i and with other vbApps 404a-404d. FIGS. 7A-7D illustrate a node view for each vbApp 404a-404d at time T100. FIG. 7A illustrates a node view for the first vbApp 404a. The first vbApp 404a comprises connections to four OOIs 420a-42d, the third vbApp 404c and the fourth vbApp 404d. The OOIs 420a-420d and the vbApps 404c-404d connected to the first vbApp 404a comprise objects identified by a search conducted by the first vbApp 404a. FIG. 7B illustrates a node view for the second vbApp 404b. The second vbApp 404b comprises connections to four OOIs 420a, 420c, 420d, 420h, 420i, the third vbApp 404c, and a fourth vbApp 404d. FIG. 7C illustrates a node view for the third vbApp 404c. The third vbApp 404c has no connections, as the third vbApp 404c has not run any searches as of time T100. FIG. 7D illustrates a node view of the fourth vbApp 404d. The fourth vbApp 404d comprises connections to four OOIs 420a, 420e-420g, the first vbApp 404a, and the second vbApp 404b.

In some embodiments, each of the vbApps 404a-404d comprises a sandbox 422a-422d. A sandbox 422a-422d is configured to store OOIs 420a-420i and vbApps 404a-404d in the vbApp's 404a-404d personal network. FIGS. 7A-7D illustrate sandboxes 422a-422d for each of the vbApps 404a-404d at a time T100. In one embodiment, the OOIs 420a-420i and/or the vbApps 404a-404d added to a vbApp's 404a-404d sandbox 422a-422d comprise objects identified by the vbApp 404a-404d during a search. FIG. 7A illustrates a sandbox 422a for the first vbApp 404a comprising connections to three OOIs 420a-420c and the third vbApp 404c. Although the first vbApp 404a has interacted with a fourth OOI 420d and the fourth vbApp 404d, these objects have not been added to the first vbApp's 404a sandbox 422a. In some embodiments, a user may select one or more identified objects to be excluded from a sandbox. In some embodiments, the excluded objects are non-responsive to one or more searches conducted by the first vbApp 404a.

FIG. 7B illustrates the sandbox 422b of the second vbApp 404b. The sandbox for the second vbApp 404b comprises three OOIs 420a, 420h, 420i and the third vbApp 404c. FIG. 7C illustrates the sandbox 422c for the third vbApp 404c. The sandbox 422c for the third vbApp 404c is empty, as the third vbApp 404c has not established any connections to any objects within the vbNet. FIG. 7D illustrates the sandbox 422d for the fourth vbApp 404. The sandbox for the fourth vbApp 404d comprises three OOIs 420e-420g, the first vbApp 404a, and the second vbApp 404b. In some embodiments, one or more objects may be visible to more than one vbApp 404a-404d without the vbApps 404-404d being aware that the vbApps 404a-404d are connected to (have an association with) the same object. In some embodiments, a vbApp, such as the first vbApp 404a, may share objects and/or connections in their sandbox 422a with one or more trusted vbApps, such as, for example, the second vbApp 404b. A vbApp 404a-404d may obtain access and subscribe to a node view of one or more trusted vbApps 404a-404d.

In one embodiment, each of the OOIs 420a-420j may comprise a real-world and/or virtual object. Each object, for example an OOI and/or a vbApp enabled device, within the vbNet is represented by an n-tuple comprising one or more descriptors. For example, the n-tuple may comprise: longitude, latitude, altitude, one or more type codes, a last time changed indicator, a first time discovered indicator, and/or any other descriptor. In some embodiments, the n-tuple may comprise a source of static data, a source of dynamic data, a source for social data, length, width, object-tree identifier including root and offspring, a life span, and/or any other data source. Mobile and dynamic objects may have additional parameters, such as, for example, vector and/or speed. Static objects may be stationary but comprise one or more dynamic properties, such as, for example, a price quantity. In one embodiment, objects may comprise a system-wide unique identifier. Objects may also comprise logical names which have local significance and need not be unique, such as, for example, an object logical name identifying an OOI as "GoodCoffeeShop."

In some embodiments, the n-tuple associated with an object is used to determine whether the object is responsive to a search request. For example, the fourth vbApp 404d may conduct a search which returns an OOI 420j as a result. The OOI 420j comprises a static OOI with a single dynamic and/or variable property, p. The fourth vbApp 404d comprises a unique ID, which is issued by a vbServer which checks uniqueness. The OOI 420j comprises a unique local identifier assigned by the fourth vbApp 404d such as, for example, id(D).id(j). The OOI 420j may also be discovered by the second vbApp 404b. The second vbApp 404b comprises a unique identifier assigned by the vbServer. The second vbApp 404b assigns a unique local identifier to the OOI 420j, such as, for example, id(B).id(j). In one embodiment, every object returned by a vbApp 404a-404d search is assigned an ID that is unique for that vbApp 404a-404d. In some embodiments, a vbApp 404a-404d may not assign a static object a unique object ID until the particular static object is placed into one of the vbApp's 404a-404d collections, such as, for example, the sandbox. The vbApp may provide automatic retrieval of dynamic properties of the object.

In one embodiment, objects may be public, private, protected, and/or shared. The objects may be placed into multiple collections and shared over multiple vbApps 404a-404d. In one embodiment, a vbApp 404a-404d may change its view of a public object. For example, a vbApp 404a-404d may change a local status of an OOI from public to private when the OOI is added to the vbApp's 404a-404d sandbox. Public, private, and protected objects may be shared, with sharing of the objects determined by the relationship between a first vbApp 404a and a second vbApp 404b. For example, in one embodiment, protected objects may only be shard by a first vbApp 404a to a second vbApp 404b identified as a trusted friend. Examples of private objects may include, for example, a family car, a FedEx package, the number of seats remaining in an arena for a specific show, and/or other semi-public objects. Public objects may include, for example, a specific commercial flight, a manufacturer coupon, and/or any other public object. Protected objects may include, for example, children, parents, and/or other sensitive objects.

In some embodiments, a connection between a vbApp 404*a* and an object comprises a loose connection. A loose connection may be represented by an edge. A loose connection comprises a connection between a vbApp 404*a* and an object available at the system level but not available to the entire computing platform on which the vbApp 404*a* is running. A VbApp 404*a* may comprise a node (or vertex) comprising one or more descriptors. The vbApp 404*a* may be loosely associated with a static OOI. The vbApp 404*a* and the OOI may be linked by an edge. The static OOI may comprise one or more descriptors, such as, for example, Static OOI category, Static OOI data, and/or other descriptors. Examples of static OOIs include shops, restaurants, and/or other static, real-world objects. The vbApp 404*a* may also be loosely associated with one or more dynamic OOIs. The dynamic OOI may comprise one or more descriptors, for example, dynamic OOI type, dynamic OOI data, and/or other descriptors. Examples of dynamic OOIs include friends, family members, taxis, planes, and/or other mobile objects. The vbApp 404*a* may further be associated with one or more virtual OOIs. The virtual OOI may comprise one or more descriptors, such as, for example, virtual OOI type, virtual OOI data, and/or other descriptors. Examples of virtual OOIs include e-coupons, e-retailers, and/or other virtual objects. In various embodiments, a dynamic OOI may comprise other vbApp enabled devices.

Figure 8A:
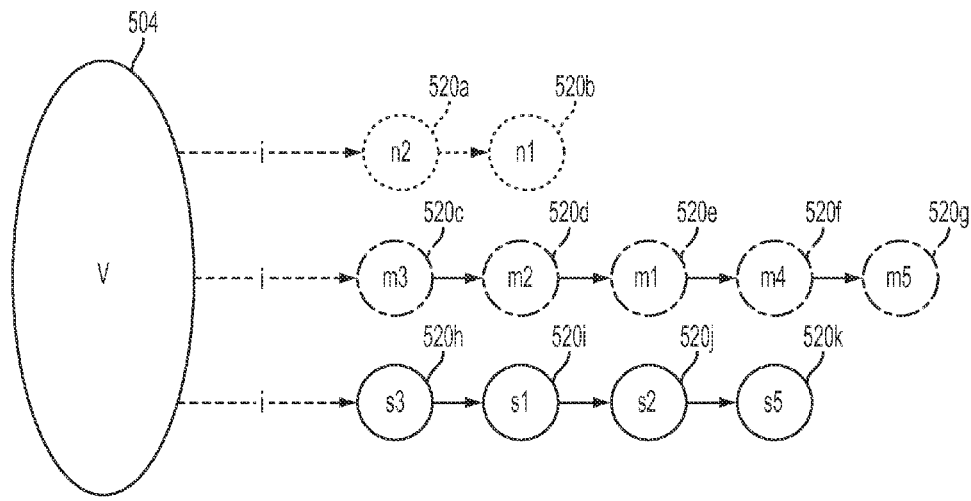
FIGS. 8A-8B illustrate one embodiment of a vbApp construction a sandbox from one or more node connections.
Figure 8B:
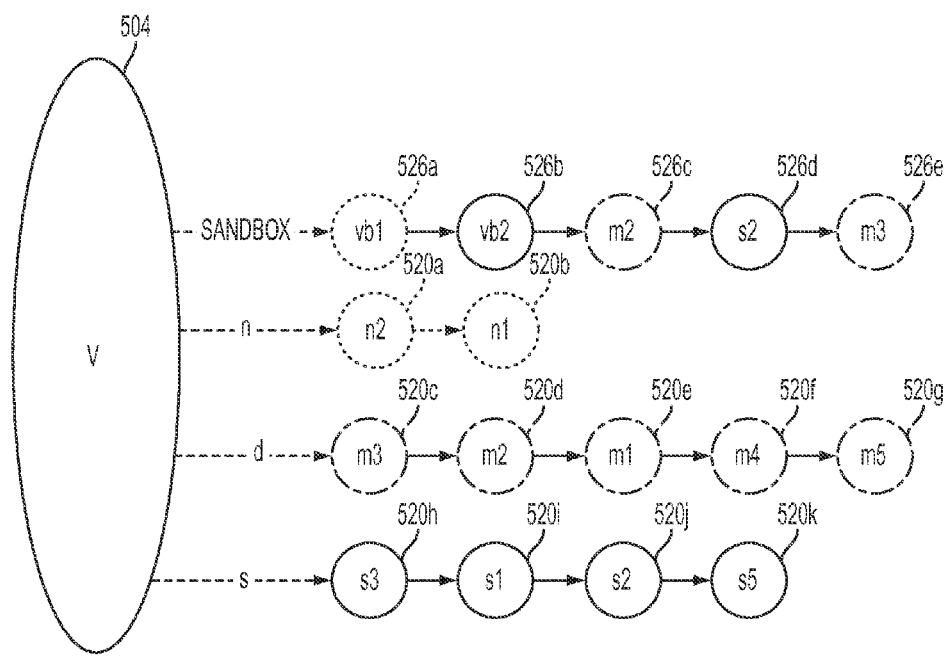

FIGS. 8A-8B illustrate various embodiments of constructing a sandbox 522 from one or more node connections. As shown in FIG. 8A, a vbApp 504 comprises a node. The vbApp 504 is linked to a plurality of OOIs 520*a*-520*k*. A plurality of loose associations 524*a*-524*c*, illustrated as a vector, comprise a path from the vbApp 504 to one or more of the OOIs 520*a*-520*k*. A vbList may be generated comprising related OOIs 520*a*-62*k* which share a vector. A sandbox 522 may be generated by the vbApp 504 by selecting one or more of the visible OOIs 520*a*-520*k* for inclusion in the sandbox 522. FIG. 8B illustrates a populated sandbox 522 of the vbApp 504. The sandbox 522 may comprise a placeholder or collection of OOIs identified by the vbApp 504 for inclusion in the sandbox 522. In one embodiment, a user may select OOIs 526*a*-526*e* for inclusion in the sandbox 522. The OOIs 526*a*-526*e* stored in the sandbox 522 may be of any type, including, but not limited to, vbApps, mobile objects, static objects, dynamic objects, and/or virtual objects. A vbApp 504 may comprise any number of sandboxes 522. A user, through the vbApp 504, may assign logical names to the objects in the sandbox 522.

Figure 9A:
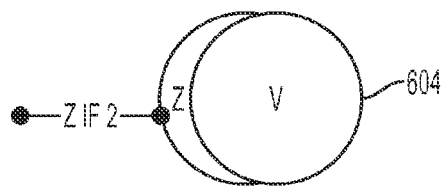
FIGS. 9A-9C illustrate one embodiment of vbApp generating a default sandbox.
Figure 9B:
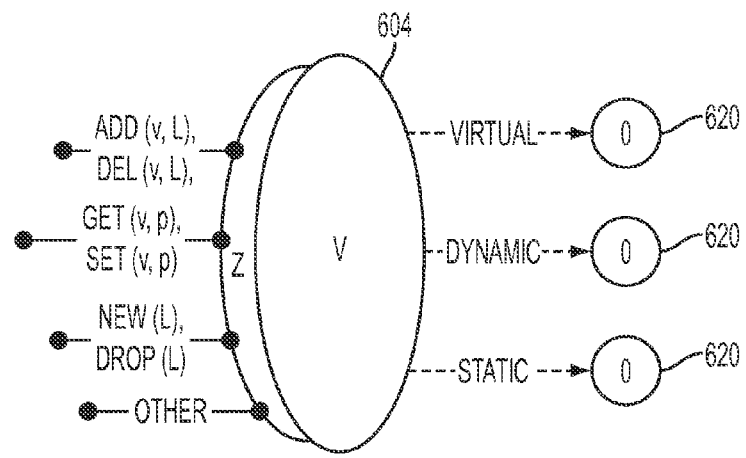
Figure 9C:
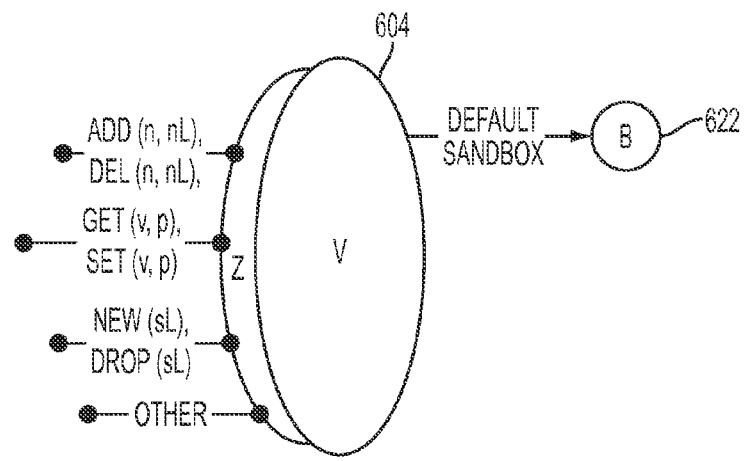
Figure 10A:
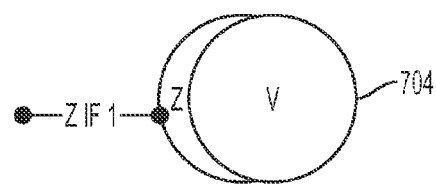
FIGS. 10A-10C illustrate one embodiment of a vbApp generating a vbSet.
Figure 10B:
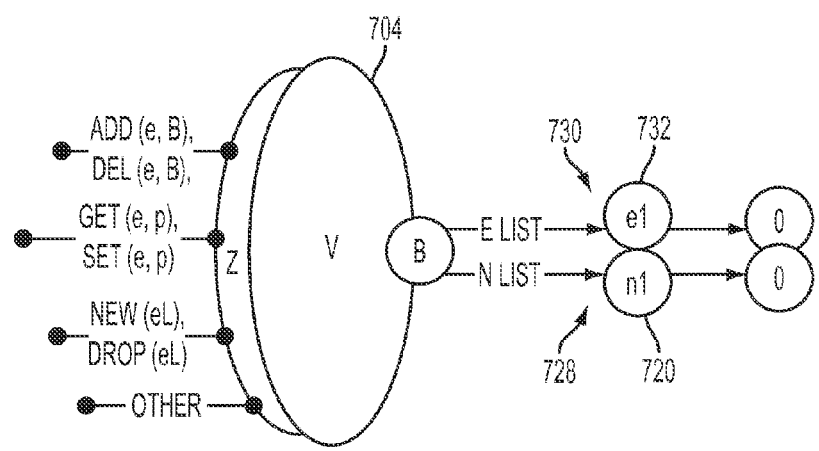
Figure 10C:
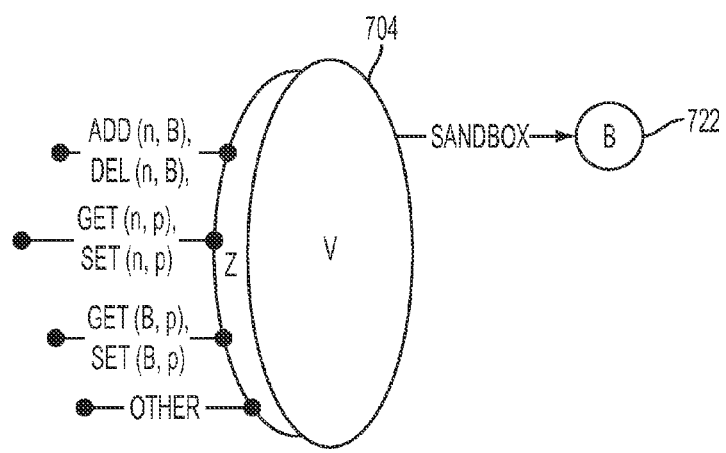

FIGS. 9A-9C illustrates one embodiment of a vbApp 604 generating a default sandbox. The vbApp 604 comprises a node. The vbApp 604 may be instantiated with a single sandbox comprising two entries, a self link and a link to the global vbNet network. The implementation and defaults of the sandbox may be different in various embodiments of the vbApp 604. FIGS. 10A-10C illustrates one embodiment of a vbApp 704 generating a vbSet 722. The vbSet 722 may comprise one or more OOIs, such as, for example, static, dynamic, and/or virtual OOIs 720. Implementation of a vbSet 722 may vary on different devices and/or hosts. A vbSet 722, such as, for example, a sandbox, may comprise one or more lists, such as, for example, a vbAttrLst.

In one embodiment, the OOIs 720 in the sandbox 722 may represent nodes in a vbApp 704 node list 728. As discussed above, edges may represent associations to particular nodes and/or networks of nodes. The OOIs 720 include representative edges and/or arcs. Edges, as discussed above, may represent relationships to particular nodes or networks of nodes. A sandbox 722 provides access to the OOIs 720 stored by the vbApp 704. In one embodiment, access to a sandbox 722 is limited to authorized requestors. In various embodiments, as OOis and associations of interest are learned by the vbApp 704, for example, by the DTM software library, the nodes 722 and edges 732 form two separate lists, for example, a node list 728 and an edge list 730. When a user selects a new OOI for inclusion in a sandbox 722, or the vbApp 704 automatically adds an OOI to a sandbox 722, the length of the node list 728 grows by one. The length of the edge list 730 need not change unless the user enters into a tight relationship with a node, for example, by showing an interest in the node. A sandbox 722 may provide access to the node list 728 and the edge list 730. A model of the distributed network of all vbNet users may be generated on a multi-dimensional graph. A vbApp, in various embodiments, may comprise active (or tight) relationships comprising relationships between the vbApp and an OOI in the sandbox 722, and loose relationships, comprising relationships between the user and any OOI that appears in a search result and is displayed to the user.

In some embodiments, a vbApp is implemented on a mobile device comprising a display interface, such as, for example, a touch screen. The vbApp may be configured to display results on the mobile device's touch screen, including objects which the user interacts with, relationships (associations) the user builds with those objects, functions that the user can apply, and/or other object interactions. The vbApp may also calculate and display properties of mobile, stationary, and/or dynamic objects, as well as properties of associations between those objects. For example, a vbApp may discover all of a user's Facebook friends who are currently in a specific geographic location. The friends are shown on the user's phone's touch-screen as small icons. In one embodiment, the background may be similar to a radar-like screen where the location, altitude, and/or other properties of all objects in close space can be shown simultaneously. The vbApp may also allow a user to choose what the user would like to see about discovered objects and/or discovered associations. As an example, for friends, a user may choose to see, in a single view, round trip air ticket in dollars to a friend's city, multiple ticket prices for multiple cities corresponding to multiple friends, price per minute to call and/or conference call one or more friends, and/or additional interactions. The vbApp may allow the user to run a shortest path routing algorithms, for example, to determine least cost routing, and/or other algorithms using default and/or selected techniques, back tracking, branch, bound, and/or other algorithms against particular properties of objects and associations identified by the vbApp. For example, if the vbApp calculations on the vbApp to determine the proper order or sequence to visit OOIs given shortest time, shortest distance, and/or other object properties. Other examples include, for example, choosing to see the value of the a property in "distance in kilometers" for one or more taxi's, or choosing to see the price for round trip tickets to target out-of-country landmarks of interest stored in a sandbox, or price per minute for international conference call to several friends. In some embodiments, vbApps may share the output of algorithms run locally on the vbApp-enabled device with one or more additional vbApps and/or vbServers. For example, the output of a search, discovery, sort, seek, and/or other algorithms. In some embodiments, the vbApp is configured to share a personal network, collection, behavioral pattern, trend, and/or other models in a vbApp's distributed graph data struction, for example, using DTM software library calls. vbApps communicate via VB graph exchange protocol and may use a VB graph description language and/or other graph description (or markup) languages to specify the OOIs and/or associations of interest that are to be shared. In some embodiments, the vbApp is configured to display objects and associations to the user. For example, an intuitive graphical UX/UI may depict multi-point relationships and populate them with data giving a novel experience, such as, for example, displaying all gas stations in 20 mile/kilometer proximity, displaying the gas station locations, specials, and price of unleaded gas at that location. In other embodiments, a user may be interested in: rental units pointing at a high-rise; in coffee shops in a different town; shopping malls within 20 miles radius; restaurants for sale along highway 1, and/or rush hour traffic on the Golden Gate bridge, each of which may be represented by the vbApp.

Figure 11B:
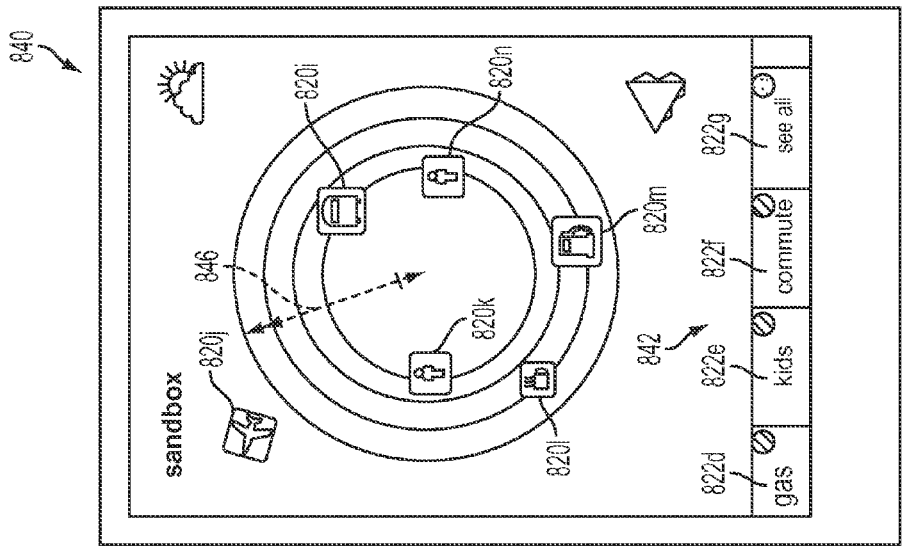
FIGS. 11A-11B illustrate various embodiments of a mobile device interface for a vbApp.
Figure 11A:
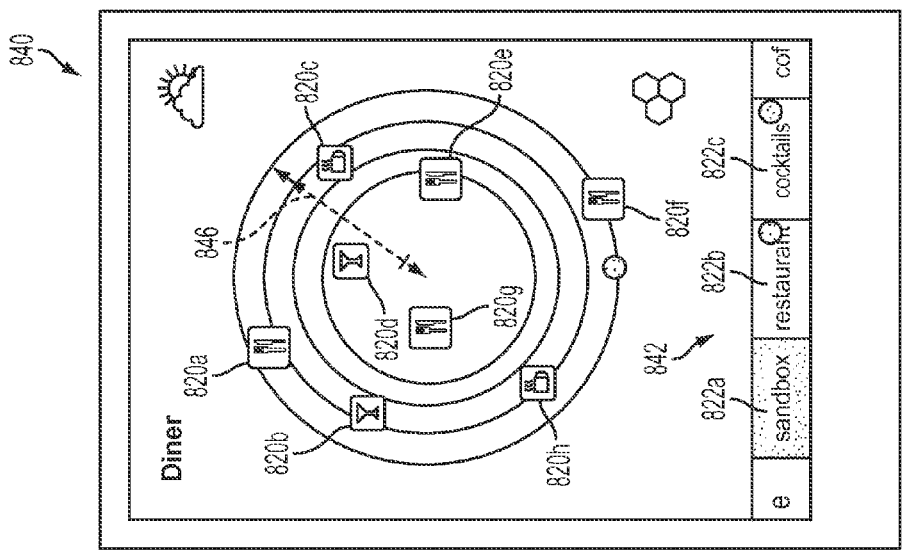

FIGS. 11A-11B illustrate various embodiments of a mobile device interface 840 for a vbApp. The interface 840 allows a user to search for one or more objects. The received objects are displayed as small icons on the interface. A horizontal slider 842 may be populated with recommendations and/or vbSets of objects. For example, a sandbox option 844a may be included on the horizontal slider 842, allowing a user to access one or more objects stored in the sandbox and/or add new objects to the sandbox. In one embodiment, a user may add an object to the sandbox by dragging the object icon 820a-820h to the sandbox option 844a. In other embodiments, the object may be added as a function and/or beam applied to selected objects.

In one embodiment, the vbApp may support a default sandbox. The default sandbox may appear as an item in a horizontal slider 842 on the interface 840. In various embodiments, dragging an OOI 820a-820h into the sandbox icon 822a adds a new object (or node) to the node list of the sandbox. A sandbox may have any number of nodes. A user may label a sandbox with a custom logical name, such as, for example, "my family" or may leave the sandbox unnamed. A vbApp may comprise one or more sandboxes and a user may have multiple sandboxes across multiple vbApps. A user may select or deselect a sandbox for display on the vbApp interface 840. The OOIs stored in the sandbox may be displayed or hidden depending on whether the sandbox is selected.

In one embodiment, a user may select the sandbox option 822a from the horizontal slider 842 to display one or more OOIs stored in the vbApp sandbox. In one embodiment, a user may select one or more individual sandboxes 822b-822f to display or hide the OOIs stored in that sandbox. In FIG. 11B, all sandboxes are displayed, and the screen shows icons for a flight OOI 820j, two individual OOIs 820k, 820n, a public bus line OOI 820i, a gas station OOI 820m, and twitter OOIs 820l. In one embodiment, a back arrow may allow a user to return to the previous screen. The sandbox, including details of the stored OOIs, may be stored on the local host, for example, the mobile device running the vbApp.

In one embodiment, the horizontal slider 842 may comprise predefined and/or user-defined labels for one or more OOIs 820a-820j stored in the sandbox. The labels may comprise sub-categories within the sandbox 822a. OOIs without an assigned label may keep their original category names, for example, a label assigned to the OOI by the vbSystem. For example, if a Facebook friend was added to the sandbox but no labeled was assigned, then "Facebook" may be displayed as an item in the horizontal slider 842 and may show the stored Facebook friend. FIG. 11B illustrates one embodiment comprising three user-defined labels: kids 822d, gas 822e, and commute 822f. In one embodiment, selection of a see all option 822g shows all OOIs of the sandbox, labeled or unlabeled. In one embodiment, OOIs may still appear in the OOI's original category even after they are moved to the sandbox and assigned user-defined logical names.

In one embodiment, the interface 840 comprise a search results area, a primary visual functions/indicators area, display areas that can be configured to show advertisements and/or messages, the horizontal slider 842, a secondary controls area, and/or other areas. In one embodiment, a Default Beam (dBeam) 846 is displayed on the interface. In a 2D View, the dBeam 846 comprises a length r (where r may be equal to the radius of the circle). In idle time, the dBeam 846 may move in a first direction, such as, for example, counter-clockwise. The dBeam 846 may stop when the dBeam 846 encounters an OOI icon. The vbApp may display details from the appropriate collections for the OOI.

In one embodiment, a use case: Open "Default Sandbox" as Main Scenario (with "Drop OOI into Default Sandbox" as Alternative Scenario) may be set. A Pre-Condition: "Persona" may be set by the user or the system. A Post-Condition: Sandbox may be Open with OOIs displayed in one section of the interface (or Sandbox has a new or updated OOI).

In one embodiment the vbApp flow may comprise:
1) vbApp conducts a search/discovery. Search results are rendered as small icons on the screen.
2) Horizontal slider is populated with recommendations and "categories."
3) User Decision:
   a) Take me to the Sandbox (open sandbox)
   b) Add/Drag/Drop OOI to the sandbox
3a) Users may open the Default Sandbox in two ways:
   (i) User checks/selects/touches "sandbox entry" in the horizontal slider.
   (ii) User touches and holds "sandbox icon" for a short length of time.
3b) Users may add/update OOIs to the Default Sandbox in different ways:
   (i) User may add OOI or group of OOIs from one collection into default sandbox. Similar to Bee Hive, dragging an OOI over the "sandbox icon" would add it to the Default Sandbox. System View does not change. Default Sandbox is not opened.
   (ii) "Add to Sandbox" is also available to the User as a function or custom beam. 3b-ii-1) User may "open" the function/beam list in one area of the interface, select "move to sandbox" beam/function, then chose OOI.
      1) User may touch the OOI icon, wait for the Beam List to appear, then select the "add to Sandbox" option from Beam List.
4) vbApp displays every OOI that is in the default Sandbox and meets the filtering conditions.

Figure 12:
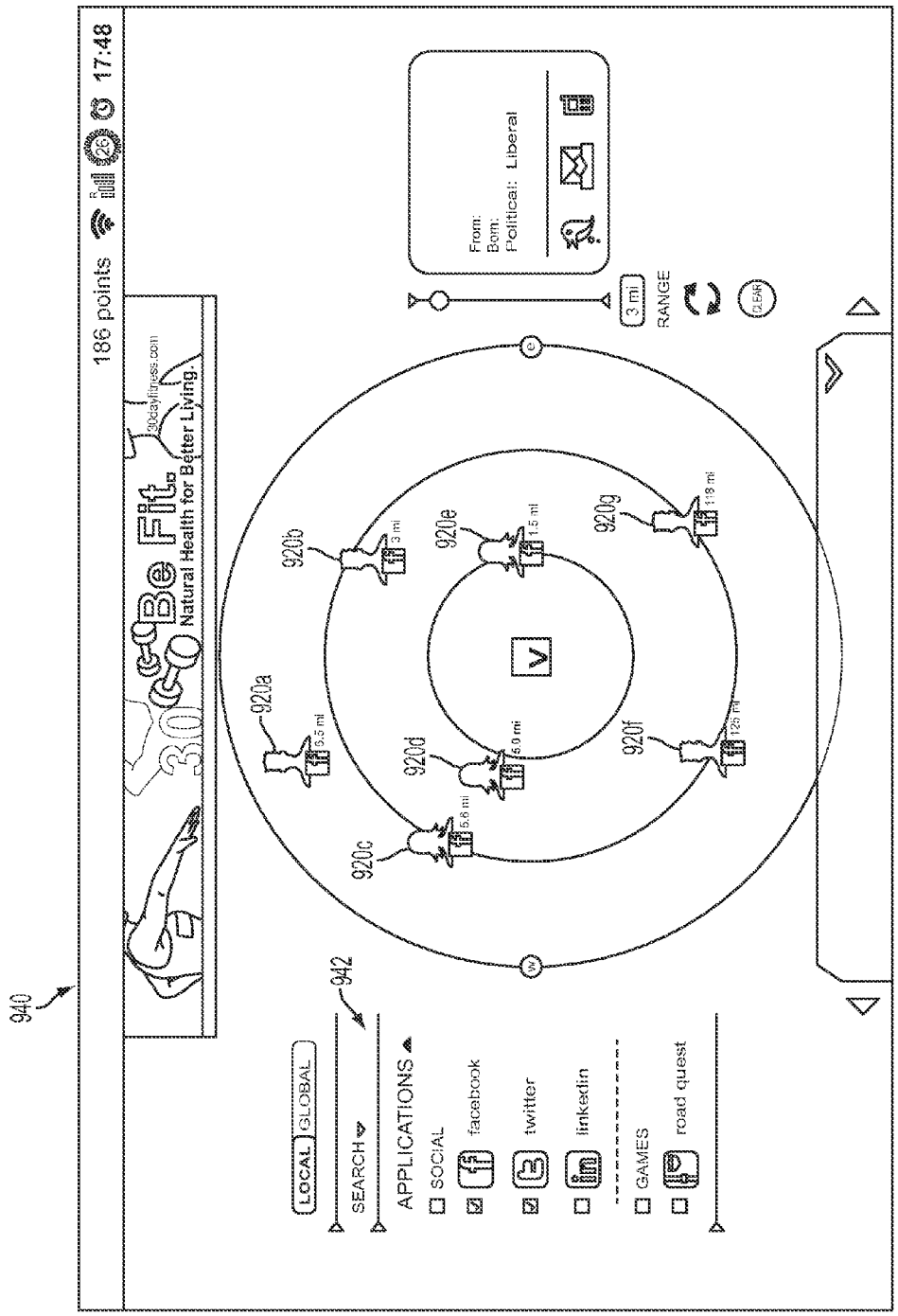
FIG. 12 illustrates one embodiment of a mobile device graphical interface.

FIG. 12 illustrates one embodiment of a display interface 940 for a vbApp executed by a mobile device. The display interface 940 is similar to the interface 840 discussed with respect to FIGS. 11A-11B. The display interface 940 displays a plurality of OOIs 920a-920g. The plurality of OOIs 920a-920g comprise a plurality of social contacts of the user. The OOIs 920a-920g are displayed on a radar-like screen for easy identification of location and distance of the OOIs 920a-920g. A vertical slider 942 comprises a plurality of vbSets. The user may limit the OOIs 920a-920g displayed on the interface 940 by selecting a vbSet. In some embodiments, a vbApp provides a means to the user to privately and securely save and recover data, including personal data and sandbox data. A vbServer may save a mirror copy of the sandbox data which a user may access through a vbApp or other vbSystem interface, as needed, such as, for example, for back-up purposes. In some embodiments, a vbApp uses a VB VPN to securely share networks with one or more other vbApps. The vbApp may share particular OOIs and/or complete networks and collections with other vbApps. A vbApp may use a VB graph exchange protocol to request operations on remote graph structure, including addition of an OOI to a remote sandbox. FIGS. 22A-22G and 23A-23E illustrate various embodiments of a user interface for a vbApp on a mobile device.

Figure 13:
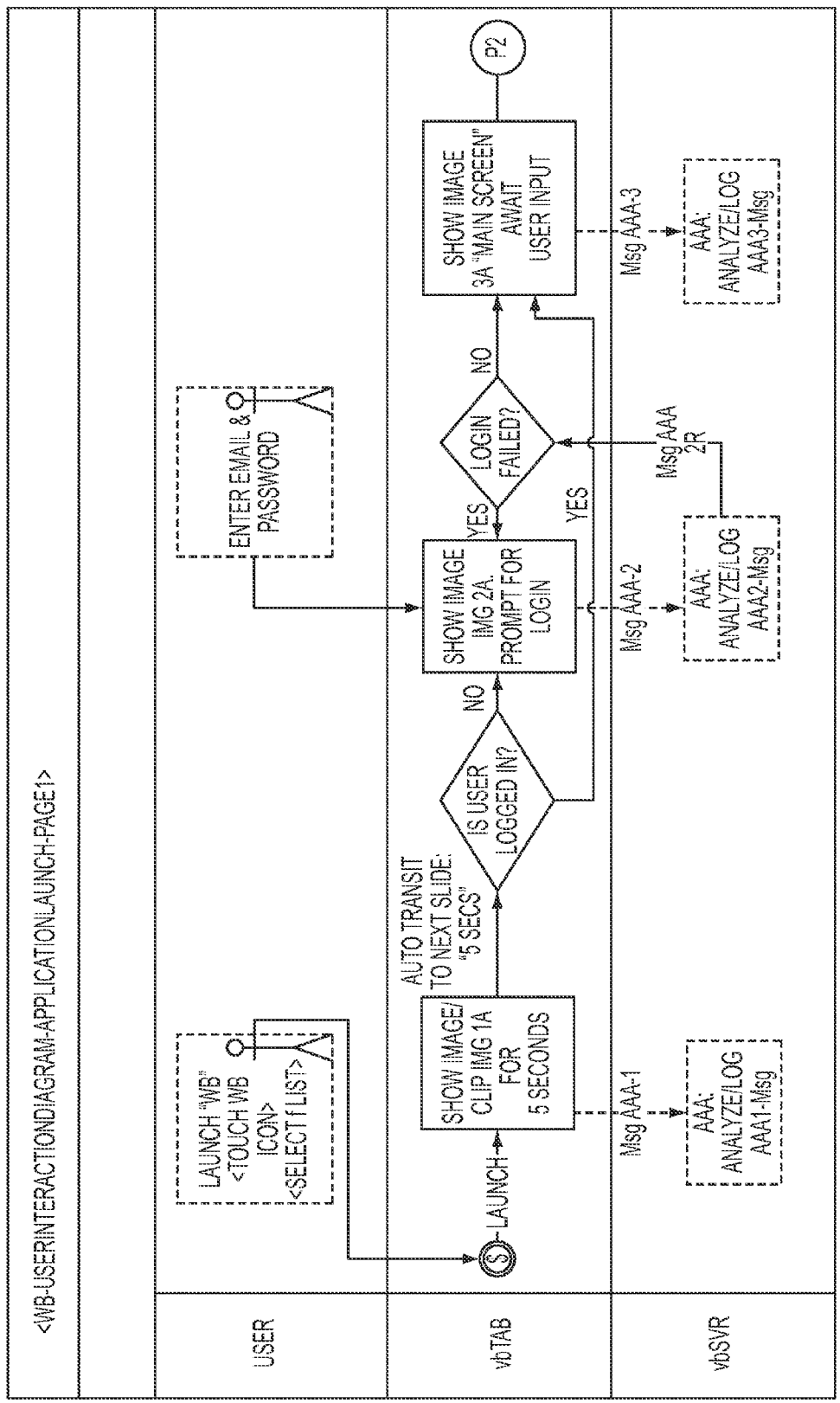
FIG. 13 illustrates one embodiment of a front-end/back-end system interactions of a vbApp and a vbServer.

FIG. 13 illustrates one embodiment of a front-end/back-end system interaction 1000 of a vbApp and a vbServer. A hand-off between a front-end device and a supporting vbServer, through an application programming interface (API) is illustrated. One or more applications, such as, for example, a vbApp, may connect to a vbServer and utilize the vbServer through plugins, APIs, or any other suitable interface. The APIs may comprise local, social, mobile, core, or any other type of API. The APIs may comprise local, social, mobile, core, and/or any other type of API. A vbApp may utilize both local and remote service APIs. In some embodiments, if a user request can entirely be processed and handled by a vbApp, autonomously, without engaging additional vbApps or the vbNet, than the request is processed locally. If a request is handled partially and/or completely on a remote host, the request is processed by a remote API call.

A vbNet API provides the means for the developer to design a broad range of features and applications to be built on top of the vbApp and vbNet. The vbNet provides a programming interface to create, modify, study, and/or analyze simple to complex structures. A vbApp can run vbNet logic locally and entirely on the local host and/or using remote functions that run on remove vbServers and/or other vbApps. In some embodiments, the distribution of logic and data depends on the capabilities of the devices and the desired configuration of the distributed association engine. In various embodiments, a vbApp uses remote APIs for operations and service-provider support systems, such as, for example, authentication of vbApp-enabled devices, third party system integration, mobile VPN management, public geo data repositories, and/or other service-provider support systems. In some embodiments, a vbApp will attempt to solve search and discovery problems autonomously on the local host without consulting a remote server and/or other vbApp, allowing a vbApp to respond to a user request faster and keeping private data and/or code on the local host. If the local host is incapable of solving the given problem autonomously, the vbApp will contact remote services, such as, for example, one or more additional vbApps and/or vbServers. In one embodiment, the core of the vbNet is the DTM software library. A vbNet may be used to model simple to complex networks for usage trend, user behavior, and/or other statistical and associative information. A vbApp uses the vbNet to model personal, professional, product and/or other graphs. The vbNet comprises a distributed architecture. In some embodiments, A vbNet node may operate stand alone or as part of a larger group, and logic and data both reside on the mobile device and need not leave the vbApp-enabled device.

Figure 14:
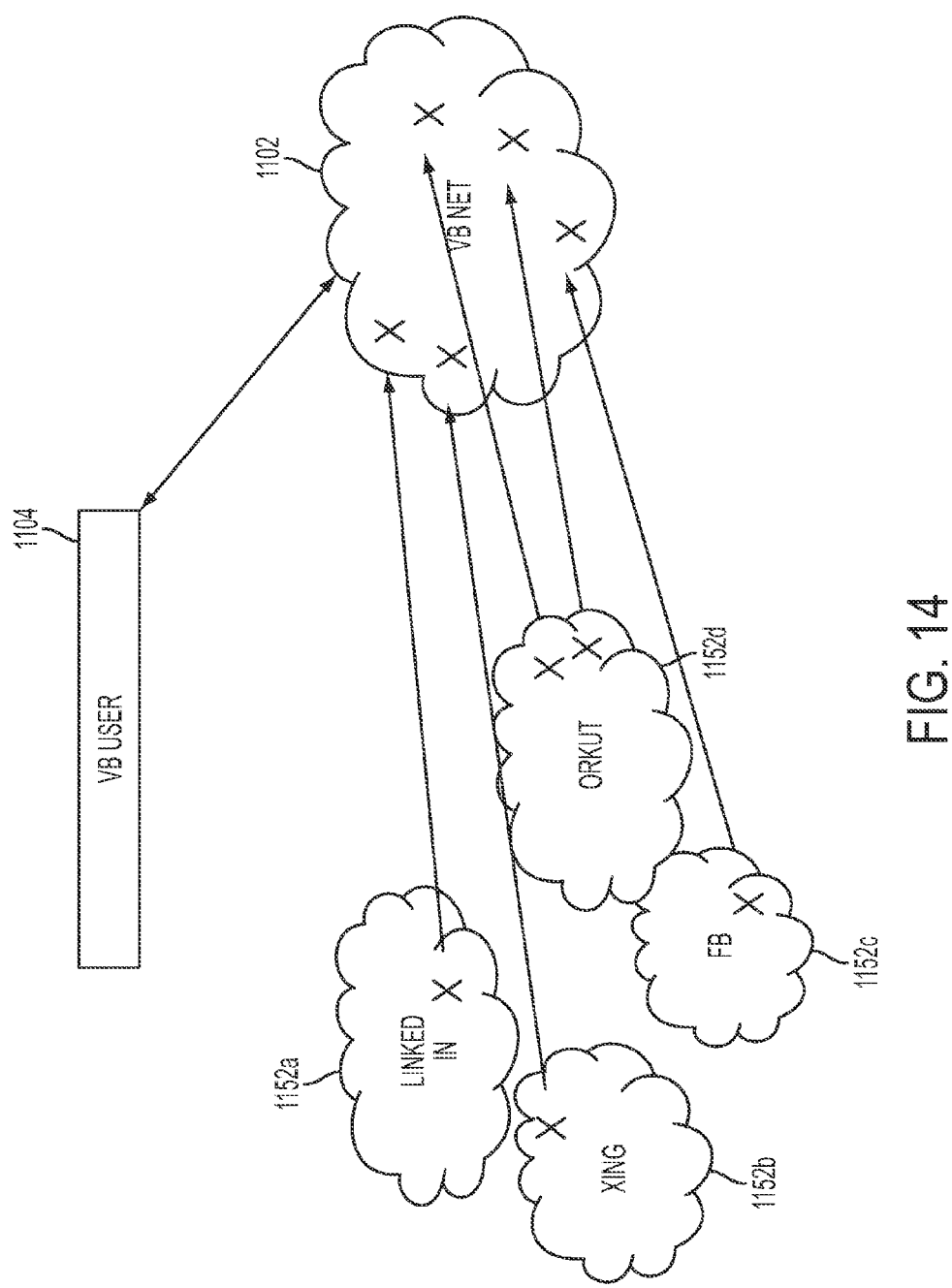
FIG. 14 illustrates one embodiment of a network environment in which a vbApp may operate.

FIG. 14 illustrates one embodiment of a network environment in which a vbApp 1104 may operate. A vbNet 1102 may be in communication with one or more social networks 1152a-1152d, such as, for example, Facebook, LinkedIn, Xing, and Orkut. A vbApp 1104 may create one or more unified layers of all social networking API's, allowing for complex mapping or grouping of friends on varying social networking platforms. The vbApp 1104 may access the social networking platforms through the vbNet 1102 allowing a single interface to all social networks.

In some embodiments, the vbNet implements specific behavioral identification and interaction systems. For example, in one embodiment, the vbNet implements a subscribe, describe, prescribe behavioral system. The subscribe, describe, prescribe behavioral system allows a user, such as, for example, an enterprise user, to identify one or more specific associations and/or behaviors that the enterprise user wishes to interact with. For example, in various embodiments, the subscribe, describe, prescribe behavioral system identifies one or more vbApp-enabled devices to receive targeted content, to exclude from a search, and/or to perform one or more interactions with.

In one embodiment, a user subscribes to a specific set of behaviors and/or associations. When a node within the vbNet, such as, for example, a vbApp enabled device, displays the specific set of behaviors and/or associations, the vbNet provides a notification to the user. The user may prescribe one or more interactions with the vbApp-enabled device comprising the subscribed behavior. For example, the user may generate targeted, context-specific content for the vbApp based on the subscribed set of behaviors and/or associations.

In one embodiment, a user may describe an object, such as, for example, an object of interest and/or a vbApp. The user may describe the object by identifying one or more associations, behaviors, or descriptors of the object. For example, in one embodiment, an enterprise user may specify target OOIs as anyone in Manhattan, going down an elevator between 11:00 AM and 1:00 PM, who has more than 5 connections on LinkedIn, and whose offices are less than five miles away from the user's approximate location at lunch time. describe an object representing a new store in a mall, In another embodiment, an enterprise user may describe a target OOI as anyone going up an escalator in a Target store in California. The user describes the object by describing the associations between the characteristics of the target OOIs and/or by describing the behavior and actions of the objects. The description of the object may further comprise a n-tuple comprising one or more descriptive terms.

In some embodiments, a user may prescribe a specific set of behaviors and/or associations that the user wishes to exclude from future interactions, such as, for example, searches. The user may identify a specific set of behaviors and/or associations, such as, for example, a relationship between a node and an OOI, and exclude any nodes on the vbNet that match the prescribed set of behaviors.

In some embodiments, the subscribe, describe, prescribe behavioral system is used to deliver content to a vbApp enabled device. For example, an enterprise user may subscribe to a specific set of behaviors that the enterprise user wishes to identify, such as, for example, a vbApp-enabled device having an association with one or more OOIs, located in a specific area, at a specific time. The enterprise user prescribes a behavior based on the frequency and connections of the vbApp-enabled device that meets the subscribed behaviors. The enterprise use may prescribe an action, such as, for example, displaying context information, advertisements, coupons, information, sales offers, additional suggested associations, and/or other interactions with the vbApp-enabled device.

In some embodiments, the subscribe, describe, prescribe behavioral system is used by a vbNet to solve complex problems using large data sets. For example, the vbNet may be configured to assist in research, such as, for example, medical research, by assigning data points as OOIs within a virtual space and applying the subscribe, describe, prescribe framework to identify connections, patterns, and/or changes in the data set. In some embodiments, the vbNet is configured to establish one or more supernets connecting research from multiple fields and/or multiple institutions. Because the vbNet is platform agnostic, the vbNet may interact with any data set provided.

In some embodiments, the subscribe, describe, prescribe behavioral system is configured to provide directed information to vbApp-enabled devices, such as, for example, by providing mobile advertisements. The directed information is provided to one or more vbApp-enabled devices comprising one or more associations and/or behaviors, such as, for example, position, orientation, altitude, OOIs in a sandbox, connections to OOIs, and/or other contextual information. The contextual information is automatically identified by the vbNet without the need for the user to provide this information. In some embodiments, the directed information is displayed by the vbApp-enabled device, for example, on a display screen integral with the vbApp-enabled device. The directed information may provide additional information about the vbApp's surrounding, such as, for example, providing directed information regarding landmarks, stores, and/or other objects located in proximity to the vbApp-enabled device.

In some embodiments, the subscribe, describe, prescribe behavioral system is used to monitor one or more nodes. For example, in one embodiment, one or more nodes in the vbNet may represent patients within a hospital. Each patient wears a device that tracks movement, position, orientation, and/or additional characteristics. A doctor and/or hospital staff utilizes a vbApp-enabled device to describe a set of behaviors that indicate that a patient requires attention by medical personal. The vbApp-enabled device subscribes to this set of behaviors and receives a notification each time the described nodal activity is detected.

Figure 15:
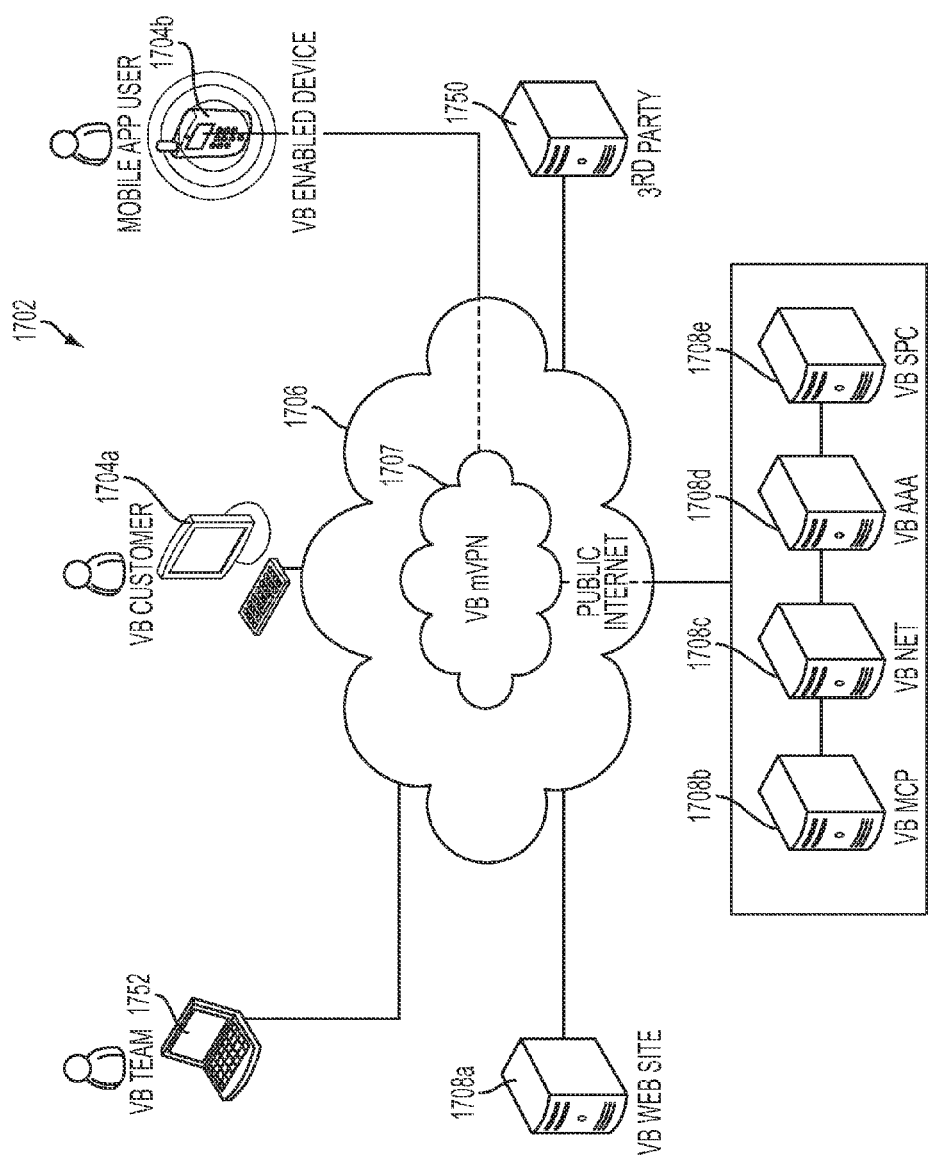
FIGS. 15-16 illustrate various embodiments of a vbNet comprising a plurality of vbApps and vbServers.
Figure 16:
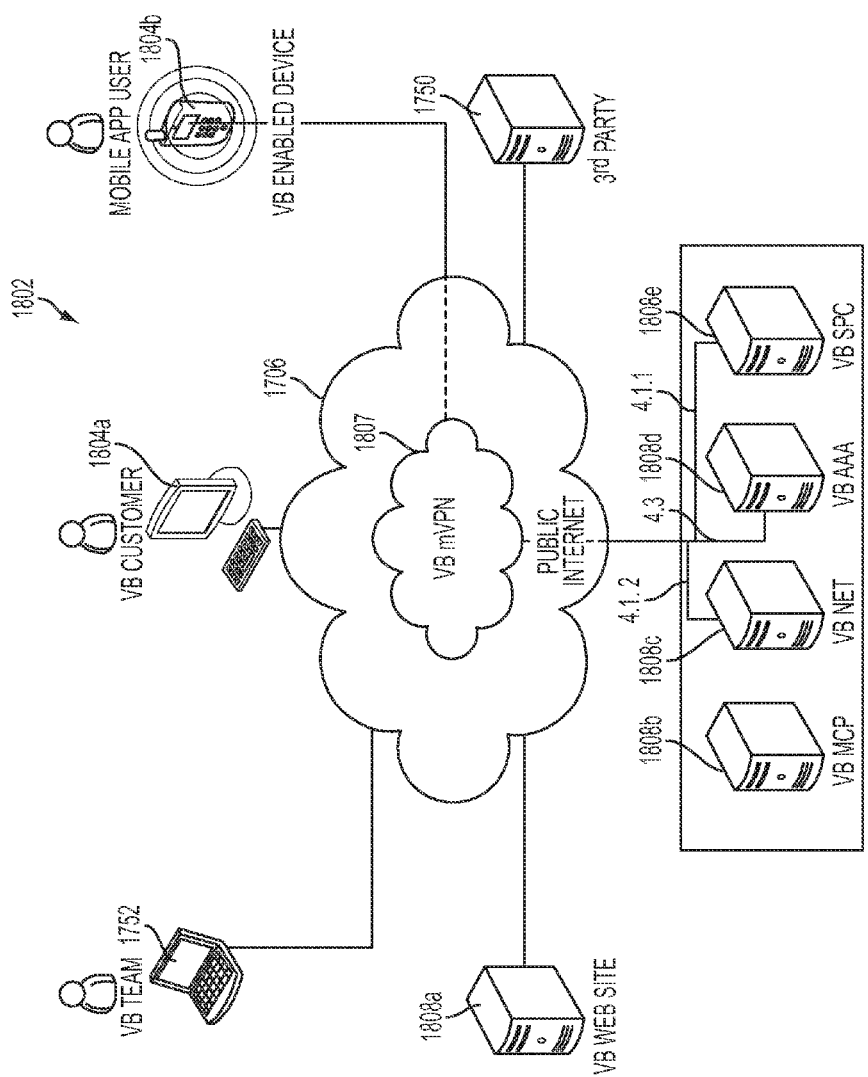

FIGS. 15-16 illustrates various embodiments of a vbNet 1702 comprising a plurality of vbApp-enabled devices 1704a-1704b and a plurality of vbServers 1708a-1708e. The plurality of vbServers 1708a-1708e provide one or more of the network functions discussed above, such as, for example, a vbServer 1208c configured to maintain a supernet of the nodal networks, a supernet of personal networks that vbApp-enabled devices have shared with vbServers over time, and/or a vbServer 1208e configured to implement a vbSPC spatial boundary modeler. In some embodiments, the vbServers 1708a-1708e communicate with the vbApp-enabled devices 1704a-1704b through a network 1706, such as, for example, the internet. A virtual private network (VPN) 1207 provides a secure communication channel between the vbApp-enabled devices 1704a-1704b and the vbServers 1708b-1708e.

In some embodiments, a vbApp-enabled device, such as, for example, a mobile device 1704b, is in communication with one or more of the vbServers 1708a-1708e. The vbApp-enabled device 1704b provides information, such as, for example, associations between the vbApp and one or more OOIs, sensor information, instrumentation data, management data, signaling data, and/or other types of data. The sensor information and/or the instrumentation data is used for location and tracking the position of the vbApp-enabled device 1704b. In various embodiments, motion-sensor data from gyroscopes, accelerometers, and/or magnetometers is processed on the vbApp-enabled mobile device. In embodiments in which the vbApp-enabled device has limited computing resources, the vbApp sends the collected sensor data to a vbServer 1708b-1708e for further processing and analytics, such as, for example, execution of motion and/or activity-recognition algorithms. The management information and/or the signaling information is used to provide communication between the vbApp-enabled device 1704b and the rest of the vbNet 1702.

In some embodiments, a vbApp-enabled device 1704a, 1704b interacts with the vbNet 1702 to provide a user interface. The vbApp-enabled device 1704b interacts with the vbServers 1708b-1708e to provide a behavioral analysis model, such as, for example, a subscribe, describe, prescribe behavioral model. An enterprise vbApp-enabled device 1704a (or other authorized vbApp-enabled device) provides a graphical or textual programming interface, through which a user can specify and/or identify ("Describe") one or more patterns, or combinations of associations and/or behaviors, that an enterprise user wishes to monitor. A pattern may be modeled, for example, as associations built between objects, for example, to form a path, a link, a topological structure, and/or other associations. In one embodiments, the enterprise vbApp-enabled device 1704a interacts with a VB web site 1708e to communicate to the vbServer 1708c the patterns of interest the user wishes to subscribe to. In one embodiment, a vbServer 1708c may instruct one or more vbApp-enabled devices to look for patterns, or graphs, of interest. A user may subscribe to patterns stored on one or more vbServers and/or may describe and add new patterns of interest to the vbNet 1702. The enterprise vbApp-enabled device 1704a may prescribe one or more tasks to be performed by the vbNet 1702 when a specific pattern of interest is detect, discovered, or reported by a vbApp-enabled device 1704b and/or a vbServer 1708c. The vbNet 1702 provides means to formally describe and/or verify graph or pattern descriptions of interest. The description of a graph or pattern of interest carries the description of a single graph and/or multiple graphs, sub-graphs, nodes, supernodes, supernets, and/or other vbNet 1702 objects.

In one embodiment, the describe, subscribe, prescribe behavioral model allows a user to interact with the vbNet 1702 in three steps: a describe step, a subscribe step, and a prescribe step. In the describe step, a user, using a vbApp-enabled device, defines what patterns, collections, activities, behaviors, motion, orientation, and/or other parameter the user is interested in. The describe step enables a user to specify a graph structure of interest, for example, by identifying which mobile devices and/or other objects or devices should be attempting to identify the patterns of interest, spending time detecting patterns, and/or reporting the discovery of patterns. In the subscribe step, a user defines which vbApp-enabled target devices and/or users should look for and/or subscribe to the described patterns and/or criteria. In the prescribe (or prescription) step, the user identifies what actions should be taken by the vbNet 1702 when a certain collection, permutation, path, activity, pattern, behavior, criteria, and/or other entity, object, or net is discovered. The prescribed action may include, for example, shutting down a vbApp-enabled device, changing properties of sensors and/or actuator hardware, displaying a specific message or advertisement to the user of the vbApp-enabled device which detected and reported pattern and/or to other vbApp-enabled devices, informing a designated server, such as, for example, a third party server 1750, that the pattern occurred and entities have reported the pattern, and/or any other suitable action. For example, in one embodiment, the enterprise vbApp-enabled device 1704*a* may prescribe an interaction with a vbApp-enabled device 1704*b* that matches a subscribed pattern. The prescribed action may comprise, for example, delivering content to the vbApp-enabled device 1704*b*, excluding the vbApp-enabled device from future search, and/or providing one or more additional interactions with the identified vbApp-enabled device 1704*b*.

With reference now to FIG. 16, in some embodiments, a vbApp-enabled device 1804*b* is required to register with the vbNet prior to interacting with the vbServers 1808*a*-1808*e* and/or other vbNet 1802 objects. A user downloads a vbApp to a user device, such as, for example, the mobile device 1804*b*. The user installs and activates the vbApp, which contacts one or more of the vbServers 1808*a*-1808*e* through a VPN 1707. A vbServer 1808*d* registers the vbApp and assigns a unique node ID to the vbApp-enabled device 1804*a*. A secure channel is established between the vbApp-enabled mobile device 1804*a* and the vbNet 1802 through the VPN 1807. The vbApp-enabled mobile device 1804*a* and the vbNet 1802 may exchange information regarding the vbApp's nodal, or personal, network. The vbNet is enabled to generate virtual spaces, learn associations and identify OOIs, model the OOIs and associations in data structures through nodes, super nodes, nets, super nets, and other objects, create ad-hoc associations, search along multi-dimensional paths on a local host, exchange graph descriptions between graph exchange protocols, generate private point-to-point channels with high secure encryption, enable interaction of vbApp-enabled devices through the exchange and description protocols, signal channel and/or management control, change the properties of one or more devices, generate domain specific modules to convert domain specific structure into vbNet agnostic models, generate multi-point visualization, and/or perform additional operations.

Figure 17:
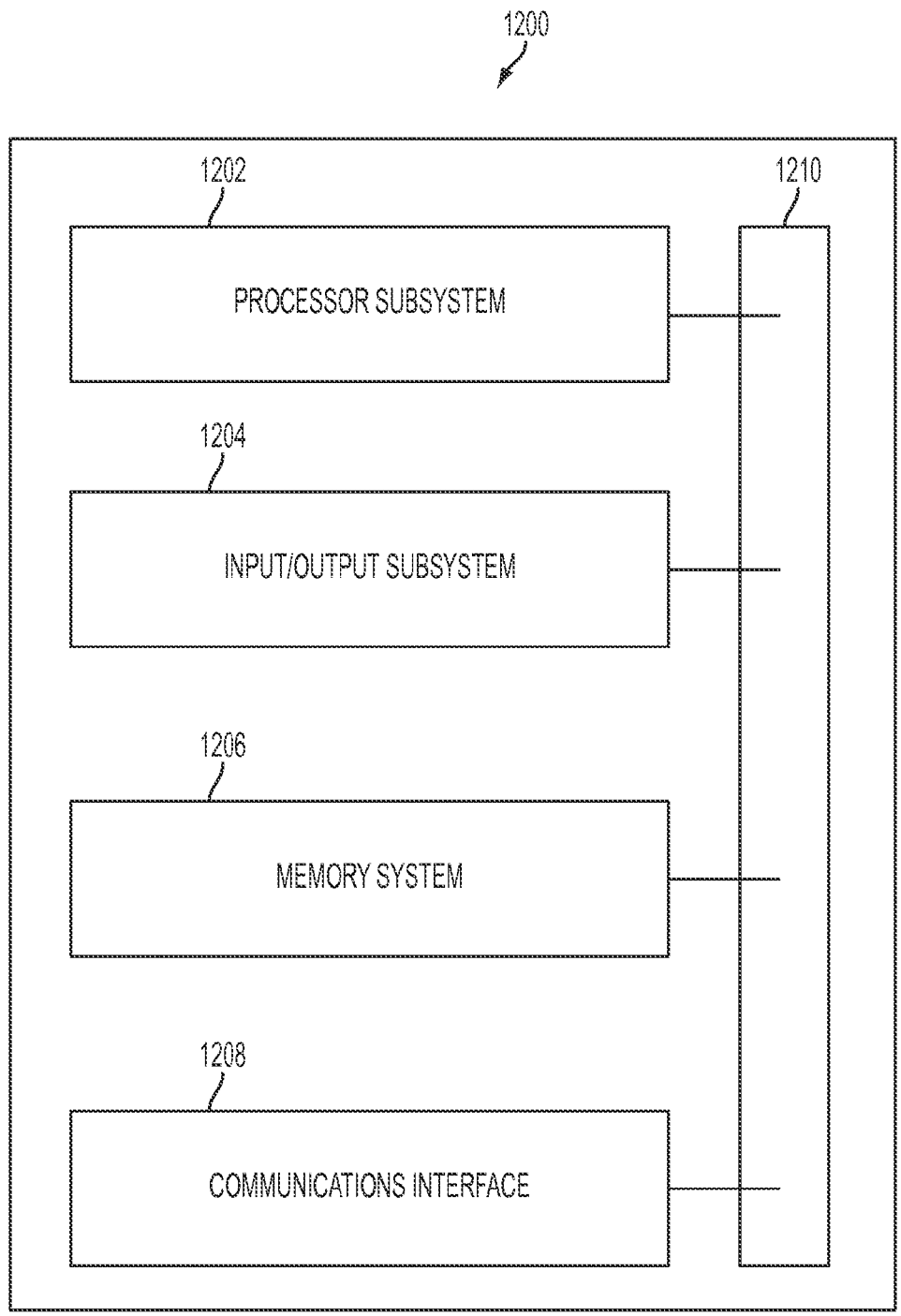
FIGS. 17-20 illustrate one embodiment of a mobile computing device configured to implement a vbApp.

FIG. 17 is a schematic view of an illustrative electronic device 1200 capable of implementing a vbApp application. Electronic device 1200 may comprise a processor subsystem 1202, an input/output subsystem 1204, a memory subsystem 1206, a communications interface 1208, and a system bus 1210. In some embodiments, one or more of the electronic device 1200 components may be combined or omitted such as, for example, not including the communications interface 1208. In some embodiments, the electronic device 1200 may comprise other components not combined or comprised in those shown in FIG. 17. For example, the electronic device 1200 also may comprise a power subsystem. In other embodiments, the electronic device 1200 may comprise several instances of the components shown in FIG. 17. For example, the electronic device 1200 may comprise multiple memory subsystems 1206. For the sake of conciseness and clarity, and not limitation, one of each of the components is shown in FIG. 17.

The processor subsystem 1202 may comprise any processing circuitry operative to control the operations and performance of the electronic device 1200. In various aspects, the processor subsystem 1202 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, and/or other processing device. The processor subsystem 902 also may be implemented by a controller, a microcontroller, an application specific integrated circuit (ASIC), a field programmable gate array (FPGA), a programmable logic device (PLD), and so forth.

In various aspects, the processor subsystem 1202 may be arranged to run an operating system (OS) and various mobile applications. Examples of an OS comprise, for example, operating systems generally known under the trade name of Apple OS, Microsoft Windows OS, Android OS, and any other proprietary or open source OS. Examples of mobile applications comprise, for example, a telephone application, a camera (e.g., digital camera, video camera) application, a browser application, a multimedia player application, a gaming application, a messaging application (e.g., email, short message, multimedia), a viewer application, a vbApp, and so forth.

In some embodiments, the electronic device 1200 may comprise a system bus 1210 that couples various system components including the processing subsystem 1202, the input/output subsystem 1204, and the memory subsystem 1206. The system bus 1210 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for mobile computing device applications.

Figure 18:
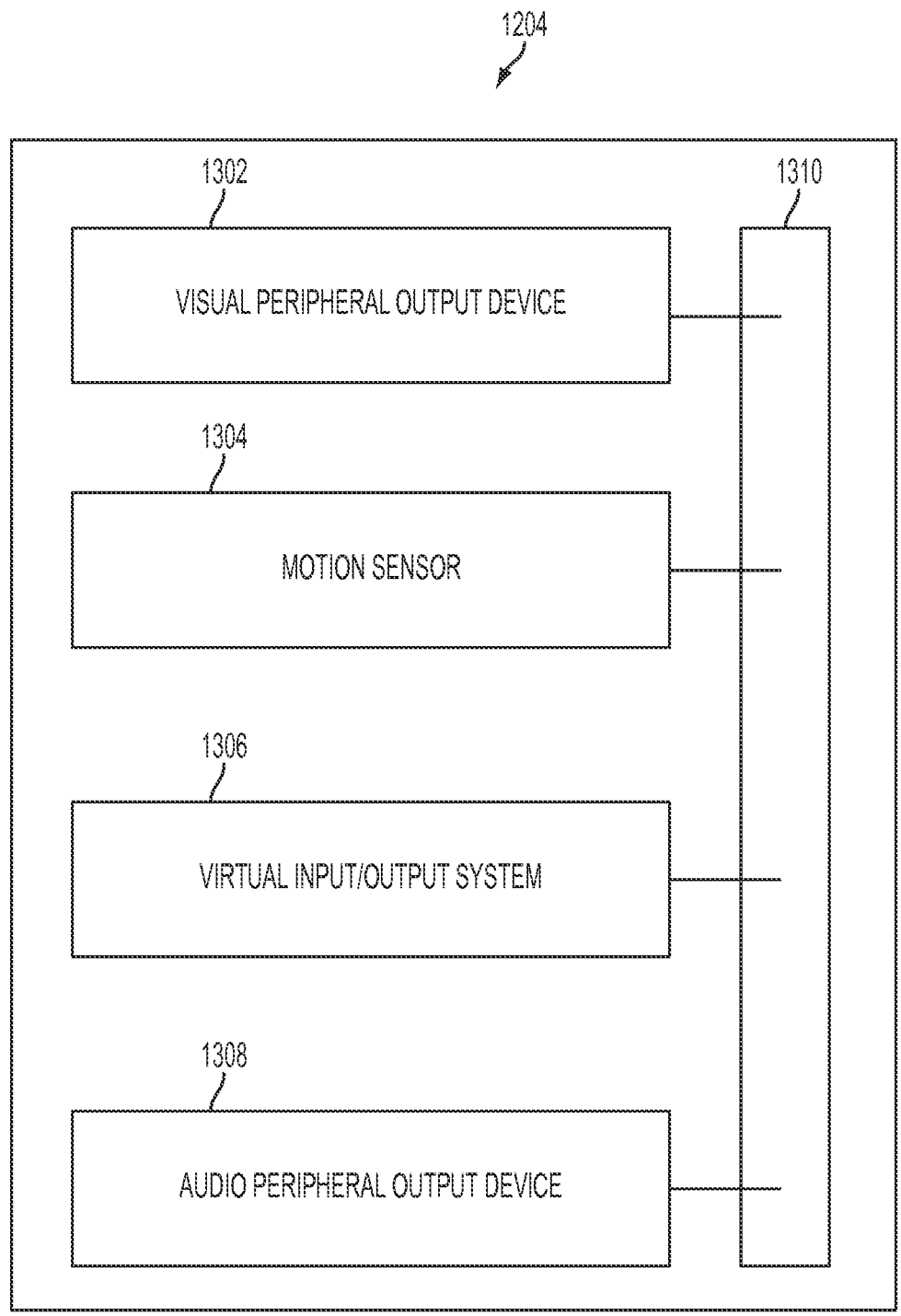

FIG. 18 shows one embodiment of the input/output subsystem 1204 of the electronic device 1200 shown in FIG. 17. The input/output subsystem 1204 may comprise any suitable mechanism or component to at least enable a user to provide input to the electronic device 1200 and the electronic device 1200 to provide output to the user. For example, the input/output subsystem 1204 may comprise any suitable input mechanism, including but not limited to, a button, keypad, keyboard, click wheel, touch screen, or motion sensor. In some embodiments, the input/output subsystem 904 may comprise a capacitive sensing mechanism, or a multi-touch capacitive sensing mechanism. Descriptions of capacitive sensing mechanisms can be found in U.S. Patent Application Publication No. 2006/0026521, entitled "Gestures for Touch Sensitive Input Device" and U.S. Patent Publication No. 2006/0026535, entitled "Mode-Based Graphical User Interfaces for Touch Sensitive Input Device," both of which are incorporated by reference herein in their entirety. It will be appreciated that any of the input mechanisms described herein may be implemented as physical mechanical components, virtual elements, and/or combinations thereof.

In some embodiments, the input/output subsystem 1204 may comprise specialized output circuitry associated with output devices such as, for example, an audio peripheral output device 1308. The audio peripheral output device 1308 may comprise an audio output including one or more speakers integrated into the electronic device 1200. The speakers may be, for example, mono or stereo speakers. The audio peripheral output device 1308 also may comprise an audio component remotely coupled to audio peripheral output device 1308 such as, for example, a headset, headphones, and/or ear buds which may be coupled to the audio peripheral output device 1308 through the communications subsystem 1208.

In some embodiments, the input/output subsystem 1204 may comprise a visual peripheral output device 1302 for providing a display visible to the user. For example, the visual peripheral output device 1302 may comprise a screen such as, for example, a Liquid Crystal Display (LCD) screen, incorporated into the electronic device 1200. As another example, the visual peripheral output device 1302 may comprise a movable display or projecting system for providing a display of content on a surface remote from the electronic device 1200. In some embodiments, the visual peripheral output device 1302 can comprise a coder/decoder, also known as a Codec, to convert digital media data into analog signals. For example, the visual peripheral output device 1302 may comprise video Codecs, audio Codecs, or any other suitable type of Codec.

The visual peripheral output device 1302 also may comprise display drivers, circuitry for driving display drivers, or both. The visual peripheral output device 1302 may be operative to display content under the direction of the processor subsystem 1202. For example, the visual peripheral output device 1302 may be able to play media playback information, application screens for application implemented on the electronic device 1200, information regarding ongoing communications operations, information regarding incoming communications requests, or device operation screens, to name only a few.

In some embodiments, the input/output subsystem 1204 may comprise a motion sensor 1304. The motion sensor 1304 may comprise any suitable motion sensor operative to detect movements of electronic device 1200. For example, the motion sensor 1304 may be operative to detect acceleration or deceleration of the electronic device 1200 as manipulated by a user. In some embodiments, the motion sensor 1304 may comprise one or more three-axis acceleration motion sensors (e.g., an accelerometer) operative to detect linear acceleration in three directions (i.e., the x or left/right direction, the y or up/down direction, and the z or forward/backward direction). As another example, the motion sensor 1304 may comprise one or more two-axis acceleration motion sensors which may be operative to detect linear acceleration only along each of x or left/right and y or up/down directions (or any other pair of directions). In some embodiments, the motion sensor 1304 may comprise an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion sensor 1304 may be operative to directly detect rotation, rotational movement, angular displacement, tilt, position, orientation, motion along a non-linear (e.g., arcuate) path, or any other non-linear motions. For example, when the motion sensor 1304 is a linear motion sensor, additional processing may be used to indirectly detect some or all of the non-linear motions. For example, by comparing the linear output of the motion sensor 1304 with a gravity vector (i.e., a static acceleration), the motion sensor 1304 may be operative to calculate the tilt of the electronic device 1200 with respect to the y-axis. In some embodiments, the motion sensor 1304 may instead or in addition comprise one or more gyro-motion sensors or gyroscopes for detecting rotational movement. For example, the motion sensor 1304 may comprise a rotating or vibrating element.

In some embodiments, the motion sensor 1304 may comprise one or more controllers (not shown) coupled to the accelerometers or gyroscopes. The controllers may be used to calculate a moving vector of the electronic device 1200. The moving vector maybe determined according to one or more predetermined formulas based on the movement data (e.g., x, y, and z axis moving information) provided by the accelerometers or gyroscopes.

In some embodiments, the input/output subsystem 1204 may comprise a virtual input/output system 1306. The virtual input/output system 1306 is capable of providing input/output options by combining one or more input/output components to create a virtual input type. For example, the virtual input/output system 1306 may enable a user to input information through an on-screen keyboard which utilizes the touch screen and mimics the operation of a physical keyboard or using the motion sensor 1304 to control a pointer on the screen instead of utilizing the touch screen. As another example, the virtual input/output system 1306 may enable alternative methods of input and output to enable use of the device by persons having various disabilities. For example, the virtual input/output system 1306 may convert on-screen text to spoken words to enable reading-impaired persons to operate the device.

Figure 19:
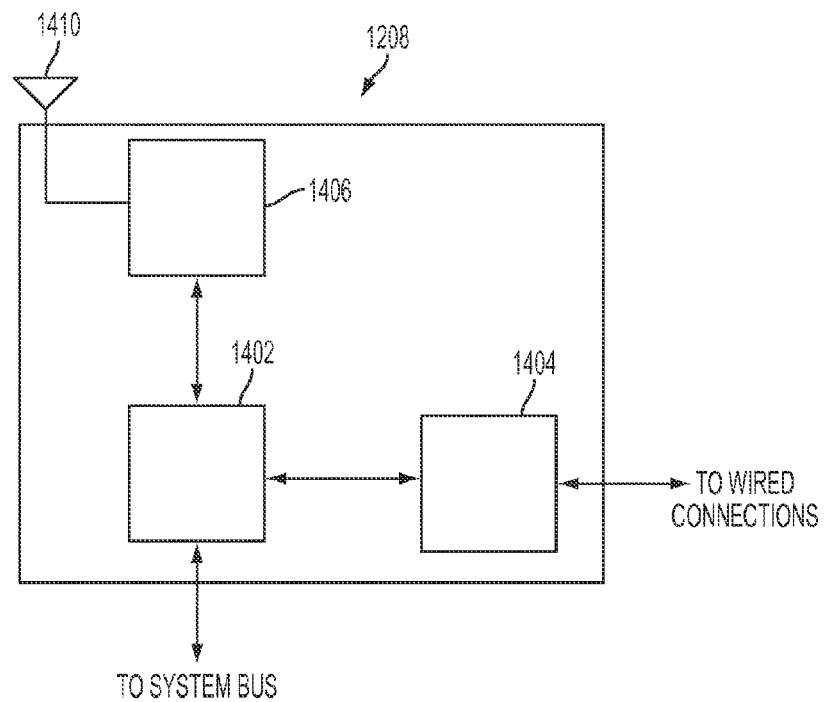

FIG. 19 shows one embodiment of the communication interface 1208. The communications interface 1208 may comprises any suitable hardware, software, or combination of hardware and software that is capable of coupling the electronic device 1200 to one or more networks and/or devices. The communications interface 1208 may be arranged to operate with any suitable technique for controlling information signals using a desired set of communications protocols, services or operating procedures. The communications interface 1208 may comprise the appropriate physical connectors to connect with a corresponding communications medium, whether wired or wireless.

Vehicles of communication may comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 1208 may comprise one or more interfaces such as, for example, a wireless communications interface 1406, a wired communications interface 1304, a network interface, a transmit interface, a receive interface, a media interface, a system interface, a component interface, a switching interface, a chip interface, a controller, and so forth. When implemented by a wireless device or within wireless system, for example, the communications interface 1208 may comprise a wireless interface 1406 comprising one or more antennas 1410, transmitters, receivers, transceivers, amplifiers, filters, control logic, and so forth.

In various aspects, the communications interface 1208 may provide voice and/or data communications functionality in accordance with different types of cellular radiotelephone systems. In various implementations, the described aspects may communicate over wireless shared media in accordance with a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described aspects may comprise part of a cellular communication system. Examples of cellular communication systems may comprise CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G) wireless standards, and so forth.

Figure 20:
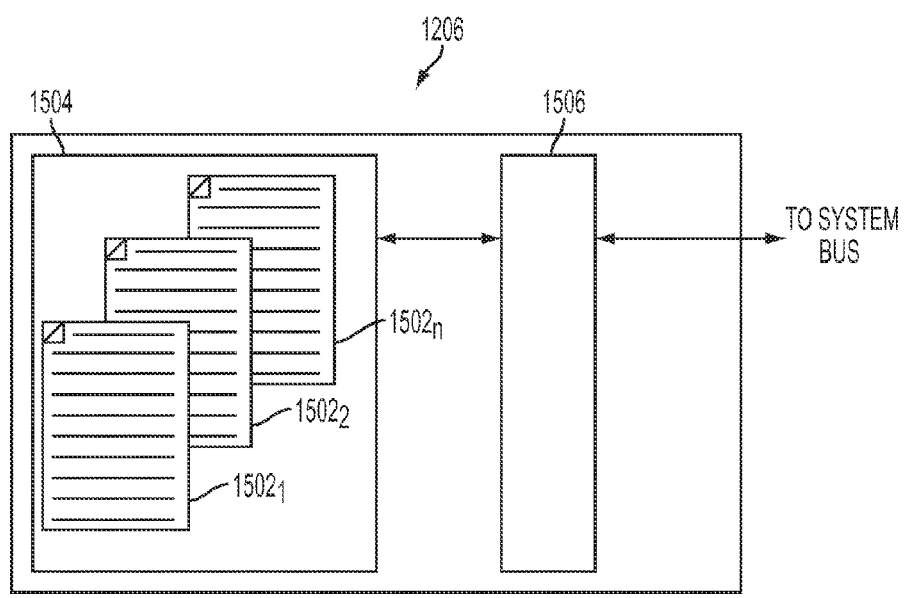

FIG. 20 shows one embodiment of the memory subsystem 1206. The memory subsystem 1206 may comprise any machine-readable or computer-readable media capable of storing data, including both volatile/non-volatile memory and removable/non-removable memory. The memory subsystem 1206 may comprise at least one non-volatile memory unit 1502. The non-volatile memory unit 1502 is capable of storing one or more software programs $1504_1$-$1504_n$. The software programs $1504_1$-$1504_n$ may contain, for example, applications, user data, device data, and/or configuration data, or combinations therefore, to name only a few. The software programs $1504_1$-$1504_n$ may contain instructions executable by the various components of the electronic device 1200.

In various aspects, the memory subsystem 1206 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the memory subsystem 1206 may contain a software program for implementing a vbApp using the capabilities of the mobile computing device 1200. In one embodiment, the memory subsystem 1206 may contain an instruction set, in the form of a file $1504_n$, for executing a vbApp on the mobile computing device 1200. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or NET programming. In some embodiments a compiler or interpreter is comprised to convert the instruction set into machine executable code for execution by the processing subsystem 1202. Examples of virtual and other objects stored on a local device, for example, voice message, recording, picture, temporarily or for a time period to be shared, such as recordings and pictures or other data on the local device Examples of handheld mobile devices suitable for implementing the system and method of distributed self-similar learning using mobile computing devices comprise, but are not limited to: the Apple iPhone™ and iPod™; RIM Blackberry® Curve™, Pearl™, Storm™, and Bold™; Hewlett Packard Veer; Palm® (now HP) Pixi™, Pre™ Google Nexus S™, Motorola DEFY™, Droid (generations 1-3), Droid X, Droid X2, Flipside™, Atrix™, and Citrus™; HTC Incredible™, Inspire™, Surround™ EVO™, G2™, HD7, Sensation™, Thunderbolt™, and Trophy LG Fathom™, Optimus T™, Phoenix™, Quantum™, Revolution™, Rumor Touch™, and Vortex™; Nokia Astound™ Samsung Captivate™, Continuum™, Dart™, Droid Charge™, Exhibit™, Epic™, Fascinate™, Focus™, Galaxy S™, Gravity™, Infuse™, Replenish™, Seek™, and Vibrant™; Pantech Crossover; T-Mobile® G2™, Comet™, myTouch™; Sidekick®; Sanyo Zio™; Sony Ericsson Xperia™ Play.

Examples of tablet computing devices suitable for implementing the system and method of distributed self-similar learning using mobile computing devices comprise, but are not limited to: Acer Iconia Tab A500, the Apple iPad™ (1 and 2), Asus Eee Pad Transformer, Asus Eee Slate, Coby Kyros, Dell Streak, Hewlett Packard TouchPad, Motorola XOOM, Samsung Galaxy Tab, Archos 101 internet tablet, Archos 9 PC tablet, Blackberry PlayBook, Hewlett Packard Slate, Notion ink Adam, Toshiba Thrive, and the Viewsonic Viewpad.

Figure 21:
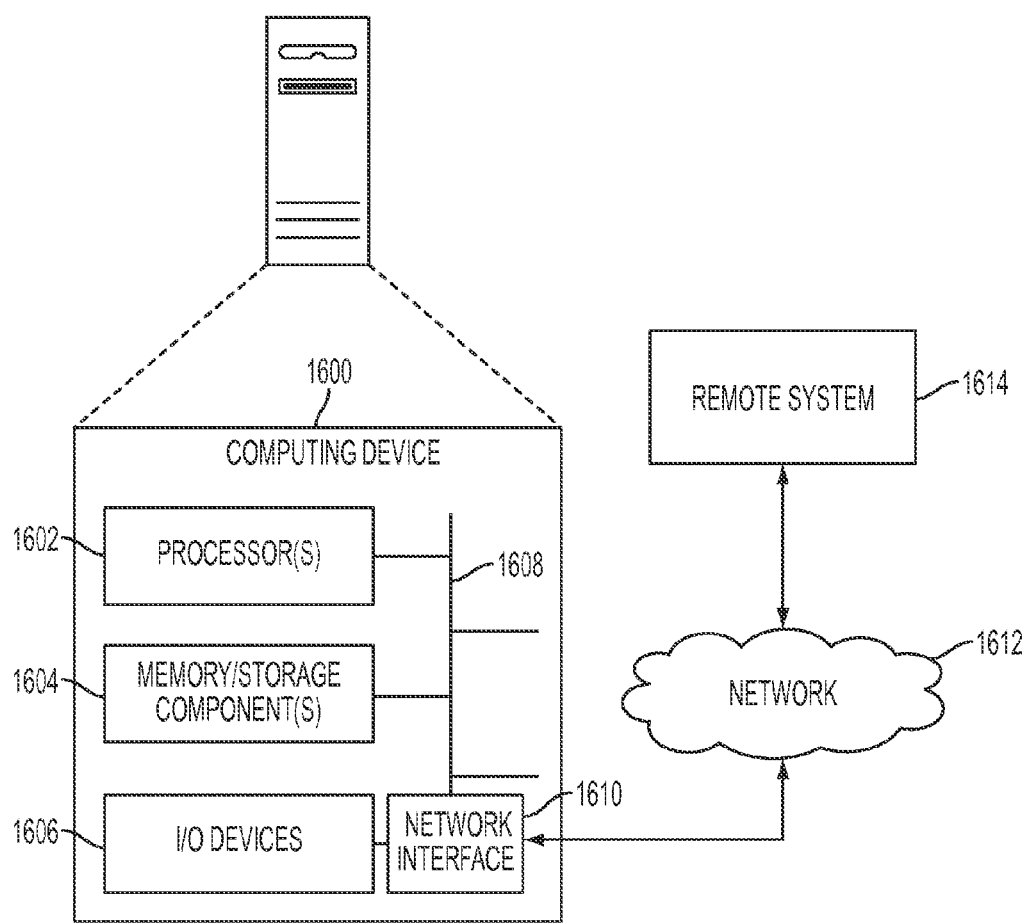
FIG. 21 illustrates one embodiment of a computing device configured to implement a vbServer.

FIG. 21 shows one embodiment of a computing device 1600 which may implement one embodiment of the virtual beam server. For the sake of clarity, the computing device 1600 is shown and described here in the context of a single computing device. It is to be appreciated and understood, however, that any number of suitably configured computing devices can be used to implement any of the described embodiments. For example, in at least some implementation, multiple communicatively linked computing devices are used. One or more of these devices can be communicatively linked in any suitable way such as via one or more networks (LANs), one or more wide area networks (WANs) or any combination thereof.

In this example, the computing device 1600 comprises one or more processor circuits or processing units 1602, on or more memory circuits and/or storage circuit component(s) 1604 and one or more input/output (I/O) circuit devices 1606. Additionally, the computing device 1600 comprises a bus 1608 that allows the various circuit components and devices to communicate with one another. The bus 1608 represents one or more of any of several types of bus structures, including a memory bus or local bus using any of a variety of bus architectures. The bus 1608 may comprise wired and/or wireless buses.

The processing unit 1602 may be responsible for executing various software programs such as system programs, applications programs, and/or module to provide computing and processing operations for the computing device 1600. The processing unit 1602 may be responsible for performing various voice and data communications operations for the computing device 1600 such as transmitting and receiving voice and data information over one or more wired or wireless communication channels. Although the processing unit 1602 of the computing device 1600 includes single processor architecture as shown, it may be appreciated that the computing device 1600 may use any suitable processor architecture and/or any suitable number of processors in accordance with the described embodiments. In one embodiment, the processing unit 1600 may be implemented using a single integrated processor.

The processing unit 1602 may be implemented as a host central processing unit (CPU) using any suitable processor circuit or logic device (circuit), such as a as a general purpose processor. The processing unit 1602 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1602 may be coupled to the memory and/or storage component(s) 1604 through the bus 1608. The memory bus 1608 may comprise any suitable interface and/or bus architecture for allowing the processing unit 1602 to access the memory and/or storage component(s) 1604. Although the memory and/or storage component(s) 1504 may be shown as being separate from the processing unit 1602 for purposes of illustration, it is worthy to note that in various embodiments some portion or the entire memory and/or storage component(s) 1604 may be included on the same integrated circuit as the processing unit 1602. Alternatively, some portion or the entire memory and/or storage component(s) 1604 may be disposed on an integrated circuit or other medium (e.g., hard disk drive) external to the integrated circuit of the processing unit 1602. In various embodiments, the computing device 1300 may comprise an expansion slot to support a multimedia and/or memory card, for example.

The memory and/or storage component(s) 1604 represent one or more computer-readable media. The memory and/or storage component(s) 1604 may be implemented using any computer-readable media capable of storing data such as volatile or non-volatile memory, removable or non-removable memory, erasable or non-erasable memory, writeable or re-writeable memory, and so forth. The memory and/or storage component(s) 1604 may comprise volatile media (e.g., random access memory (RAM)) and/or nonvolatile media (e.g., read only memory (ROM), Flash memory, optical disks, magnetic disks and the like). The memory and/or storage component(s) 1604 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1606 allow a user to enter commands and information to the computing device 1600, and also allow information to be presented to the user and/or other components or devices. Examples of input devices include a keyboard, a cursor control device (e.g., a mouse), a microphone, a scanner and the like. Examples of output devices include a display device (e.g., a monitor or projector), speakers, a printer, a network card, etc.). The computing device 1600 may comprise an alphanumeric keypad coupled to the processing unit 1602. The keypad may comprise, for example, a QWERTY key layout and an integrated number dial pad. The computing device 1600 may comprise a display coupled to the processing unit 1602. The display may comprise any suitable visual interface for displaying content to a user of the computing device 1600. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1602 may be arranged to provide processing or computing resources to the computing device 1600. For example, the processing unit 1602 may be responsible for executing various software programs including system programs such as operating system (OS) and application programs. System programs generally may assist in the running of the computing device 1600 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 1600 may comprise other system programs such as device drivers, programming tools, utility programs, software libraries, application programming interfaces (APIs), and so forth.

The computer 1600 also includes a network interface 1610 coupled to the bus 1608. The network interface 1610 provides a two-way data communication coupling to a local network 1612. For example, the network interface 1610 may be a digital subscriber line (DSL) modem, satellite dish, an integrated services digital network (ISDN) card or other data communication connection to a corresponding type of telephone line. As another example, the communication interface 1610 may be a local area network (LAN) card effecting a data communication connection to a compatible LAN. Wireless communication means such as internal or external wireless modems may also be implemented.

In any such implementation, the network interface 1610 sends and receives electrical, electromagnetic or optical signals that carry digital data streams representing various types of information, such as the selection of goods to be purchased, the information for payment of the purchase, or the address for delivery of the goods. The network interface 1610 typically provides data communication through one or more networks to other data devices. For example, the network interface 1610 may effect a connection through the local network to an Internet Host Provider (ISP) or to data equipment operated by an ISP. The ISP in turn provides data communication services through the internet (or other packet-based wide area network). The local network and the internet both use electrical, electromagnetic or optical signals that carry digital data streams. The signals through the various networks and the signals on the network interface 1610, which carry the digital data to and from the computer system 1600, are exemplary forms of carrier waves transporting the information.

The computer 1600 can send messages and receive data, including program code, through the network(s) and the network interface 1610. In the Internet example, a server might transmit a requested code for an application program through the internet, the ISP, the local network (the network 1612) and the network interface 1610. In accordance with the invention, one such downloaded application provides for the identification and analysis of a prospect pool and analysis of marketing metrics. The received code may be executed by processor 1604 as it is received, and/or stored in storage device 1610, or other non-volatile storage for later execution. In this manner, computer 1600 may obtain application code in the form of a carrier wave.

Figure 22A:
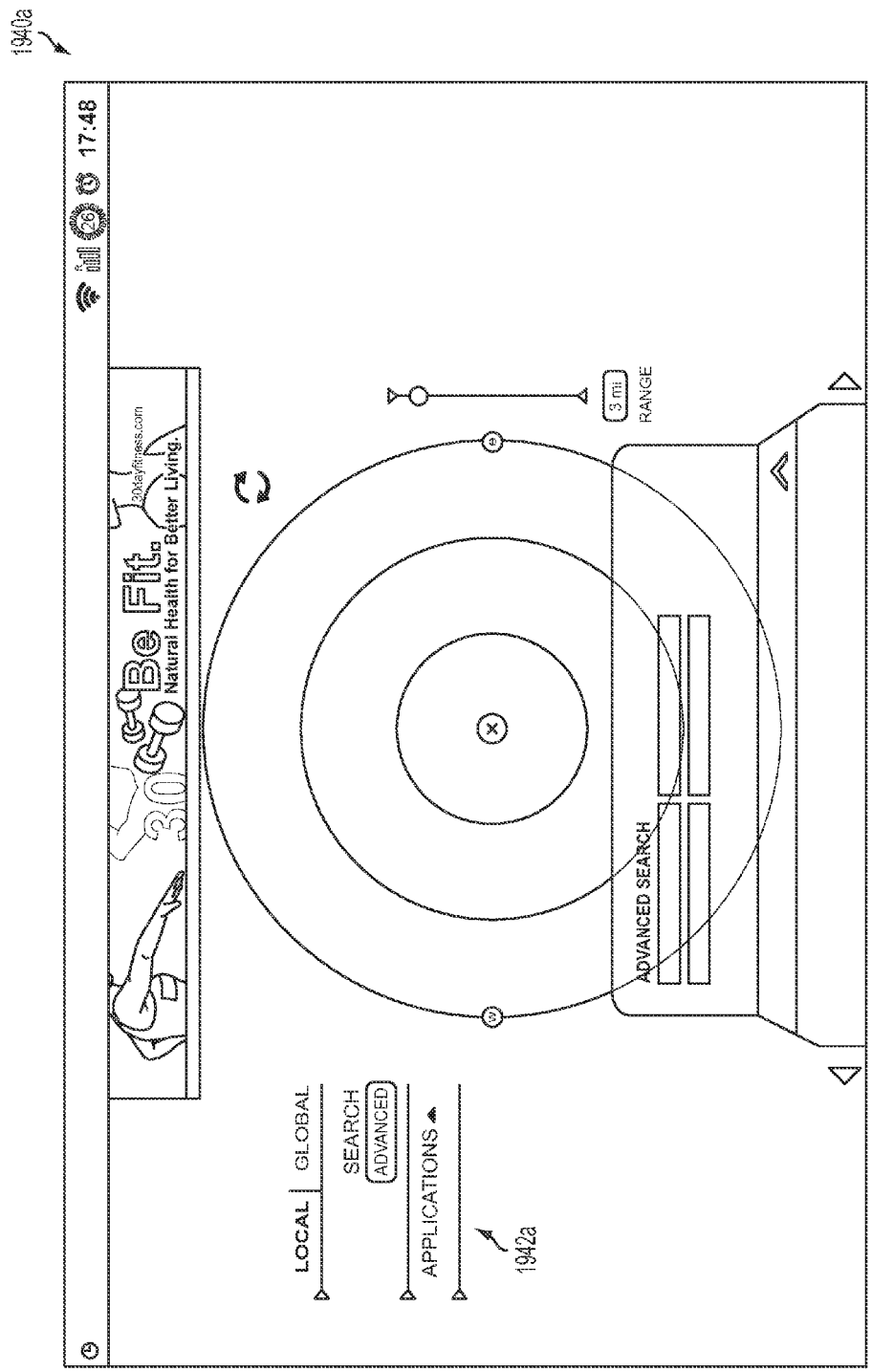
FIGS. 22A-22G illustrate one embodiments of a user interface for a vbApp on a mobile device.
Figure 22B:
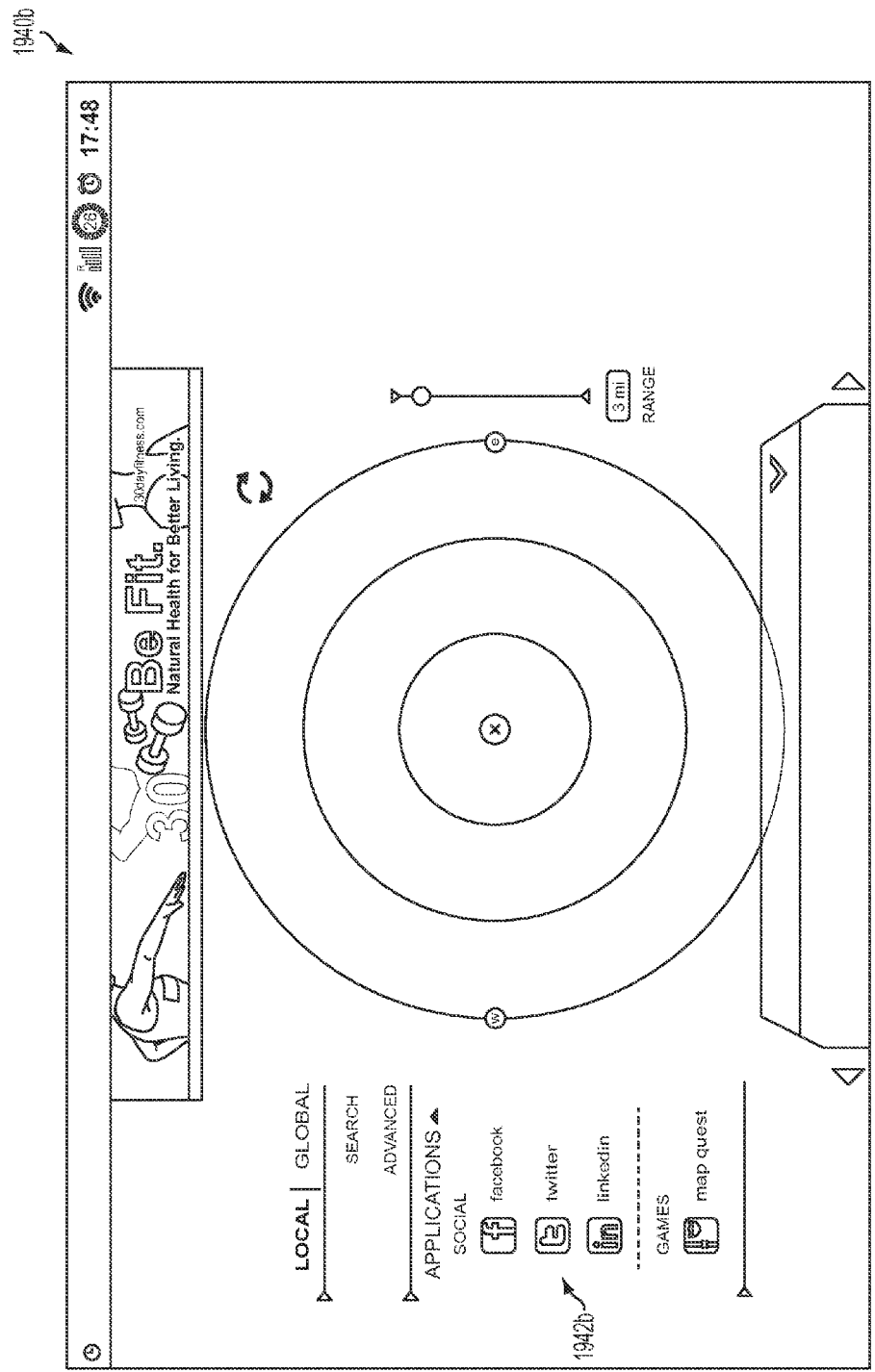
Figure 22C:
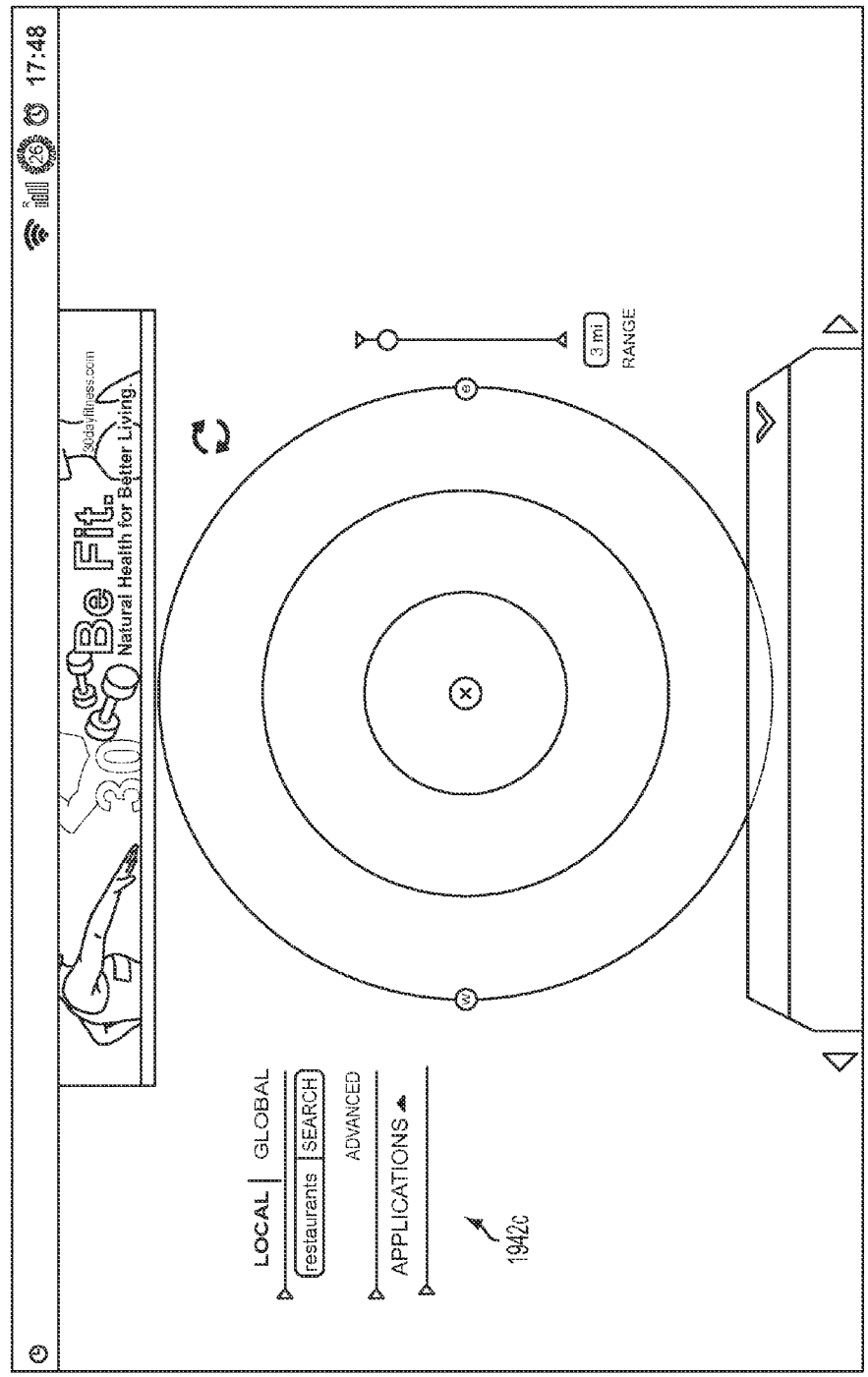
Figure 22D:
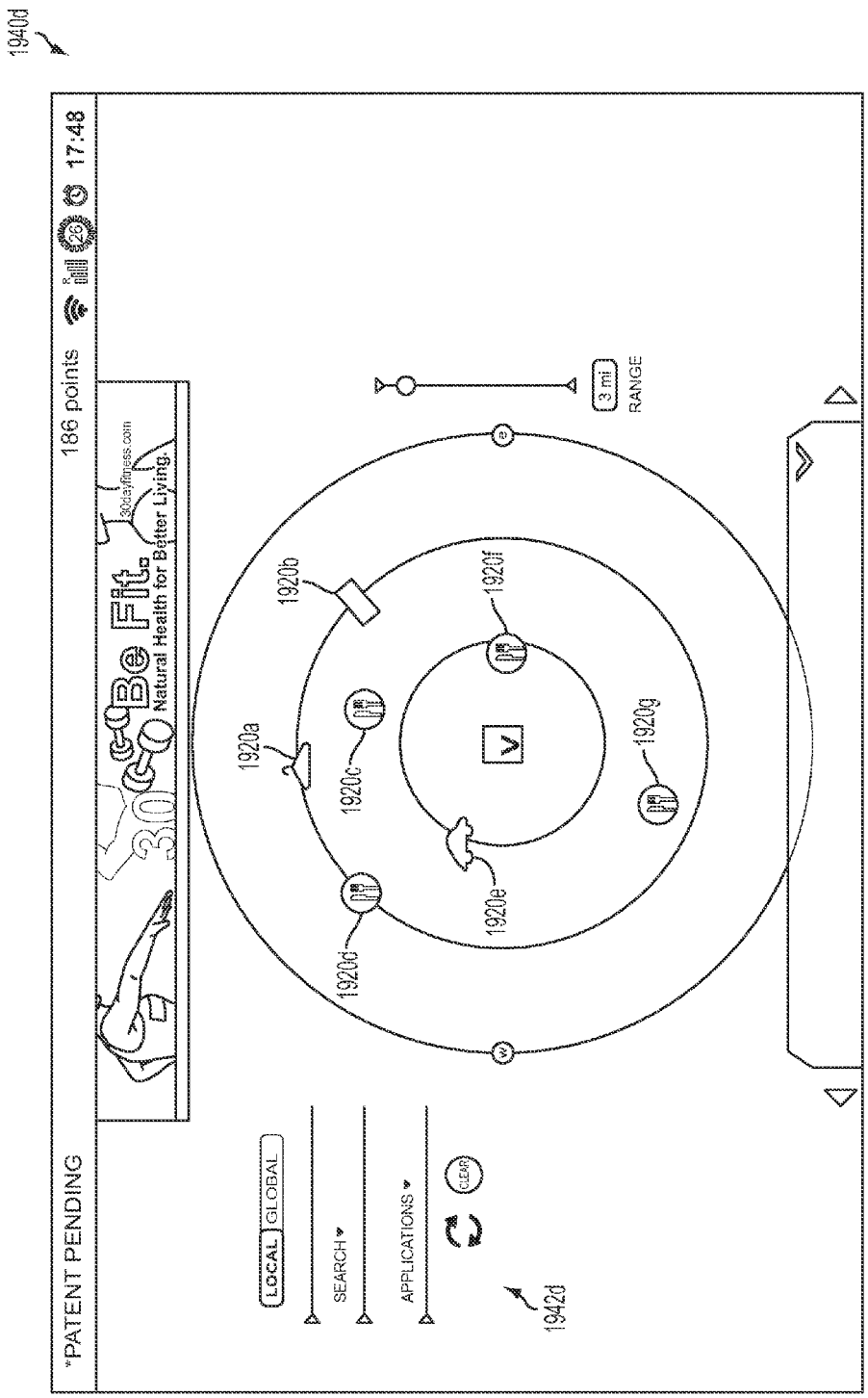
Figure 22E:
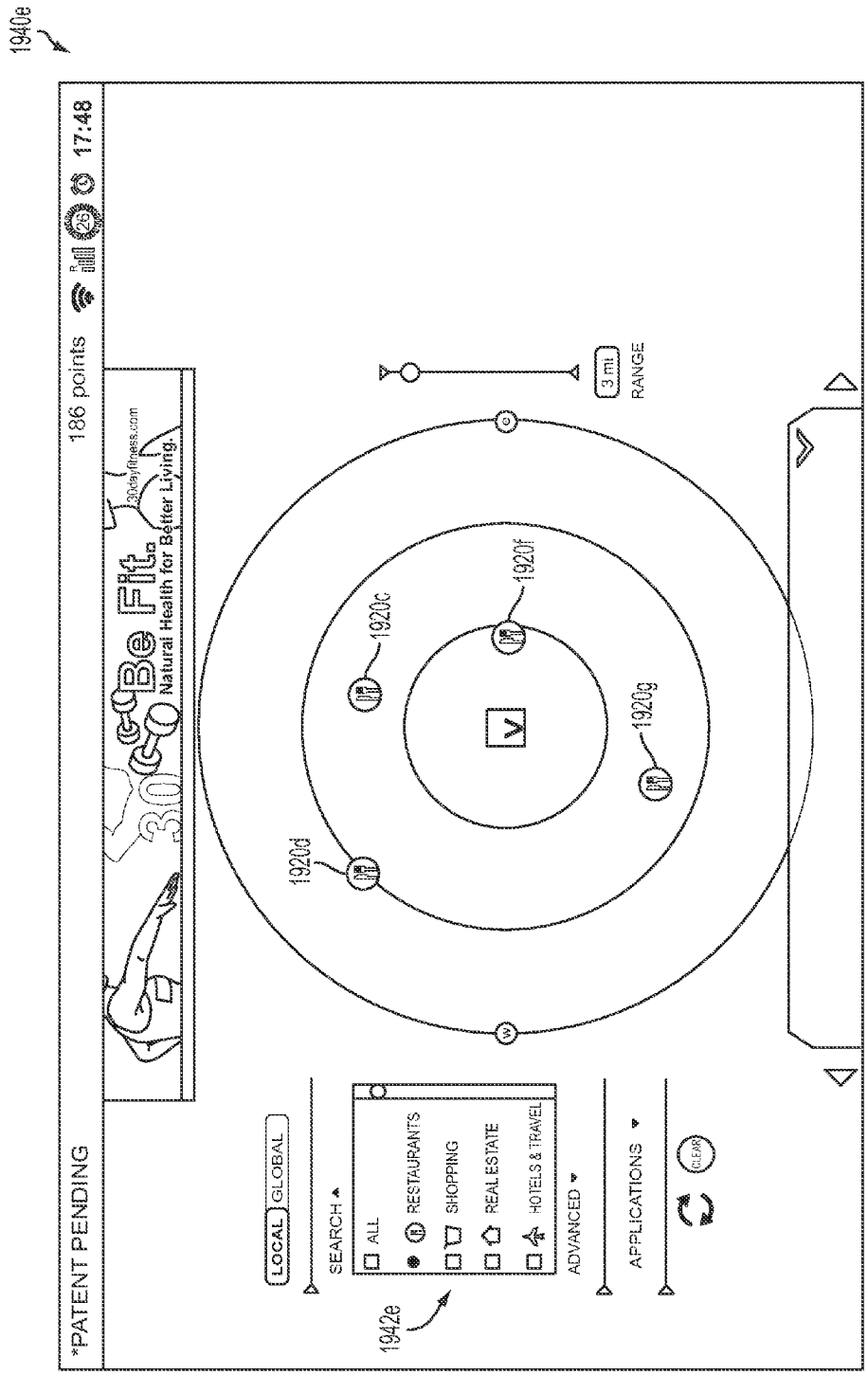
Figure 22F:
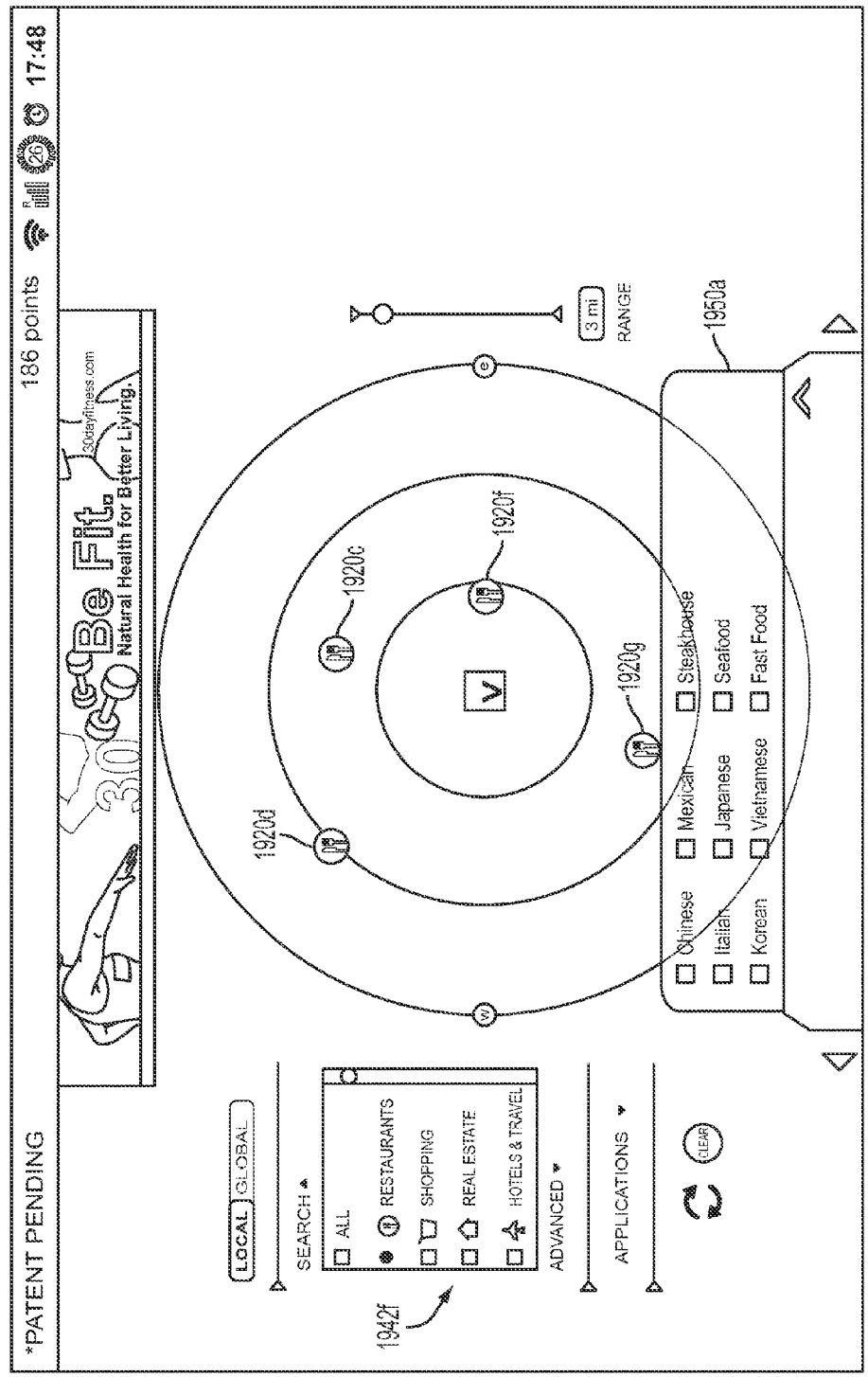
Figure 22G:
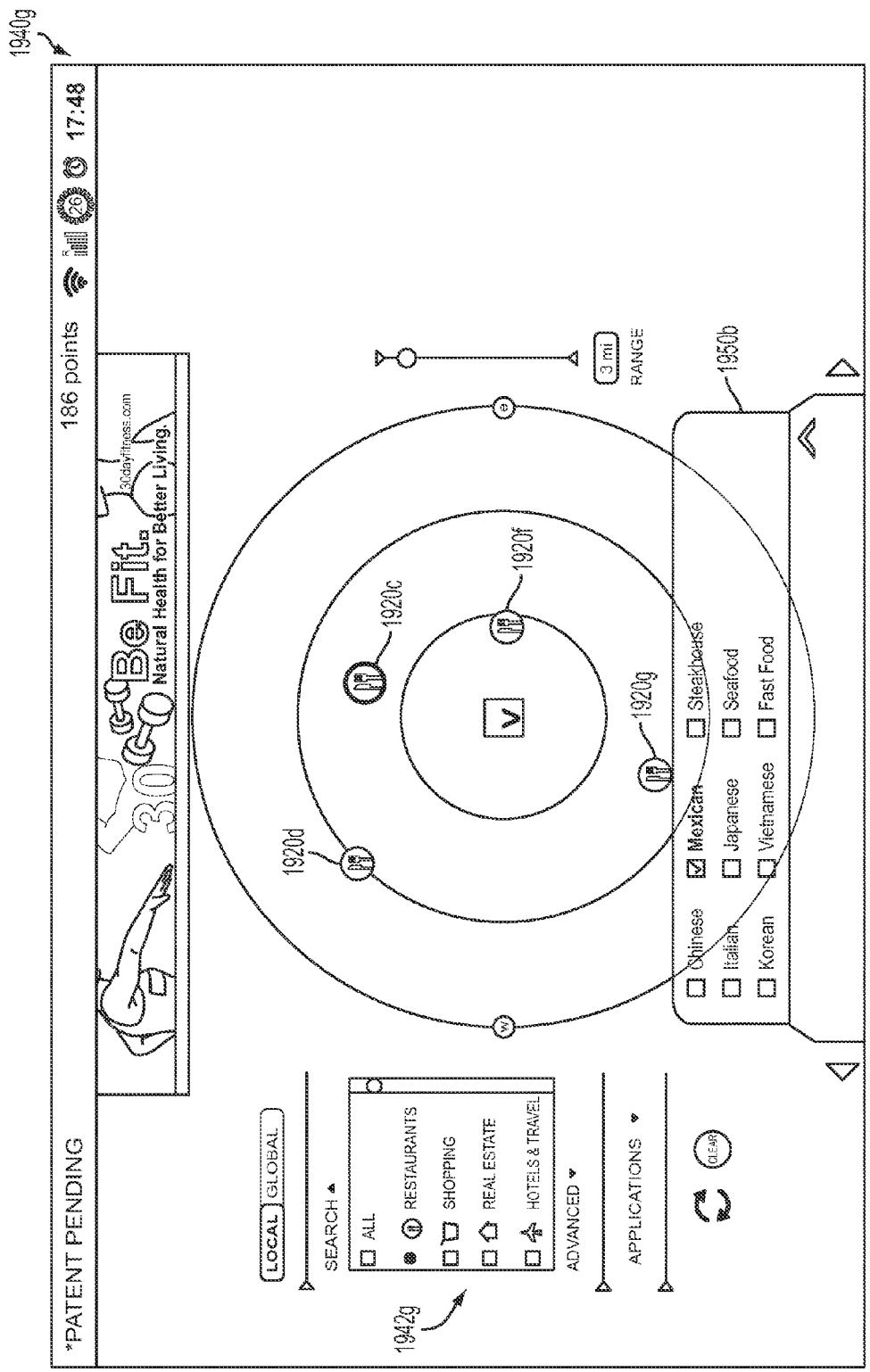

FIGS. 22A-22G illustrate one embodiment of a vbApp-enabled mobile device screen 1940 identifying a plurality of OOIs 1920a-1920g. FIGS. 22A-22C illustrate mobile device screens 1940a-1940c with no OOIs identified. In FIG. 22D, a plurality of OOIs 1920a-1920g are identified. In the illustrated embodiment, the identified OOIs 1920a-1920g comprise OOIs within the same geographic area as a user of the vbApp-enabled device. The displayed OOIs 1920a-1920g may be narrowed, for example, by the type of OOI. In FIG. 22E, the display 1940e has been limited to only those OOIs that are placed into a "restaurant" sandbox and/or have a restaurant descriptor associated therewith. In the illustrated embodiment, four OOIs 1920c, 1920d, 1920f, & 1920g comprise the restaurant descriptor. A user may further limit the displayed OOIs, for example, by selecting one or more additional descriptors from a descriptor box 1950a, as illustrated in FIG. 22F. FIG. 22G illustrates the results of selecting a specific type of restaurant, for example, "Mexican," from the descriptor box 1950b. An OOI 1920c matching the selected descriptor "Mexican" is highlighted on the display 1940g. A user may initiate one or more additional interactions with the OOI 1920c matching the selected descriptor, such as, for example, getting directions to the OOI 1920c, making a reservation, ordering food, and/or other suitable interactions with the OOI 1920c.

Figure 23A:
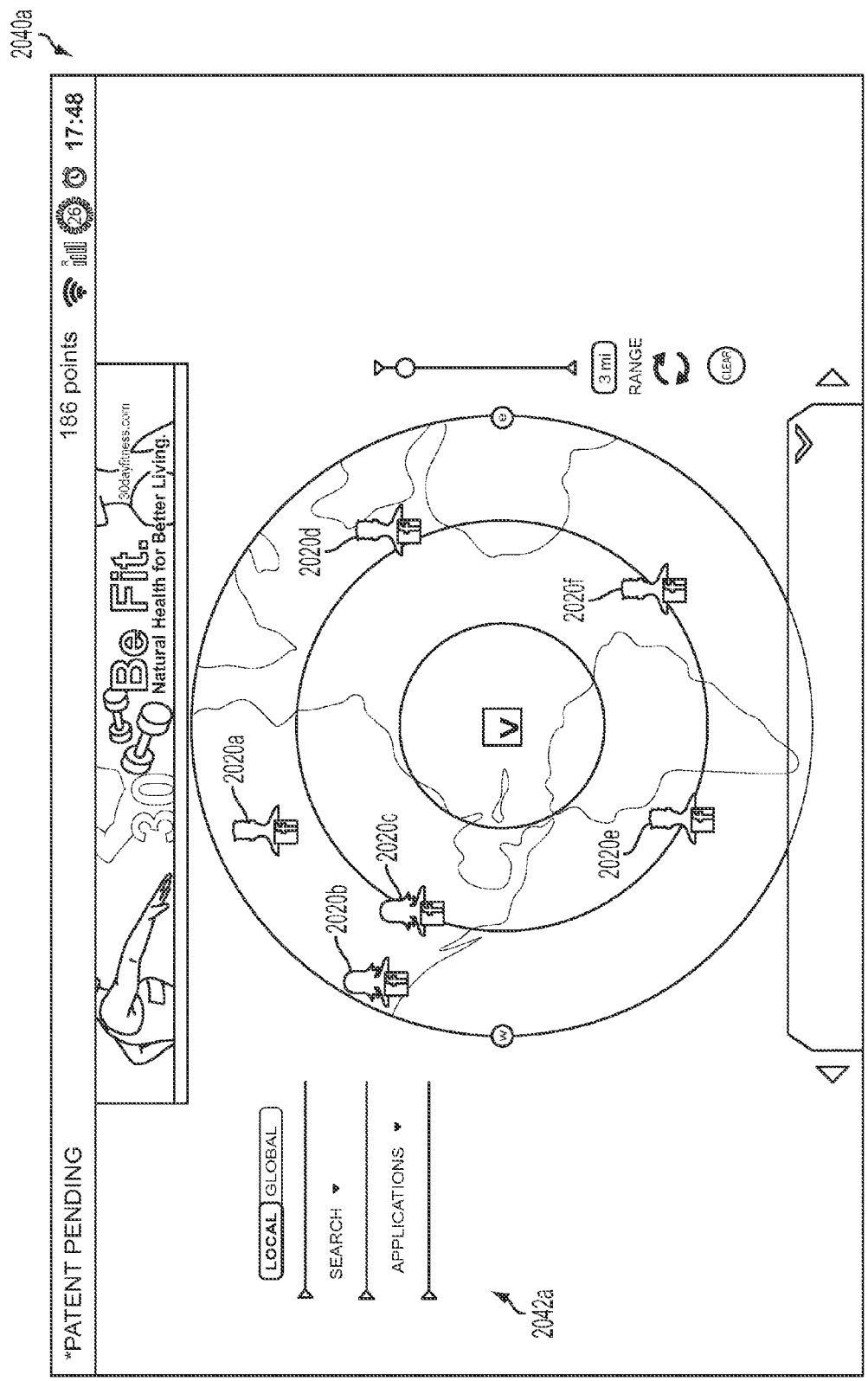
FIGS. 23A-23E illustrate one embodiment of a user interface for a vbApp on a mobile device.
Figure 23B:
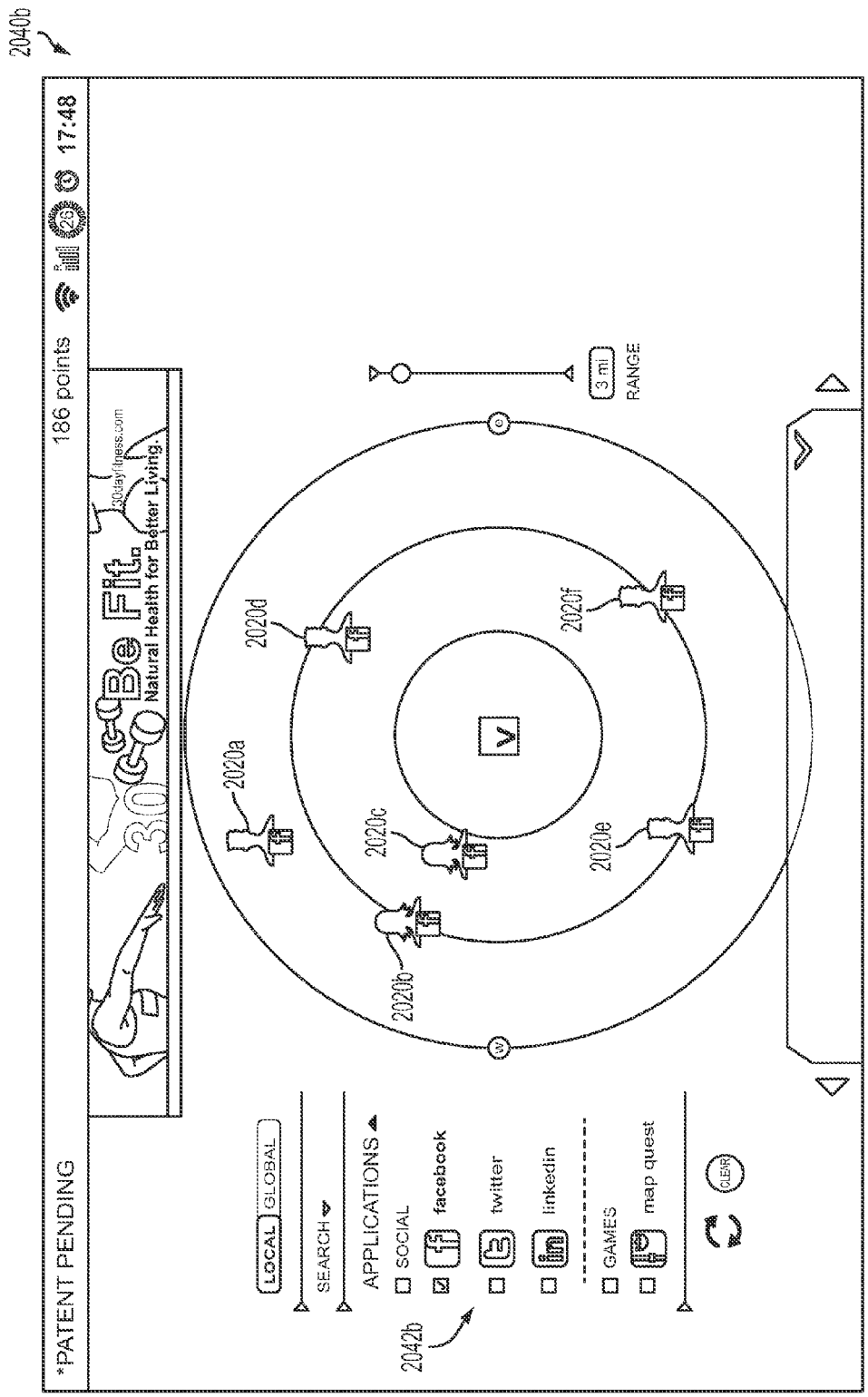
Figure 23C:
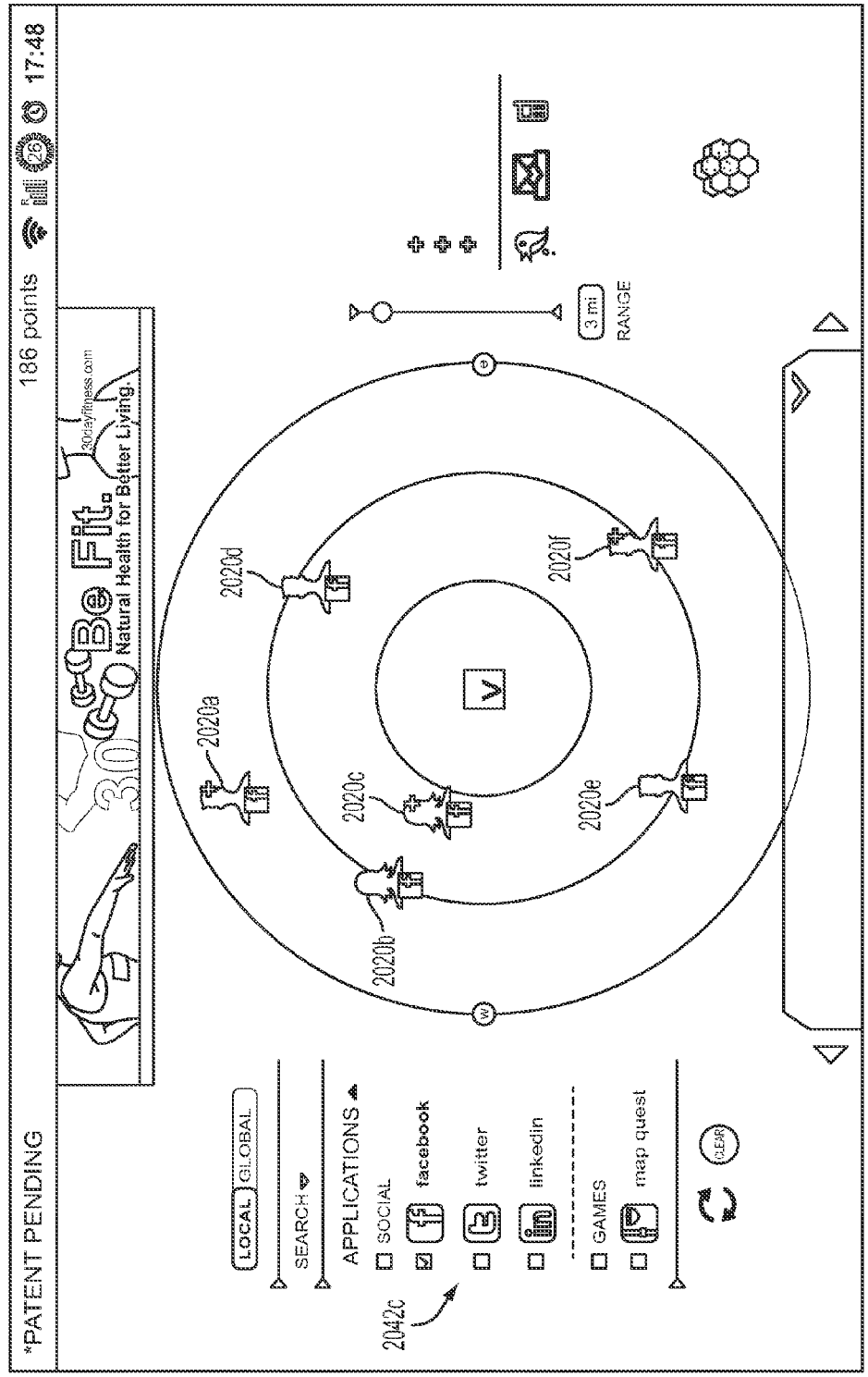
Figure 23D:
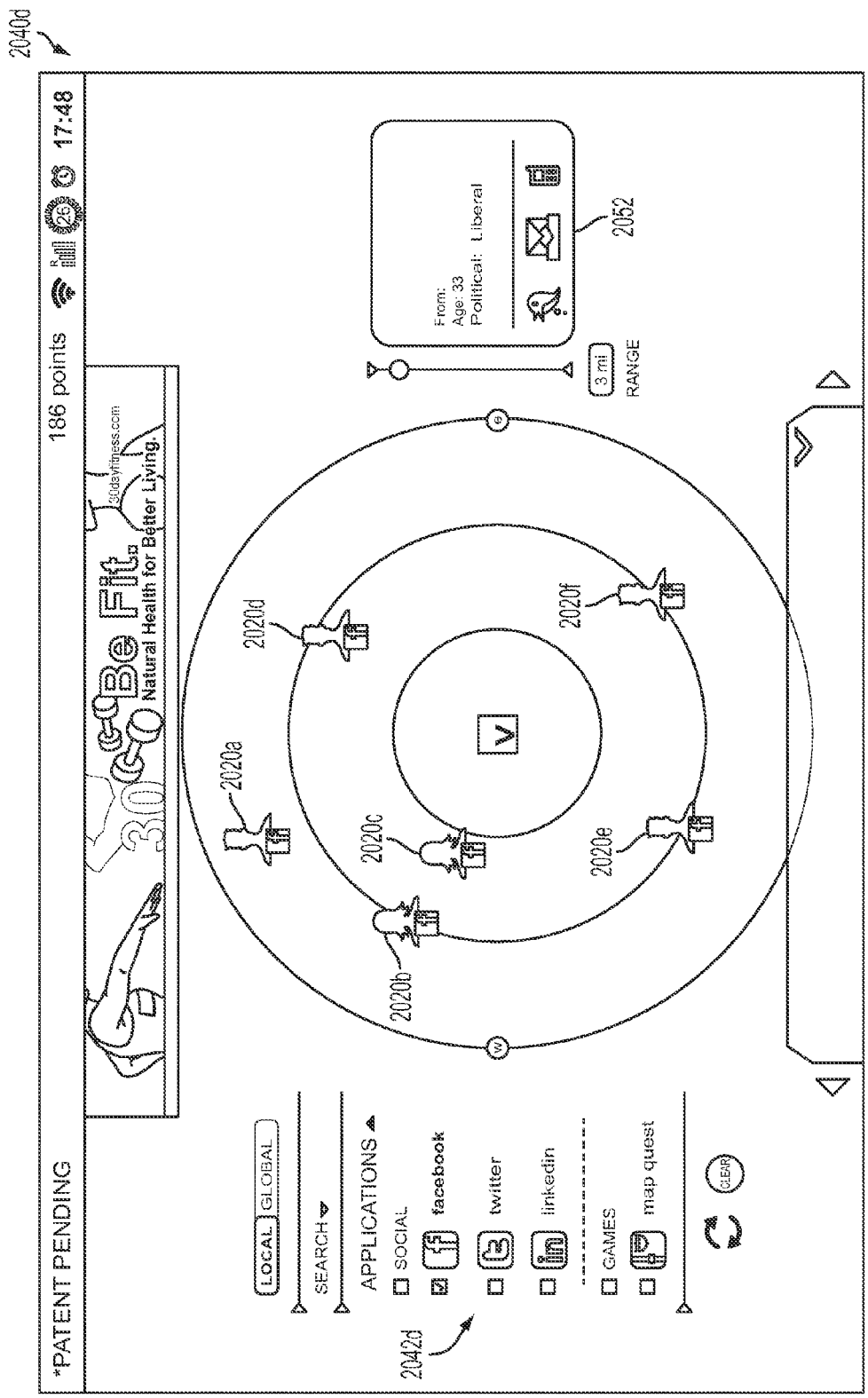
Figure 23E:
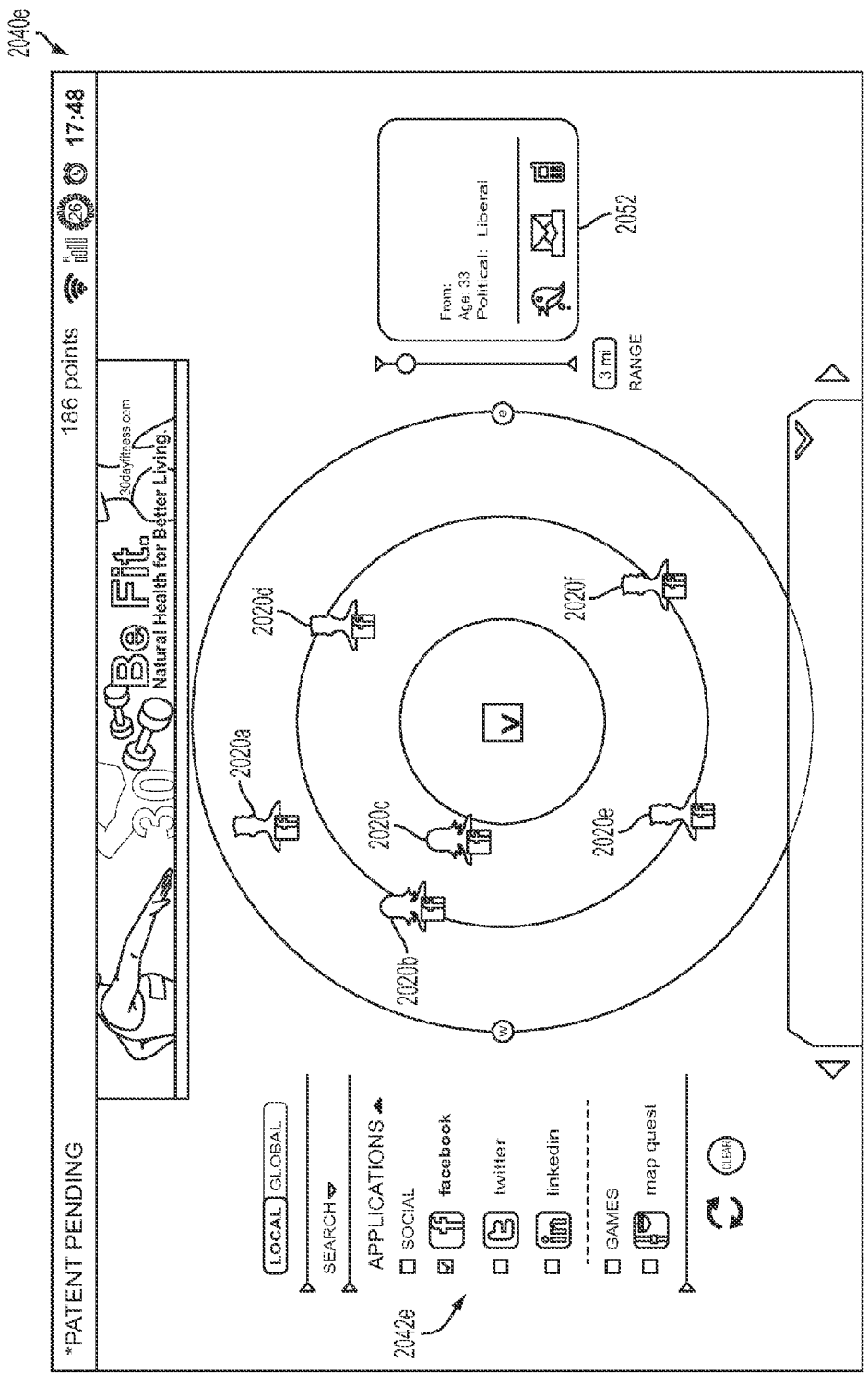

FIGS. 23A-23E illustrate one embodiment of vbApp display screen 2040 configured to display a plurality of OOIs 2020a-2020f comprising a user's social contacts. FIG. 23A illustrates a display of the OOIs 2020a-2020f comprising a plurality of Facebook friends. In the illustrated embodiment, the OOIs 2020a-2020f are displayed overtop of a world map indicating a relative position of each of the OOIs 2020a-2020f. In the embodiment illustrated in FIG. 23B, the world map is not displayed, and the OOIs 2020a-2020f are represented with respect to the user at the center of a radar-like display. In some embodiments, such as the embodiment illustrated in FIG. 23C, one or more of the social OOIs 2020a, 2020c, 2020f may comprise indirect social connections, such as, for example, friends of friends and/or OOIs not stored in the local device's sanbox. One or more of the OOIs 2020a, 2020c, may be added to the vbApp-enabled device's local sandbox by interacting with the OOI 2020a. A user may select an OOI to receive additional information about the contact represented by the OOI. For example, in FIG. 23D, the user has selected one of the OOIs 2020a-2020f representing social contacts. An information box 2052 is displayed on the screen 2040d. The information box 2052 may comprise, for example, demographic, position, personal, and/or other information specific to the selected social contact.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it was individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

Various aspects of the subject matter described herein are set out in the following numbered clauses:

1. A computer-implemented method for a distributed association engine, comprising: searching, by a processor, for one or more objects of interest within a spatially bounded area; identifying, by the processor, the one or more objects of interest responsive to the search; and mapping, by the processor, one or more associations between the one or more objects of interest in a personal network.

2. The computer-implemented method of clause 1, comprising storing, by the processor, the one or more objects of interest in a sandbox.

3. The computer-implemented method of clause 2, comprising: identifying, by the processor, one or more changes to the associations between the user and the one or more objects of interest; and transmitting, by the processor, the one or more changes to a server.

4. The computer-implemented method of clause 3, comprising generating, by the processor, a super network, wherein one or more nodes within the super network comprise a subset of the personal network and one or more additional networks.

5. The computer-implemented method of clause 1, comprising identifying, by the processor, a n-tuple associated with each of the one or more objects of interest, wherein the n-tuple comprises a plurality of descriptors, and wherein the plurality of descriptors are used to determine if the one or more objects of interest are responsive to the search.

6. The computer-implemented method of clause 1, wherein the one or more objects of interest comprise at least one of a static object, a dynamic object, a virtual object, a virtual association application, or any combination thereof.

7. The computer-implemented method of clause 6, wherein each of the one or more objects of interest comprise a node within the personal network, and wherein the one or more relationships between the user and the one or more objects of interest comprises one of an edge or an arc.

8. A system comprising: a display screen; a processor; and a non-transient memory medium operatively coupled to the processor, wherein the memory medium is configured to store a plurality of instructions configured to program the processor to: search for one or more objects of interest within a spatial bounded area; identify the one or more objects of interest responsive to the search; and map one or more relationships between a user and the one or more objects of interest in a personal network.

9. The system of clause 8, wherein the processor is further programmed to display the map of the one or more relationships on the display screen.

10. The system of clause 8, wherein the processor is further programmed to store the one or more objects of interest in a local memory medium.

11. The system of clause 8, wherein the processor is further programmed to: identify one or more changes to the associations between the user and the one or more objects of interest; and transmit the one or more changes to a server.

12. The system of clause 11, wherein the processor is further programmed to generate a global network one or more nodes representative of a subset of the personal network and one or more additional networks.

13. The system of clause 8, wherein the processor is further programmed to display the global network on the display screen.

14. The system of clause 8, wherein the processor is further programmed to identify a n-tuple associated with each of the one or more objects of interest, wherein the n-tuple comprises a plurality of descriptors, and wherein the plurality of descriptors are used to determine if the one or more objects of interest are responsive to the search.

15. The system of clause 8, wherein the one or more objects of interest comprise at least one of a static object, a dynamic object, a virtual object, a virtual association application, or any combination thereof.

16. The system of clause 8, wherein each of the one or more objects of interest comprise a node within the personal network, and wherein the one or more relationships between the user and the one or more objects of interest comprises one of an edge or an arc.

17. A non-transitory computer-readable memory medium configured to store instructions thereon that when loaded by a processor cause the processor to: search for one or more objects of interest within a spatial bounded area; identify the one or more objects of interest responsive to the search; and map one or more relationships between a user and the one or more objects of interest in a personal network.

18. The non-transitory computer-readable medium of clause 17, wherein the instructions stored thereon further cause the processor to store the one or more objects of interest in a local memory medium.

19. The non-transitory computer-readable medium of clause 17, wherein the instructions stored thereon further cause the processor to identify a n-tuple associated with each of the one or more objects of interest, wherein the n-tuple comprises a plurality of descriptors, and wherein the plurality of descriptors are used to determine if the one or more objects of interest are responsive to the search.

20. The non-transitory computer-readable medium of clause 19, wherein the one or more objects of interest comprise at least one of a static object, a dynamic object, a virtual object, a virtual association application, or any combination thereof.

21. A computer implemented method for a self-similar distributed association engine, comprising: generating, by a processer, a plurality of nodes, wherein each node represents an object; identifying, by the processor, one or more associations between the plurality of nodes; and modeling, by the processor, a first graph of a first subset of the plurality of nodes and the one or more associations between the first subset of nodes.

22. The computer-implemented method of clause 21, comprising: generating, by the processor, a super node, wherein the super node comprises a node representative of the first graph.

23. The computer-implemented method of clause 22, comprising: modeling, by the processor, a second graph of a second subset of the plurality of nodes and the one or more associations between the second plurality of nodes; generating, by the processor, a second super node representative of the second graph; and identifying, by the processor, one or more associations between the first super node and the second super node.

24. The computer-implemented method of clause 23, comprising: modeling, by the processor, a super graph comprising the first super node, the second super node, and the one or more associations between the first super node and the second super node.

25. The computer-implemented method of clause 24, comprising: generating, by the processor, a third super node, wherein the third super node comprises a node representative of the super graph.

26. The computer-implemented method of clause 21, comprising generating, by the processor, a domain-specific set of nodes and associations, wherein the domain-specific nodes represent one or more domain-specific objects, and wherein the domain-specific associations represent one or more domain-specific associations between the objects.

27. A computer-implemented method for behavioral analysis, comprising: identifying, by a processor, a set of attributes, wherein each attribute comprises one of an association, a behavior, or a descriptor of a node; monitoring, by the processor, a network of nodes for a node of interest, wherein the node of interest is identified as a node comprising the set of attributes; and performing, by the processor, a predetermined action when the node of interest is identified.

28. The computer-implemented method of clause 27, comprising: transmitting, by the processor, the set of attributes to a plurality of nodes in the network of nodes; receiving, by the processor, one or more nodes of interest identified by the plurality of nodes in the network of nodes.

29. The computer-implemented method of clause 27, comprising generating, by the processor, a notification that the node of interest has been identified.

30. The computer-implemented method of clause 27, comprising transmitting, by the processor, a message to the node of interest.

31. The computer-implemented method of clause 30, wherein the message comprises an advertisement.

32. A computer-implemented method comprising: generating, by a processor, a plurality of nodes representative of a plurality of objects; identifying, by the processor, one or more associations between the plurality of nodes; generating, by the processor, a personal graph of the plurality of nodes and the one or more associations; transmitting, by the processor, a sub-set of the personal graph to one or more mobile devices comprising a distributed association engine.

33. The computer-implemented method of clause 32, comprising: receiving, by the processor, a plurality of graph sub-sets from the one or more mobile devices; generating, by the processor, a super net comprising a plurality of nodes representative of the sub-set of the personal graph and the plurality of sub-sets received from the one or more mobile devices.

34. The computer-implemented method of clause 33, comprising identifying, by the processor, one or more changes in the associations between the plurality of nodes; and transmitting, by the processor, the one or more changes to the one or more mobile devices.

35. The computer-implemented method of clause 32, comprising generating, by the processor, an ad-hoc association between a first node and a second node, wherein the ad-hoc association comprises a limiting factor, wherein when the limiting factor is met the ad-hoc association is deleted.

36. The computer-implemented method of clause 35, wherein the limiting factor comprises one of a time limit, a distance limit, or behavioral limit.

The invention claimed is:

1. A computer-implemented method for a distributed association engine, comprising:
searching, by a processor, for objects of interest within a spatially bounded area; identifying, by the processor, a set objects of interest responsive to the search comprising loose connections between a system running the distributed association engine but not available to an entire computing platform running the distributed association engine;
mapping, by the processor, a set of associations between the set of objects of interest in a personal network, wherein each of the set of objects of interest comprises a node within the personal network, and wherein the set of associations comprises at least one of an edge and an arc;
receiving a selected subset of the set of objects of interest responsive to the search from a user;
monitoring, by the processor, the selected subset of the set of objects of interest for a user behavior; and triggering, by the processor, an action to occur when the user behavior is detected.

2. The computer-implemented method of claim 1, comprising receiving the search from the user as a defined pattern of interest shared by the set of objects of interest.

3. The computer-implemented method of claim 2, wherein the search further comprises excluded relationships between a node an object of interest.

4. The computer-implemented method of claim 1 wherein the action comprises shutting down a system running the distributed association engine.

5. The computer-implemented method of claim 1 wherein the action comprises displaying a message to the user.

6. A system comprising:
a display screen;
a processor; and
a non-transient memory medium operatively coupled to the processor, wherein the memory medium is configured to store a plurality of instructions configured to program the processor to:
search for objects of interest within a spatially bounded area;
identify a set of objects of interest responsive to the search comprising loose connections between a system running the distributed association engine but not available to an entire computing platform running the distributed association engine;
map a set of relationships between a user and the set of objects of interest in a personal network, wherein each of the set of objects of interest comprises a node within the personal network, and wherein the set of associations comprises at least one of an edge and an arc;
receive a selected subset of the set of objects of interest responsive to the search from the user;
monitor the selected subset of the set of objects of interest for a user behavior; and trigger an action to occur when the user behavior is detected.

7. The system of claim 6, wherein the processor is further programmed to display the map of the one or more relationships on the display screen.

8. The system of claim 6, wherein the processor is further programmed to store the one or more objects of interest in a local memory medium.

9. The system of claim 6, wherein the processor is further programmed to receive the search from the user as a defined pattern of interest shared by the set of objects of interest.

10. The system of claim 9, wherein the search further comprises excluded relationships between a node an object of interest.

11. The system of claim 6, wherein the processor is further programmed to display the global network on the display screen.

12. The system of claim 6, wherein the processor is further programmed to identify a n-tuple associated with each of the one or more objects of interest, wherein the n-tuple comprises a plurality of descriptors, and wherein the plurality of descriptors are used to determine if the one or more objects of interest are responsive to the search.

13. The system of claim 6, wherein the one or more objects of interest comprise at least one of a static object, a dynamic object, a virtual object, a virtual association application, or any combination thereof.

14. A non-transitory computer-readable memory medium configured to store instructions thereon that when loaded by a processor cause the processor to:
search for objects of interest within a spatially bounded area;
identify a set of objects of interest responsive to the search comprising loose connections between a system running the distributed association engine but not available to an entire computing platform running the distributed association engine;
map a set of relationships between a user and the set of objects of interest in a personal network, wherein each of the set of objects of interest comprises a node within the personal network, and wherein the set of associations comprises at least one of an edge and an arc;
receive a selected subset of the set of objects of interest responsive to the search from the user;
monitor the selected subset of the set of objects of interest for a user behavior; and trigger an action to occur when the user behavior is detected.

15. The non-transitory computer-readable medium of claim 14, wherein the instructions stored thereon further cause the processor to store the one or more objects of interest in a local memory medium.

16. The non-transitory computer-readable medium of claim 14, wherein the instructions stored thereon further cause the processor to identify a n-tuple associated with each of the one or more objects of interest, wherein the n-tuple comprises a plurality of descriptors, and wherein the plurality of descriptors are used to determine if the one or more objects of interest are responsive to the search.

17. The non-transitory computer-readable medium of claim 16, wherein the one or more objects of interest comprise at least one of a static object, a dynamic object, a virtual object, a virtual association application, or any combination thereof.

* * * * *